US012629731B2

(12) United States Patent
Voit, II

(10) Patent No.: US 12,629,731 B2
(45) Date of Patent: May 19, 2026

(54) AUTOMATED CLEANING SYSTEM FOR A BEVERAGE DISPENSER

(71) Applicant: WELBILT FOODSERVICE COMPANIES, LLC, New Port Richey, FL (US)

(72) Inventor: Hugh Richard Voit, II, Louisville, KY (US)

(73) Assignee: WELBILT FOODSERVICE COMPANIES, L.L.C., New Port Richey, FL (US)

( * ) Notice: Subject to any disclaimer, the term of this patent is extended or adjusted under 35 U.S.C. 154(b) by 86 days.

(21) Appl. No.: 18/404,162

(22) Filed: Jan. 4, 2024

(65) Prior Publication Data

US 2024/0351079 A1 Oct. 24, 2024

Related U.S. Application Data

(63) Continuation-in-part of application No. 18/299,013, filed on Apr. 11, 2023.

(51) Int. Cl.
  *B08B 9/032* (2006.01)
  *A23G 9/04* (2006.01)
   (Continued)

(52) U.S. Cl.
  CPC ............ *B08B 9/0325* (2013.01); *A23G 9/045* (2013.01); *A23G 9/30* (2013.01); *A47J 31/60* (2013.01); *B08B 2209/032* (2013.01)

(58) Field of Classification Search
  CPC . B08B 9/0325; B08B 2209/032; A23G 9/045; A23G 9/30; A47J 31/60
  See application file for complete search history.

(56) References Cited

U.S. PATENT DOCUMENTS

2022/0281734 A1* 9/2022 Lisiecki .................. B67D 1/07
2024/0140777 A1* 5/2024 Lundberg ................. B08B 3/08
      (Continued)

*Primary Examiner* — Sharidan Carrillo
(74) *Attorney, Agent, or Firm* — Ohlandt, Greeley and Perle, LLP.

(57) ABSTRACT

A method of establishing a baseline strength of a chemical mixture flowing through a cleanable circuit of a beverage dispenser by allowing incoming water to flow through said cleanable circuit while measuring a total flow rate $Q_{tot}$; providing a pump connected to said cleanable circuit that can pump a chemical into said incoming flowing water of said cleanable circuit; calculating a required chemical flow rate $Q_{chem}$ value to achieve a desired value of dilution ratio (DR) by utilizing said desired value of DR and said measured value of said total flow rate $Q_{tot}$ in a predefined equation; determining from said required chemical flow rate $Q_{chem}$ value a required pump excitation voltage by performing at least one step selected from the group consisting of: an Equation-Based Pump Voltage Determination Step, and a Calibration-Based Pump Voltage Determination Step; and performing an EC Baselining Step on said cleanable circuit, whereby an $EC_{baseline}$ value is obtained for use as a baseline strength for comparing cleaning EC measurements on at least one member of a cleanable circuit's flow-sharing cleanable circuit group.

22 Claims, 26 Drawing Sheets

(51) Int. Cl.
    *A23G 9/30*         (2006.01)
    *A47J 31/60*       (2006.01)

(56)           References Cited

U.S. PATENT DOCUMENTS

| | | | |
|---|---|---|---|
| 2024/0351079 A1* | 10/2024 | Voit, II | B08B 9/0325 |
| 2025/0074759 A1* | 3/2025 | Voit, II | B67D 1/07 |

* cited by examiner

F.C. → flow control
/\/\ → restriction

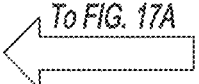
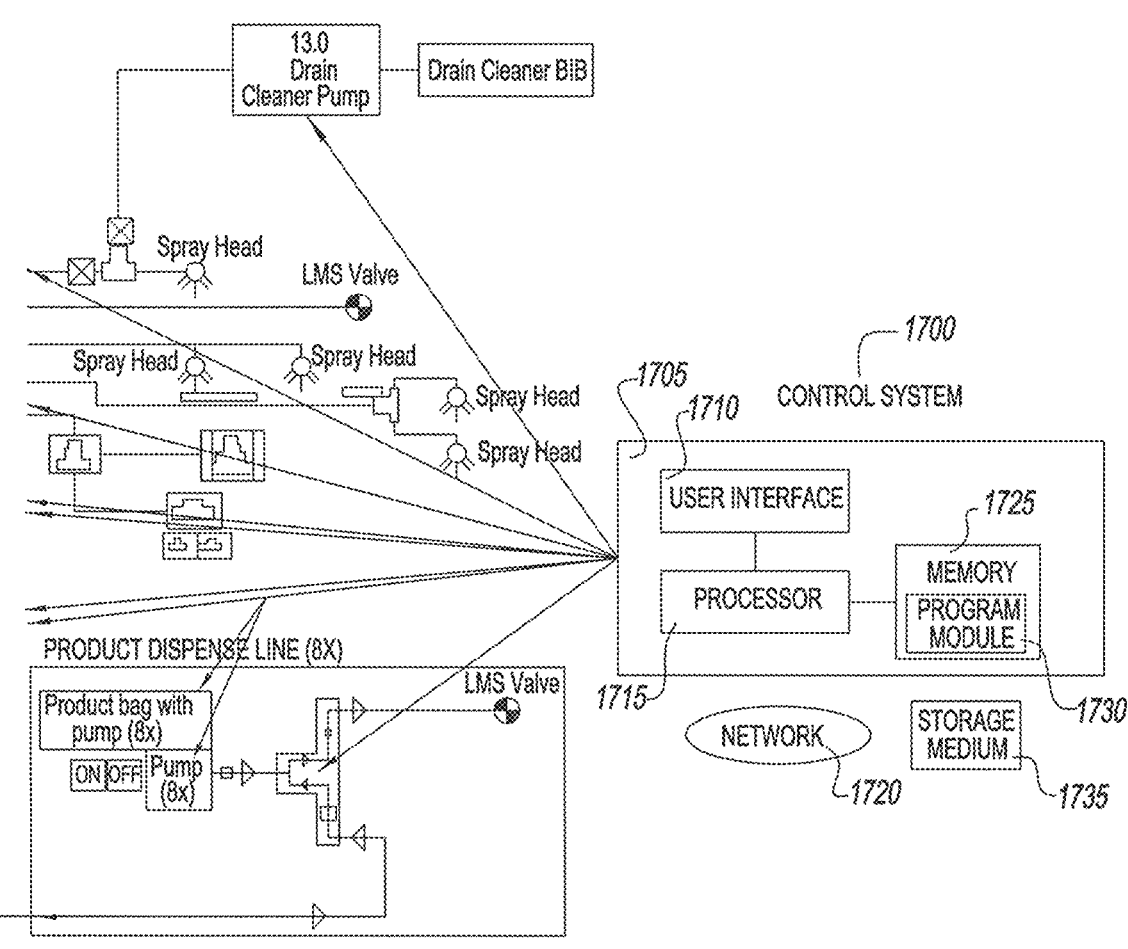
FIG. 17B

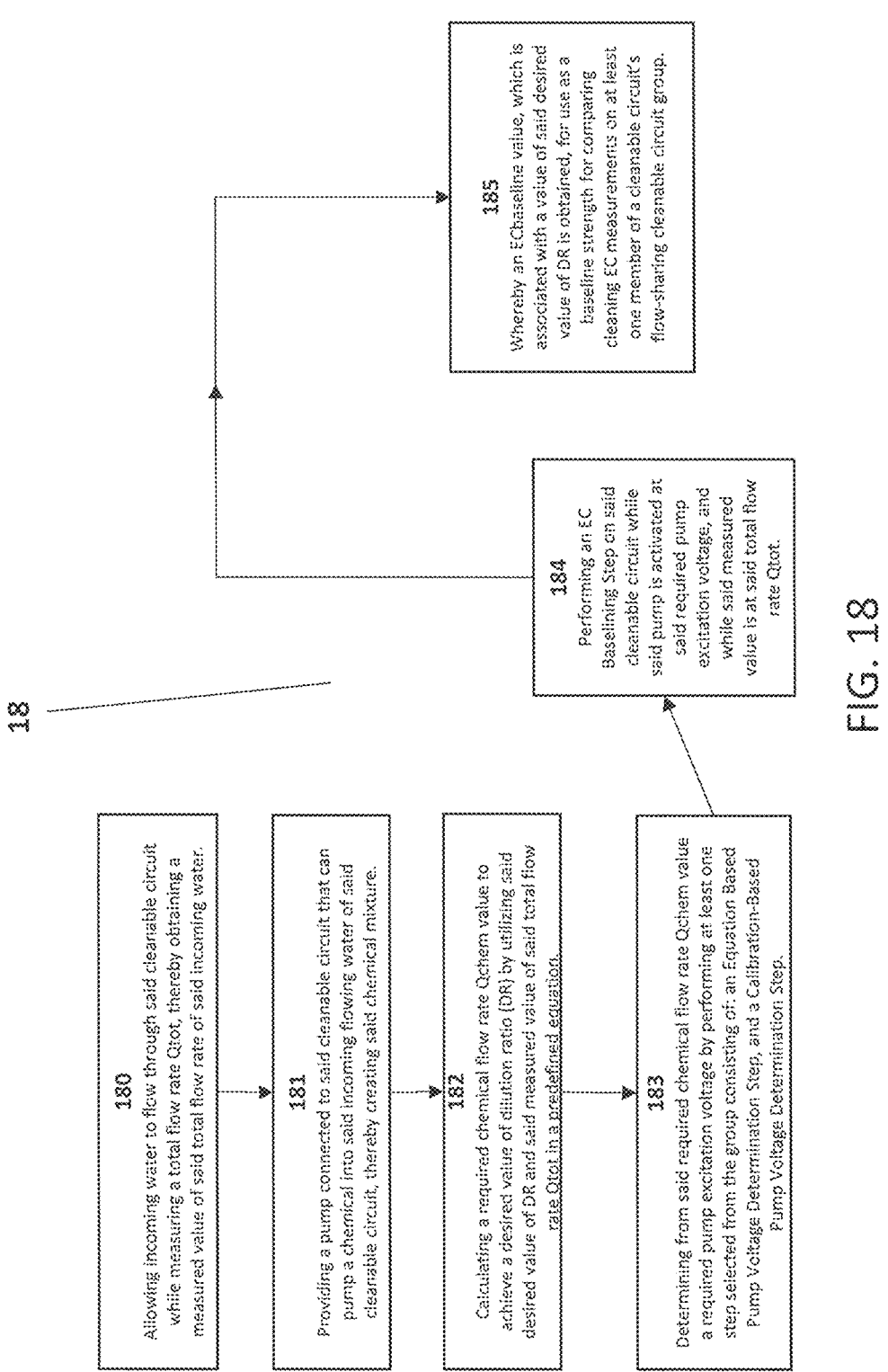

180
Allowing incoming water to flow through said cleanable circuit while measuring a total flow rate Qtot, thereby obtaining a measured value of said total flow rate of said incoming water.

181
Providing a pump connected to said cleanable circuit that can pump a chemical into said incoming flowing water of said cleanable circuit, thereby creating said chemical mixture.

182
Calculating a required chemical flow rate Qchem value to achieve a desired value of dilution ratio (DR) by utilizing said desired value of DR and said measured value of said total flow rate Qtot in a predefined equation.

183
Determining from said required chemical flow rate Qchem value a required pump excitation voltage by performing at least one step selected from the group consisting of: an Equation Based Pump Voltage Determination Step, and a Calibration-Based Pump Voltage Determination Step.

184
Performing an EC Baselining Step on said cleanable circuit while said pump is activated at said required pump excitation voltage, and while said measured value is at said total flow rate Qtot.

185
Whereby an ECbaseline value, which is associated with a value of said desired value of DR is obtained, for use as a baseline strength for comparing cleaning EC measurements on at least one member of a cleanable circuit's flow-sharing cleanable circuit group.

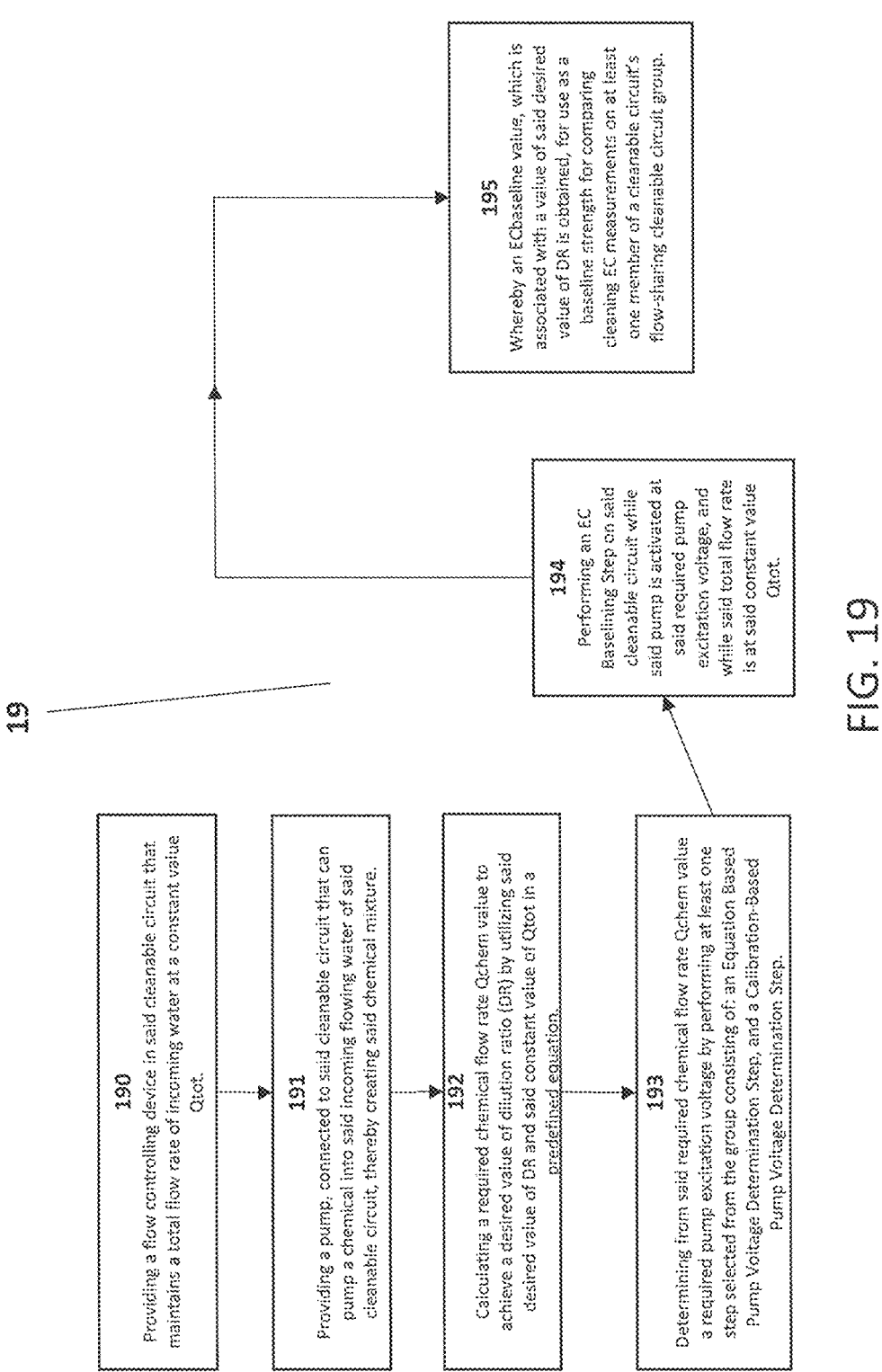

190

Providing a flow controlling device in said cleanable circuit that maintains a total flow rate of incoming water at a constant value Qtot.

191

Providing a pump, connected to said cleanable circuit that can pump a chemical into said incoming flowing water of said cleanable circuit, thereby creating said chemical mixture.

192

Calculating a required chemical flow rate Qchem value to achieve a desired value of dilution ratio (DR) by utilizing said desired value of DR and said constant value of Qtot in a predefined equation.

193

Determining from said required chemical flow rate Qchem value a required pump excitation voltage by performing at least one step selected from the group consisting of: an Equation Based Pump Voltage Determination Step, and a Calibration-Based Pump Voltage Determination Step.

194

Performing an EC Baselining Step on said cleanable circuit while said pump is activated at said required pump excitation voltage, and while said total flow rate is at said constant value Qtot.

195

Whereby an ECbaseline value, which is associated with a value of said desired value of DR is obtained, for use as a baseline strength for comparing cleaning EC measurements on at least one member of a cleanable circuit's flow-sharing cleanable circuit group.

FIG. 19

Fresh Blender Advanced Sanitation 2.0
Pump Priming Stera-Sheen Cleaner Solution           V2.1

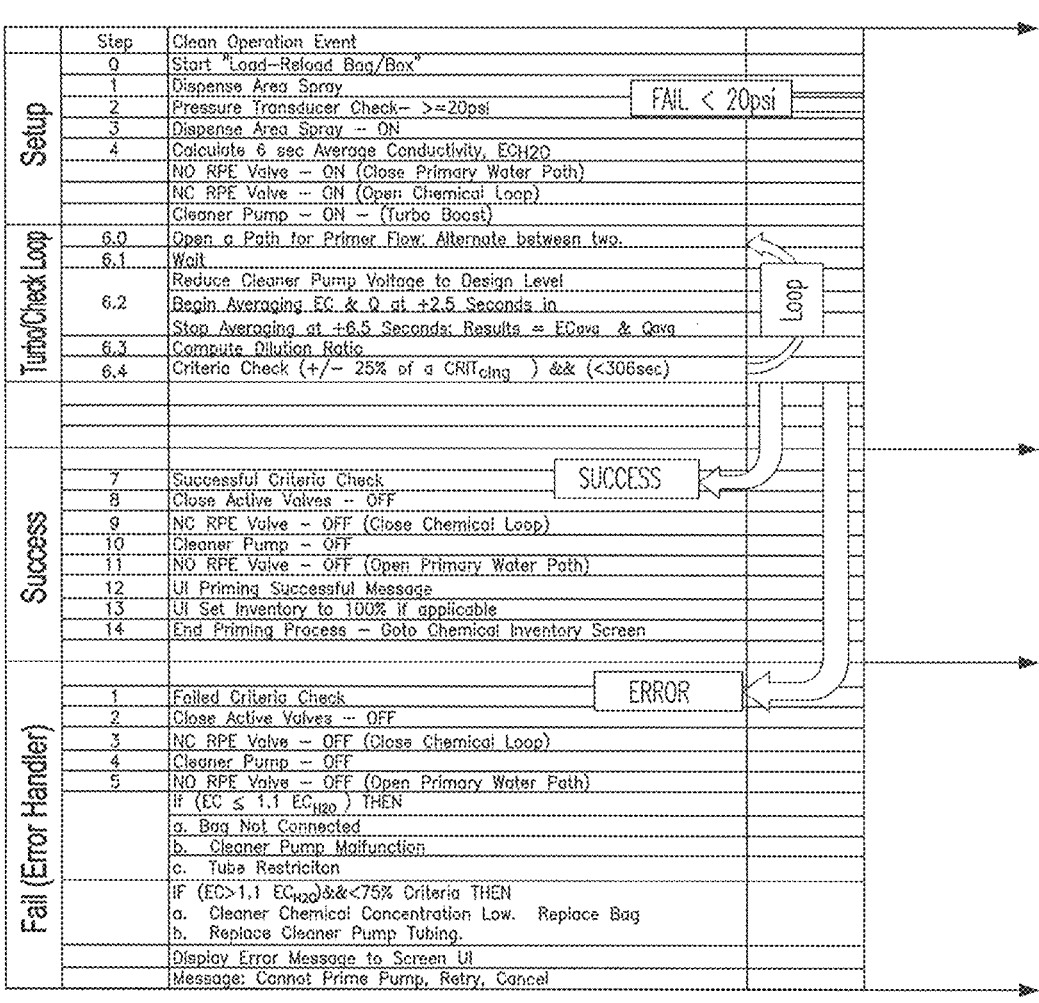

| | Step | Clean Operation Event | | |
|---|---|---|---|---|
| Setup | 0 | Start "Load-Reload Bag/Box" | | |
| | 1 | Dispense Area Spray | | |
| | 2 | Pressure Transducer Check- >=20psi | FAIL < 20psi | |
| | 3 | Dispense Area Spray - ON | | |
| | 4 | Calculate 6 sec Average Conductivity, ECH2O | | |
| | | NO RPE Valve - ON (Close Primary Water Path) | | |
| | | NC RPE Valve - ON (Open Chemical Loop) | | |
| | | Cleaner Pump - ON - (Turbo Boost) | | |
| Turbo/Check Loop | 6.0 | Open a Path for Primer Flow: Alternate between two. | | LOOP |
| | 6.1 | Wait | | |
| | 6.2 | Reduce Cleaner Pump Voltage to Design Level | | |
| | | Begin Averaging EC & Q at +2.5 Seconds in | | |
| | | Stop Averaging at +6.5 Seconds; Results = ECava & Qava | | |
| | 6.3 | Compute Dilution Ratio | | |
| | 6.4 | Criteria Check (+/- 25% of a CRITclng ) && (<306sec) | | |
| Success | 7 | Successful Criteria Check | SUCCESS | |
| | 8 | Close Active Valves - OFF | | |
| | 9 | NC RPE Valve - OFF (Close Chemical Loop) | | |
| | 10 | Cleaner Pump - OFF | | |
| | 11 | NO RPE Valve - OFF (Open Primary Water Path) | | |
| | 12 | UI Priming Successful Message | | |
| | 13 | UI Set Inventory to 100% if applicable | | |
| | 14 | End Priming Process - Goto Chemical Inventory Screen | | |
| Fail (Error Handler) | 1 | Failed Criteria Check | ERROR | |
| | 2 | Close Active Valves - OFF | | |
| | 3 | NC RPE Valve - OFF (Close Chemical Loop) | | |
| | 4 | Cleaner Pump - OFF | | |
| | 5 | NO RPE Valve - OFF (Open Primary Water Path) | | |
| | | IF (EC ≤ 1.1 ECH2O ) THEN | | |
| | | a. Bag Not Connected | | |
| | | b.  Cleaner Pump Malfunction | | |
| | | c.  Tube Restriciton | | |
| | | IF (EC>1.1 ECH2O)&&<75% Criteria THEN | | |
| | | a.  Cleaner Chemical Concentration Low.  Replace Bag | | |
| | | b.  Replace Cleaner Pump Tubing. | | |
| | | Display Error Message to Screen UI | | |
| | | Message: Cannot Prime Pump, Retry, Cancel | | |

TEST CASES
   1    Ppriming C User turns off the machine at any pooint during priming operation.
   2    Ppriming C Either cleaner solution or sanitizer solution doesn't prime or both.
   3    Ppriming C The user primes with the current chemicals in place.
   4    Ppriming C Water is not connected.
   5    Ppriming C Water is connected but over the 20 psi
   6    Ppriming C Water is connected but under 20psi (19 ~1)psi

*FIG. 20A*

Fresh Blender Advanced Sanitation 2.0
Weekly Cleaning Routine/Sequence 3.2.1

CHART 1

CHART 2

AUTOMATED CLEANING SYSTEM FOR A BEVERAGE DISPENSER

CROSS REFERENCE TO RELATED APPLICATION

The present application is a continuation-in-part application of U.S. patent application Ser. No. 18/299,013, of the same title and filed on Apr. 11, 2023, the contents of which are incorporated herein by reference.

BACKGROUND

1. Field of the Disclosure

The present disclosure is directed to beverage dispensers. More particularly, the present disclosure relates to a cleaning system for a beverage dispenser.

2. Description of the Related Art

Beverage dispensers are available that mix and/or blend ice and flavored ingredients together to form frozen or chilled beverages, for example, smoothies, frappes, Frappuccino® drinks, daquiris, carbonated soft drinks and other beverages. These devices require periodic cleaning to ensure flavor consistency and to maintain safety. Such cleaning undesirably requires operators of the beverage devices to remember to perform the cleaning as well as connect the beverage devices to the cleaning liquid and/or sanitizing liquid sources each time the beverage devices are cleaned.

Accordingly, it has been determined by the present disclosure that there is a continuing need for a system that overcomes, alleviates, and/or mitigates one or more of the aforementioned and other deleterious effects of prior devices.

SUMMARY

A cleaning system is provided for a beverage dispenser. This disclosure illustrates a cleaning (e.g., cleaning, sanitizing, and/or rinsing) system for a beverage dispensing device.

The beverage dispensing device blends and/or mixes beverage ingredients in a cup, thereby producing a beverage, e.g., a smoothie, which can then be served to a consumer allowing the consumer to drink the beverage from the same cup that the beverage ingredients were blended and/or mixed in. The beverage dispensing device, hereinafter the beverage dispenser, includes plumbing to direct flows of liquid ingredients to the cup. It is desirable to clean flow paths of the plumbing to maintain cleanliness and safety of the beverage dispenser along with providing a means of cleaning other mechanical parts and surfaces of the device. Advantageously, the beverage dispenser has a cleaning system to clean the flow paths of the plumbing and other mechanical parts and surfaces with cleaning and/or sanitizing liquids. The cleaning system can be configured to automatically clean the aforementioned areas periodically, once supplied with the cleaning and/or sanitizing liquids.

A cleaning system for a beverage dispenser comprises: a water source; a cleaner solution source and/or a sanitizer solution source; at least one cleanable ingredient circuit of the beverage dispenser which is in fluid connection with the water source, and the cleaner solution source and/or sanitizer solution source; a first conduit for connecting the water source to the at least one cleanable ingredient circuit via a sensor; at least one second conduit for connecting the cleaner solution source and/or sanitizer solution source to the first conduit via at least one pump prior to the sensor, thereby forming a mixture of the water, a cleaner solution, and/or a sanitizing solution; and a controller for: (a) receiving a first signal from the sensor representative of electrical conductivity of the mixture, whereby the controller calculates a dilution ratio of the mixture from the electrical conductivity; and/or (b) receiving a second signal from the sensor indicative of a flow rate of the mixture passing through the sensor via the first conduit.

The cleaning system, wherein the controller controls the flow rate of the at least one pump, in response to the first and/or second signals, thereby controlling the dilution ratio of the mixture that is passed to the at least one cleanable ingredient circuit.

The cleaning system, wherein the controller uses the second signal to calculate total flow of mixture.

The cleaning system further comprises: a blender shaft having a blender blade; wherein after rinsing, cleaning or sanitizing of the at least one cleanable ingredient circuit, the blender shaft and the blade are lowered to a position in the blending system wherein the blender and the blade are rinsed, cleaned, or sanitized after the respective rinsing, cleaning and/or sanitizing of the at least one cleanable ingredient circuit.

The cleaning system, wherein the calculated dilution ratio via the controller, controls the speed of the pump, thereby adjusting the flow rate of either the cleaner solution and/or sanitizer solution.

The cleaning system, wherein the pump is controlled to maintain the mixture at a substantially constant ratio of water to either the cleaner solution and/or sanitizer solution.

The cleaning system further comprising a cleaning loop for maintaining a quantity of the mixture to the at least one cleanable ingredient circuit.

The cleaning system, further comprising a pressure regulator for regulating pressure of the water from the water source.

The disclosure is also directed to a method of injecting at least one of a cleaning solution or a sanitizing solution into a cleanable portion of a beverage dispenser, wherein determining the dilution ratio of the cleaning solution or the sanitizing solution to water comprises the steps of: (a) injecting the cleaning solution or the sanitizing solution into an incoming stream of the water to form a mixture, the mixture flowing through the cleanable portion of the beverage dispenser; (b) measuring the electrical conductivity (EC) of the mixture to provide an EC value; (c) converting the EC value to a measured dilution ratio (DR); and (d) using the resulting DR to determine a quantity of the cleaning solution or the sanitizing solution used during an automatic, periodic cleaning of the portion of the beverage dispenser.

The method, wherein determining the dilution ratio of the cleaning solution to the water further comprises the steps of: (a) obtaining an EC reading of a base-water used to produce the mixture; (b) converting the EC to a DR equivalent of the base-water; and (c) using the DR equivalent to correct the EC of the mixture to obtain a DR of the mixture.

The method, further comprising storing in a controller of the beverage dispenser the EC reading of the base-water.

The method, further comprising retrieving from a database an EC of the base-water at a particular location.

The method, wherein the database further comprises a series of EC values of base-water at a number of geographic locations for possible use of the beverage dispenser; and the EC value of the base water corresponding to a location of use of the beverage dispenser being selected as an operative EC value of the base water.

The method, wherein when the beverage dispenser is installed at a location not having an EC value of the base-water stored in the database, the EC value of the base water is measured by the beverage dispenser to determine a new EC value; and the new EC value is added to the database.

The method, wherein a quantity of the water in the mixture is measured by steps comprising: determining flow rate of the water used in the mixture; averaging the flow rate over an interval of time to determine an average flow rate; and multiplying the average flow rate by length of the interval of time.

The method, wherein a quantity of the water in the mixture is measured by steps comprising: determining flow rate of the water used in the mixture as a function of time during a time interval; and integrating the flow rate over the time interval.

The method, wherein a quantity of a cleaning solution or a sanitizing solution used in the mixture is determined by operating a pump that injects the cleaning solution or the sanitizing solution into the water.

The method, wherein speed of operation of the pump is controlled to determine a quantity of the cleaning solution or the sanitizing solution in the mixture.

The method, further comprises: (a) operating the pump at a significantly higher applied voltage than nominal to determine a high voltage dilution ratio; (b) measuring a total flow rate through the cleanable circuit; (c) calculating a high-voltage chemical flow rate by utilizing the total flow rate and the high voltage dilution ratio in a predefined equation; and (d) performing a dilution ratio normalization to convert the high-voltage chemical flow rate to a flow rate indicative of the pump operating at the nominal voltage, whereby unknown effects of the water quality on dilution ratio determination is minimized.

The disclosure is also directed to a computer readable medium comprising computer instructions thereon for causing a microprocessor associated with the beverage dispenser to perform the steps above.

The disclosure is also directed to a method for cleaning and sanitizing portions of a beverage dispenser comprising: sequentially rinsing with water of a series of cleanable ingredient circuits; spraying a blender assembly of the beverage dispenser with the water for a predetermined period of time sequentially cleaning or sanitizing with a mixture of water, and cleaning solution and/or a sanitizing solution the series of cleanable ingredient circuits; spraying the blender assembly with the mixture; allowing the blender assembly to soak with the mixture for a predetermined period of time; determining an electrical conductivity value of the mixture; and processing the electrical conductivity value to determine an adjustment to its value to account for a variation of the electrical conductivity, when the mixture is flowing.

The method, wherein the spraying of the blender comprises: moving the blender assembly to position a shaft of the blender assembly to be sprayed; and further moving the blender assembly to positioning a blade of the blender assembly to be sprayed.

The method further comprises preparing to deliver beverages after cleaning and/or sanitizing by priming the cleanable ingredient circuits with respective ingredients.

The method further comprises spraying a beverage stage area of the beverage dispenser with water.

The disclosure is further directed to a method of establishing a baseline strength of a chemical mixture flowing through a cleanable circuit of a beverage dispenser, comprising the steps of: allowing incoming water to flow through the cleanable circuit while measuring a total flow rate $Q_{tot}$, thereby obtaining a measured value of the total flow rate of the incoming water; providing a pump connected to the cleanable circuit that can pump a chemical into the incoming flowing water of the cleanable circuit, thereby creating the chemical mixture; calculating a required chemical flow rate $Q_{chem}$ value to achieve a desired value of dilution ratio (DR) by utilizing the desired value of DR and the measured value of the total flow rate $Q_{tot}$ in a predefined equation; determining from the required chemical flow rate $Q_{chem}$ value a required pump excitation voltage by performing at least one step selected from the group consisting of: an Equation-Based Pump Voltage Determination Step, and a Calibration-Based Pump Voltage Determination Step; and performing an EC Baselining Step on the cleanable circuit while the pump is activated at the required pump excitation voltage, and while the measured value is at the total flow rate $Q_{tot}$, whereby an $EC_{baseline}$ value, which is associated with a value of the desired value of DR is obtained, for use as a baseline strength for comparing cleaning EC measurements on at least one member of a cleanable circuit's flow-sharing cleanable circuit group.

The method can further comprise: allowing the incoming water to flow through the at least one member of the cleanable circuit's flow-sharing cleanable circuit group, the flow of the incoming water occurring during a predetermined period of time; activating the pump during the predetermined period of time, thereby creating the chemical mixture of the incoming flowing water and the chemical; and performing a Cleaning EC Measurement Step on the at least one member of the flow-sharing cleanable circuit group, whereby a cleaning EC ($EC_{clng}$) for the at least one member of the flow-sharing cleanable circuit group is obtained, thereby allowing for direct comparison with the $EC_{baseline}$ value.

The method can further comprise: obtaining Delta_EC by performing at least one step selected from the group consisting of: subtracting the $EC_{clng}$ from the $EC_{baseline}$, and subtracting the $EC_{baseline}$ from the $EC_{clng}$; providing a value of Slope_ECV, a predetermined approximate value of rate of change in EC per rate of change in pump voltage for the chemical and the at least one member of the flow-sharing cleanable circuit group; and dividing the Delta_EC by the Slope_ECV to obtain a DeltaV$_{theor}$, wherein the DeltaV$_{theor}$ provides an approximate value for an amount of pump voltage needed in order to return the chemical mixture to a desired strength.

The method can further comprise multiplying the DeltaV$_{theor}$ by an overshoot factor $F_{over}$, whereby a product represents a recommended voltage change in the pump's voltage that will improve the chemical mixture to the desired strength while lowering a possibility of exceeding the baseline value.

The method can further comprise: calculating a Delta_EC from the $EC_{clng}$ and the $EC_{baseline}$, and performing a Step for Determining Voltage Change to Improve Mixture Strength, wherein changing the pump's voltage by the recommended voltage change will produce a chemical mixture strength through the at least one member of the flow-sharing cleanable circuit group that is much closer to the desired strength for the at least one member of the flow-sharing cleanable circuit group.

The method can_further comprise: calculating a Ratio_EC from the $EC_{baseline}$ and the $EC_{clng}$, and performing a Step for Determining Voltage Change to Improve Mixture Strength, wherein adjusting the pump's voltage by the recommended voltage change produces the mixture strength through the at least one member of the flow-sharing cleanable circuit group that is much closer to the desired strength for the at least one member of the flow-sharing cleanable circuit group.

The disclosure is further directed to a method of establishing a baseline strength of a chemical mixture flowing through a cleanable circuit of a beverage dispenser, comprising the steps of: providing a flow controlling device in the cleanable circuit that maintains a total flow rate of incoming water at a constant value $Q_{tot}$; providing a pump, connected to the cleanable circuit, that can pump a chemical into the incoming flowing water of the cleanable circuit, thereby creating the chemical mixture; calculating a required chemical flow rate $Q_{chem}$ value to achieve a desired value of dilution ratio (DR) by utilizing the desired value of DR and the constant value of $Q_{tot}$ in a predefined equation; determining from the required chemical flow rate $Q_{chem}$ value a required pump excitation voltage by performing at least one step selected from the group consisting of: an Equation-Based Pump Voltage Determination Step, and a Calibration-Based Pump Voltage Determination Step; and performing an EC Baselining Step on the cleanable circuit while the pump is activated at the required pump excitation voltage, and while the total flow rate is at the constant value $Q_{tot}$, whereby an $EC_{baseline}$ value, which is associated with a value of the desired value of DR is obtained, for use as a baseline strength for comparing cleaning EC measurements on at least one member of a cleanable circuit's flow-sharing cleanable circuit group.

The method can further comprise: allowing the incoming water to flow through the at least one member of the cleanable circuit's flow-sharing cleanable circuit group, the flow of the incoming water occurring during a predetermined period of time; activating the pump during the predetermined period of time, thereby creating the chemical mixture of the incoming flowing water and the chemical; and performing a Cleaning EC Measurement Step on the at least one member of the flow-sharing cleanable circuit group, whereby a cleaning EC, $EC_{clng}$, for the at least one member of the flow-sharing cleanable circuit group is obtained, thereby allowing for direct comparison with the $EC_{baseline}$ value.

The method can further comprise: obtaining Delta_EC by performing at least one step selected from the group consisting of: subtracting the $EC_{clng}$ from the $EC_{baseline}$, and subtracting the $EC_{baseline}$ from the $EC_{clng}$; providing a value of Slope_ECV, a predetermined approximate value of rate of change in EC per rate of change in pump voltage for the chemical and the flow-sharing cleanable circuit group, and dividing the Delta_EC by the Slope_ECV to obtain a Delta $V_{theor}$, wherein the Delta$V_{theor}$ provides an approximate value for an amount of pump voltage needed in order to return the chemical mixture to a desired strength.

The method can further comprise multiplying the Delta $V_{theor}$ by an overshoot factor $F_{over}$, whereby a product represents a recommended voltage change in the pump's voltage that will improve the chemical mixture to the desired strength while lowering a possibility of exceeding the baseline value.

The method can further comprise: calculating a Delta_EC from the $EC_{clng}$ and the $EC_{baseline}$, and performing a Step for Determining Voltage Change to Improve Mixture Strength, wherein changing the pump's voltage by the recommended voltage change will produce a chemical mixture strength through the at least one member of the flow-sharing cleanable circuit group that is much closer to the desired strength for the at least one member of the flow-sharing cleanable circuit group.

The method can further comprise: calculating a Ratio_EC from the $EC_{baseline}$ and the $EC_{clng}$, and performing a Step for Determining Voltage Change to Improve Mixture Strength, wherein adjusting the pump's voltage by the recommended voltage change produces the mixture strength through the at least one member of the flow-sharing cleanable circuit group that is much closer to the desired strength for the at least one member of the flow-sharing cleanable circuit group.

The method can further comprise measuring an EC of the incoming flowing water while the pump is not activated, whereby a baseline EC value, $E_{CH2O,b-line}$, of the incoming flowing water is obtained for EC comparison.

The method can further comprise: allowing the incoming water to flow through the at least one member of the cleanable circuit's flow-sharing cleanable circuit group during a predetermined period of time, while the pump is not activated; and measuring the EC of the incoming flowing water, wherein a measured value of the incoming flowing water's EC is compared to the $EC_{H2O,b-line}$, thereby determining if a water quality change has occurred since EC Baselining was performed.

A computer readable medium comprising computer instructions thereon for causing a microprocessor associated with the beverage dispenser to perform the steps of establishing the baseline strength of the chemical mixture flowing through the cleanable circuit of the beverage dispenser as set forth above.

The method is further directed to a method of establishing a baseline strength of a chemical mixture flowing through a cleanable circuit of a beverage dispenser, the method implemented by a computing device comprising a processor and a memory comprising computer readable instructions for causing the processor to execute the steps of: allowing incoming water to flow through the cleanable circuit while measuring a total flow rate $Q_{tot}$, thereby obtaining a measured value of the total flow rate of the incoming water; providing a pump connected to the cleanable circuit that can pump a chemical into the incoming flowing water of the cleanable circuit, thereby creating the chemical mixture; calculating a required chemical flow rate $Q_{chem}$ value to achieve a desired value of dilution ratio (DR) by utilizing the desired value of DR and the measured value of the total flow rate $Q_{tot}$ in a predefined equation; determining from the required chemical flow rate $Q_{chem}$ value a required pump excitation voltage by performing at least one step selected from the group consisting of: an Equation-Based Pump Voltage Determination Step, and a Calibration-Based Pump Voltage Determination Step; and performing an EC Baselining Step on the cleanable circuit while the pump is activated at the required pump excitation voltage, and while the measured value is at the total flow rate $Q_{tot}$, whereby an $EC_{baseline}$ value, which is associated with a value of the desired value of DR is obtained, for use as a baseline strength for comparing cleaning EC measurements on at least one member of a cleanable circuit's flow-sharing cleanable circuit group.

The method is also directed to a method of establishing a baseline strength of a chemical mixture flowing through a cleanable circuit of a beverage dispenser, the method implemented by a computing device comprising a processor and a memory comprising computer readable instructions for causing the processor to execute the steps of: providing a flow controlling device in the cleanable circuit that maintains a total flow rate of incoming water at a constant value $Q_{tot}$; providing a pump, connected to the cleanable circuit, that can pump a chemical into the incoming flowing water of the cleanable circuit, thereby creating the chemical mixture; calculating a required chemical flow rate $Q_{chem}$ value to achieve a desired value of dilution ratio (DR) by utilizing the desired value of DR and the constant value of $Q_{tot}$ in a predefined equation; determining from the required chemical flow rate $Q_{chem}$ value a required pump excitation voltage by performing at least one step selected from the group consisting of: an Equation-Based Pump Voltage Determination Step, and a Calibration-Based Pump Voltage Determination Step; and performing an EC Baselining Step on the cleanable circuit while the pump is activated at the required pump excitation voltage, and while the total flow rate is at the constant value $Q_{tot}$, whereby an $EC_{baseline}$ value, which is associated with a value of the desired value of DR is obtained, for use as a baseline strength for comparing cleaning EC measurements on at least one member of a cleanable circuit's flow-sharing cleanable circuit group.

The above and other objects, features, and advantages of the present disclosure will be apparent and understood by those skilled in the art from the following detailed description, drawings, and accompanying claims. As shown throughout the drawings, like reference numerals designate like or corresponding parts.

BRIEF DESCRIPTION OF THE DRAWINGS

FIGS. 17A and 17B when assembled with FIG. 17A to the left and FIG. 17B to the right, constitute FIG. 17 and is a plumbing schematic of a sanitation system of the beverage dispenser that can be used with the cleaning assembly of FIG. 1, and further illustrating the control system, wherein the processor is shown to control the valves, pumps, containers of the rinsing, cleaning and/or sanitizing of the beverage dispenser, as well as beverage dispensing.

FIG. 18 is a flowchart of a method of establishing a baseline strength of a chemical mixture flowing through a cleanable circuit of a beverage dispenser that can be used with the cleaning assembly of FIG. 1 having some features omitted for clarity and shown in an alternative embodiment.

FIG. 19 is a flowchart of a method of establishing a baseline strength of a chemical mixture flowing through a cleanable circuit of a beverage dispenser that can be used with the cleaning assembly of FIG. 1 having some features omitted for clarity and shown in an alternative embodiment.

FIGS. 20A and 20B when assembled with FIG. 20A to the left and FIG. 20B to the right, constitute FIG. 20 and is a chart of a beverage dispenser with a cleaning system and a pump utilizing a priming Stera-Sheen cleaner solution that can be used with the cleaning assembly of FIG. 1 having some features omitted for clarity and shown in an alternative embodiment.

DETAILED DESCRIPTION OF THE DISCLOSURE

Figure 1:
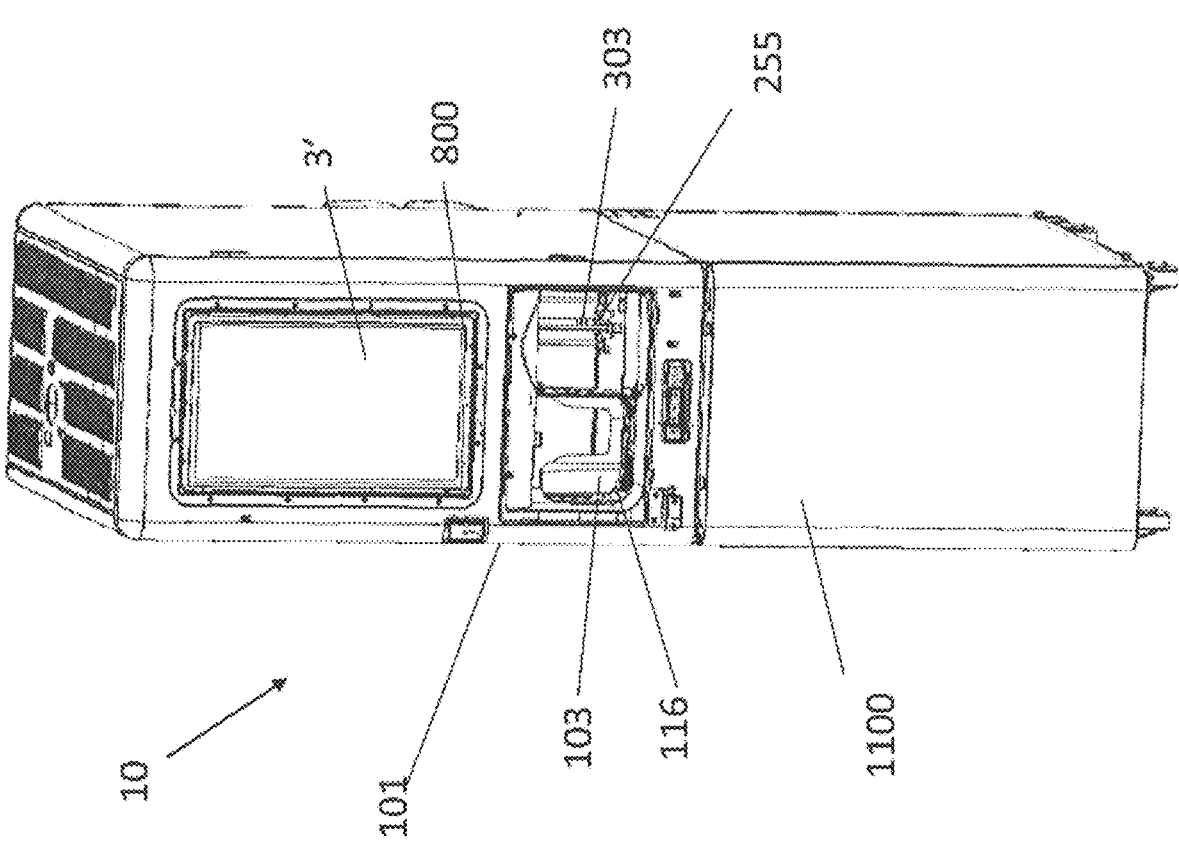
FIG. 1 is a top, front perspective view of a beverage dispenser that can be used with a cleaning assembly according to the present disclosure.

A beverage dispenser generally represented by reference numeral 10 of the present disclosure is shown in FIG. 1. Beverage dispenser 10 blends and/or mixes beverage ingredients in a cup, thereby producing a beverage, e.g., a smoothie, which can then be served to a consumer allowing the consumer to drink the beverage from the same cup that the beverage ingredients were blended and/or mixed in. Beverage dispenser 10 includes plumbing to direct flows of liquid ingredients to the cup. It also includes numerous mechanical parts and surfaces that assist in the production of the drink (e.g., blender assembly, dispense nozzle, drink shuttle). It is desirable to clean flow paths of the plumbing and other mechanical parts and surfaces to maintain cleanliness and safety of beverage dispenser 10. Advantageously, beverage dispenser 10 has a cleaning system that cleans the flow paths of the plumbing and mechanical parts and surfaces with cleaning and/or sanitizing liquids. The cleaning system can be configured to automatically clean the aforementioned areas periodically, once supplied with the cleaning and/or sanitizing liquids.

Beverage dispenser 10 has a system that can be integrated with separate external containers, and includes a flavor/ingredient dispensing module 1100, an ice making, and portion control module (not shown) housed in a housing 101, a blender/mixer/cleaner module 303 and a user interface 3'. Flavor/ingredient dispensing module 1100 includes one or more containers, e.g., bag-in-box containers, that each hold ingredients, for example, flavored liquid ingredients, which are delivered to a nozzle assembly 1102 (FIG. 2) by pump(s) to dispense the ingredients into the cup. Ice making and portion control module (not shown) makes ice and delivers the ice to the cup through nozzle assembly 1102. Blender/mixer/cleaner module 303 includes a blender blade 255 to mix and/or blend the ingredients and/or ice in the cup. Blender/mixer/cleaner module 303 also includes a nozzle 59 (FIG. 4) to rinse blender blade 255 after blending and/or mixing.

Beverage dispenser 10 can include an onboard ice maker, ice storage and portion control module (not shown), a flavor/ingredient dispensing module 1100, a blender module 303, blender/mixer/cleaner module 15 and a user interface 3 similar to U.S. Pat. No. 8,459,176, filed Dec. 8, 2009, that is hereby incorporated by reference in its entirety. Alternatively, beverage dispenser 10 can include an onboard ice maker (not shown), ice storage and portion control module (not shown), a flavor/ingredient dispensing module 1100, a blender/mixer/cleaning module 303, control panel 500 similar to U.S. Pat. No. 8,863,992, filed Oct. 5, 2012 that is hereby incorporated by reference in its entirety, or other ice makers, ice storage and portion control modules, flavor/ingredient dispensing modules, blender modules, blender/mixer/cleaner modules and/or user interfaces of similar beverage dispensers or devices know in the art.

Figure 2:
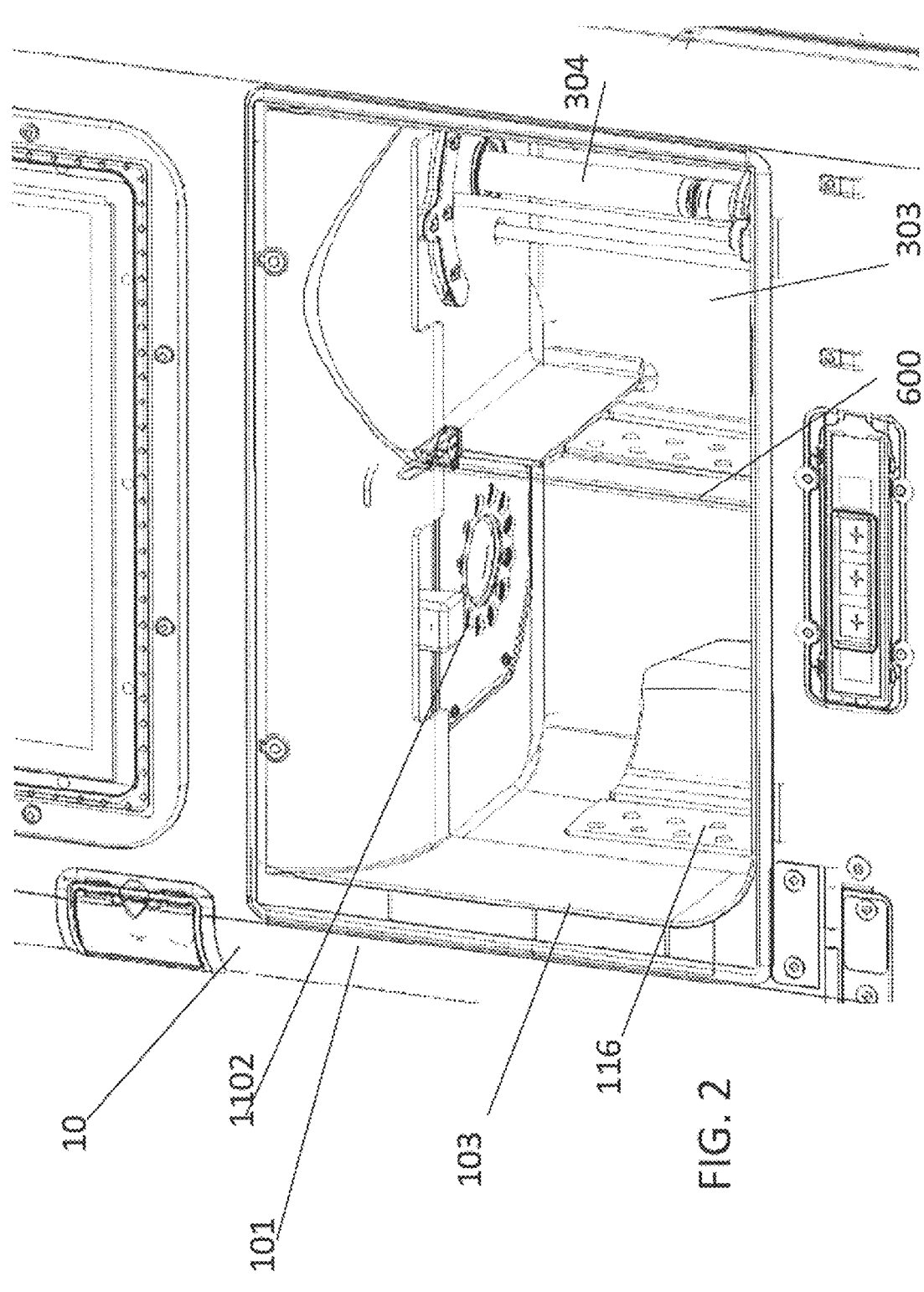
FIG. 2 is an enlarged bottom, front perspective view of the beverage dispenser that can be used with the cleaning assembly of FIG. 1.
Figure 3:
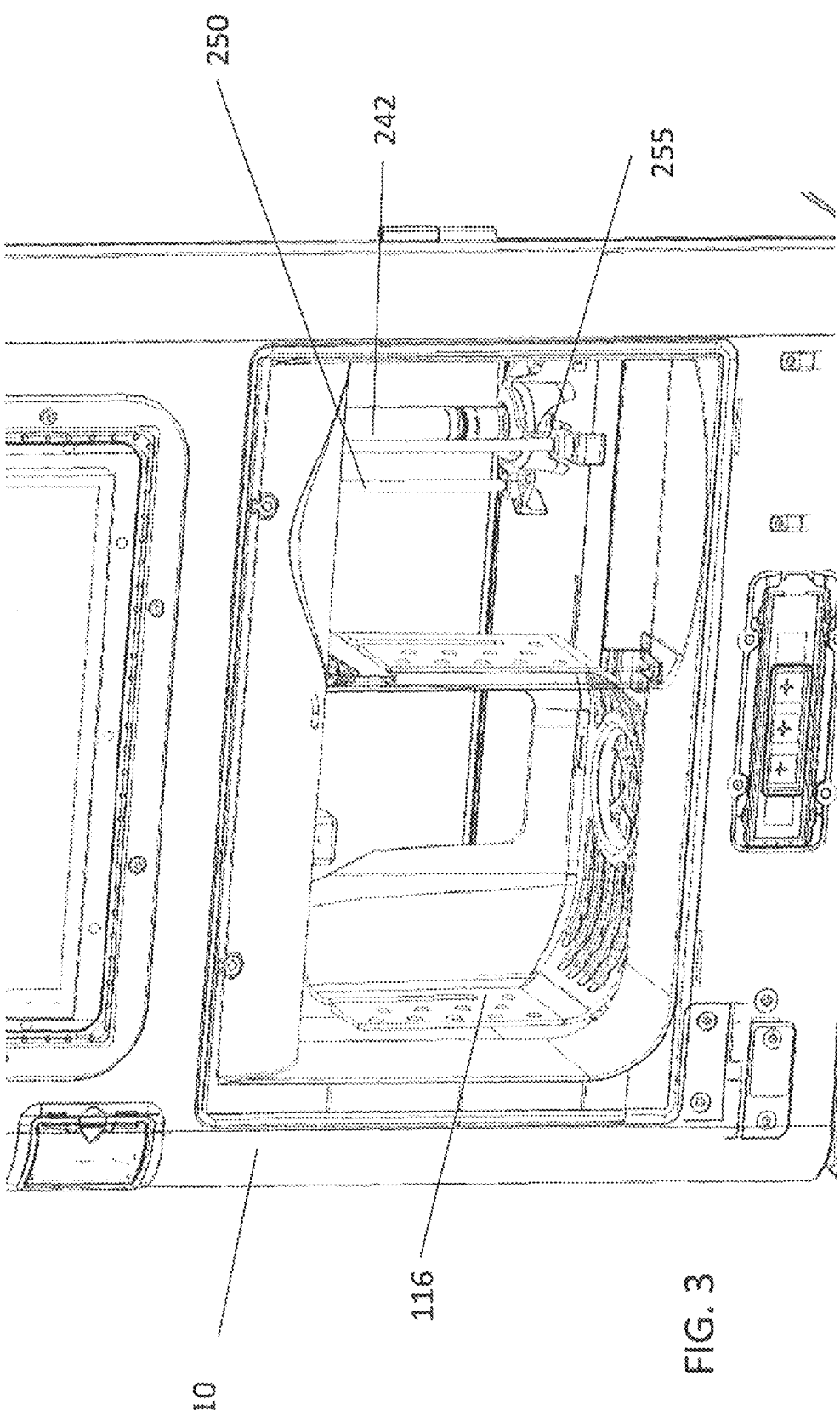
FIG. 3 is an enlarged top, front perspective view of the beverage dispenser that can be used with the cleaning assembly of FIG. 1.
Figure 4:
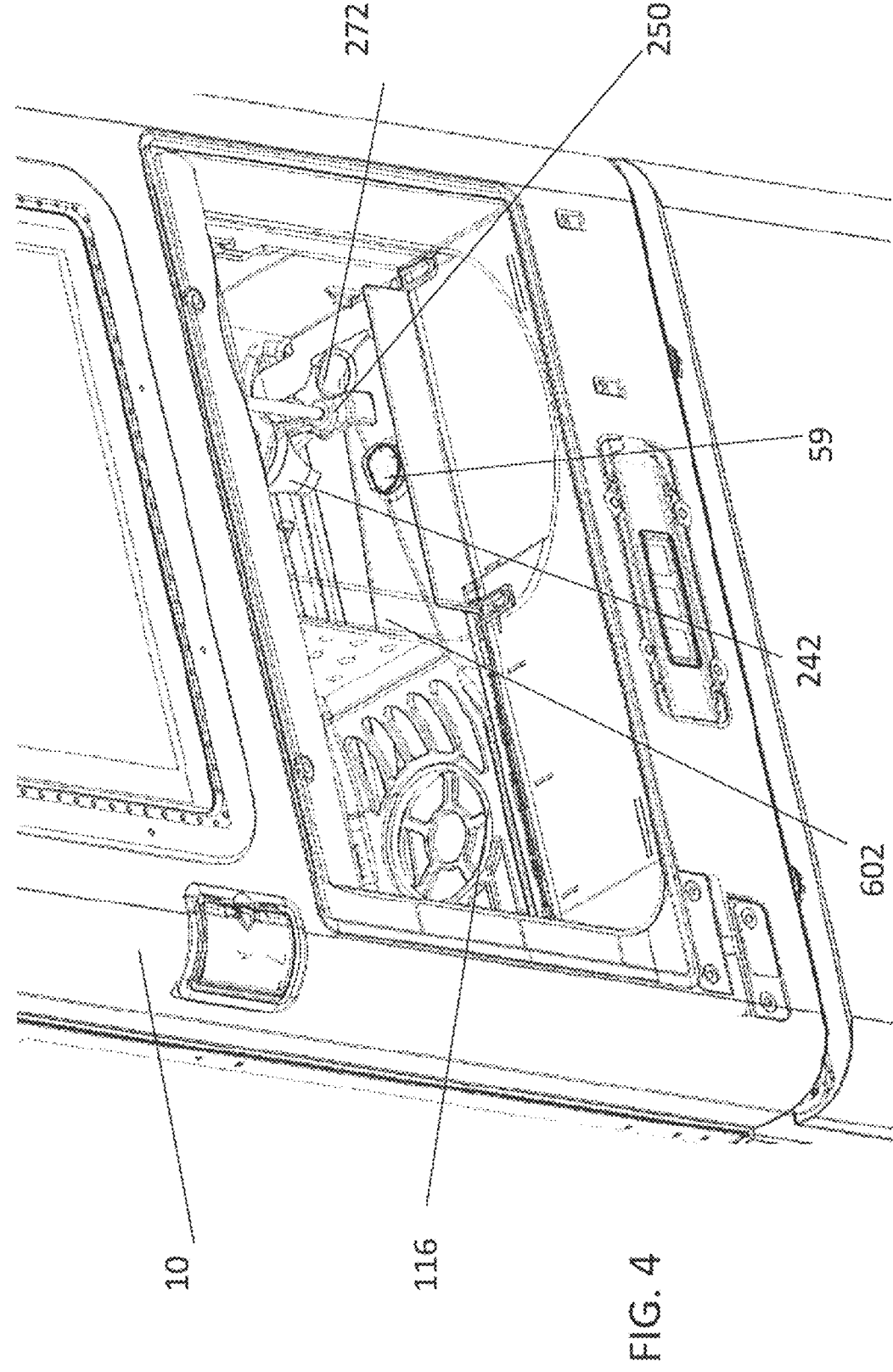
FIG. 4 is an enlarged top, side perspective view of the beverage dispenser that can be used with the cleaning assembly of FIG. 1.

Referring to FIG. 2, in operation, an empty cup is placed through an opening 103 in housing 101 and placed on a surface of a shuttle 116. The cup receives ingredients and ice through nozzle assembly 1102 while positioned on shuttle 116. Blender/mixer/cleaner module 303 has a front wall 600 covering a portion of front opening 103 forming a first opening 602 on a side of front wall 600 as shown in FIG. 4. After the cup receives the ingredients and ice, the cup is moved by shuttle 116 from below nozzle assembly 1102, as shown in FIG. 2, through first opening 602, to blender/mixer/cleaner module 303 so that shuttle 116 positions the cup under blender blade 255 as shown in FIG. 3. Blender/mixer/cleaner module 303 has blender blade 255 that is connected to a spindle assembly 242. Spindle assembly 242 includes a shaft to connect blender blade 255 to a mixer motor (not shown) that spins blender blade 255. Spindle assembly 242 passes through a support assembly 250. Support assembly 250 contacts the cup during blending and/or mixing to maintain the cup's position and prevent rotation of the cup. During operation, after cup is moved by shuttle 116 from beneath nozzle assembly 1120 to blender/mixer/cleaner module 303, support assembly 250 and spindle assembly 242 are moved towards the cup from an initial position. Once support assembly 250 contacts the cup, spindle assembly 242 can continue to move blender blade 255 in the cup while support assembly 250 is maintained in position on a rim of the cup to hold the cup in place. The mixer motor rotates blender blade 255 in the cup. After blending/mixing is complete, spindle assembly 242 and support assembly 250 are moved away from the cup back to the initial position and the cup is moved by shuttle 116 back to below nozzle assembly 1102 where a user can remove the cup having the completed beverage for consumption.

Referring to FIG. 4, after shuttle 116 is positioned back below nozzle assembly 1102, spindle assembly 242 and support assembly 250 are lowered toward a bottom portion of blender/mixer/cleaner module 303 where water is sprayed at spindle assembly 242 and support assembly 250 from a nozzle 59 for cleaning. The water that rinses spindle assembly 242 and support assembly 250 then drains out of drain 272. After rinsing, spindle assembly 242 and support assembly 250 are moved to the initial position. Another beverage can then be prepared by beverage dispenser 10.

Figure 5:
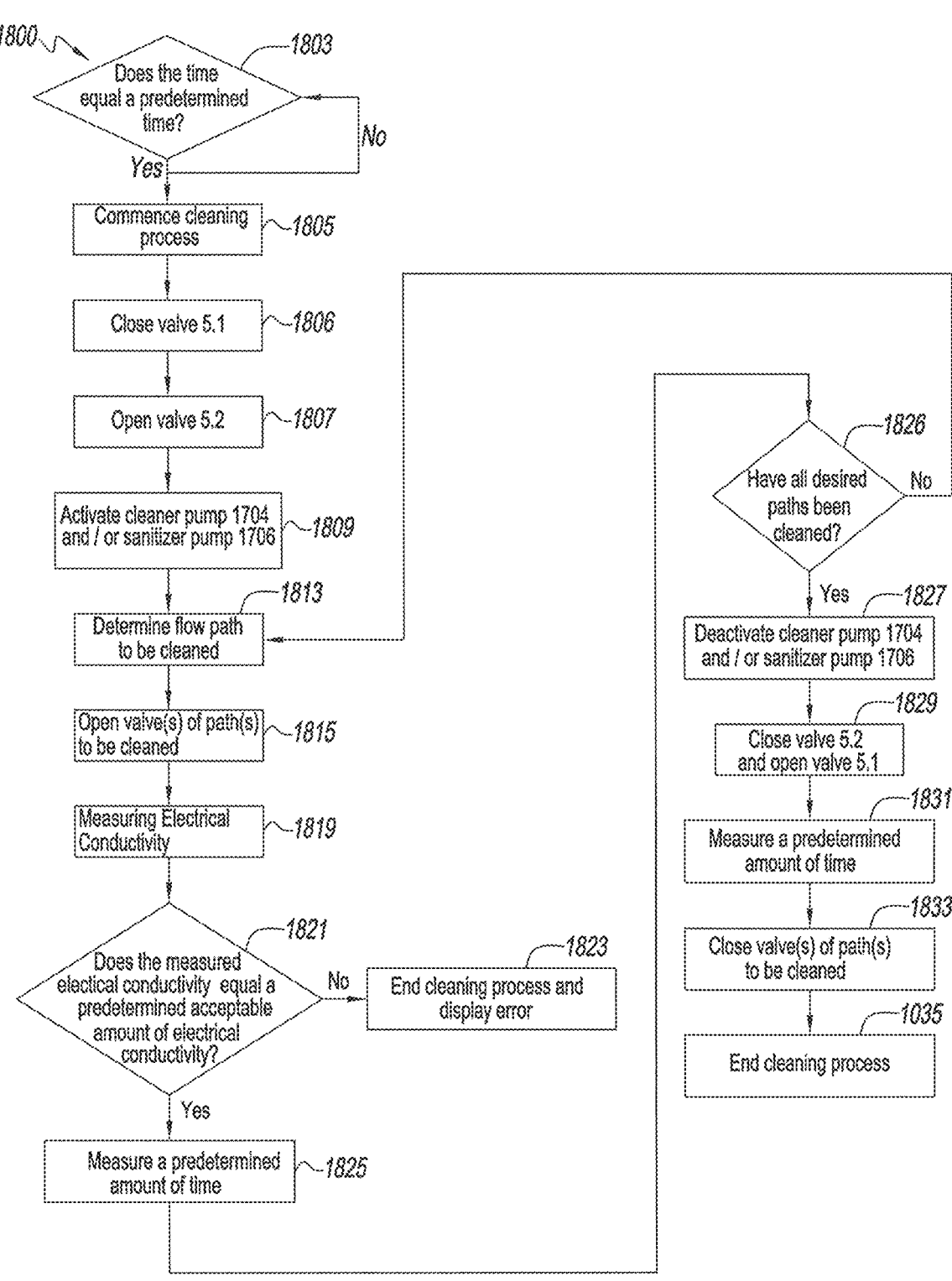
FIG. 5 is a flow chart of a cleaning and/or sanitizing process of the beverage dispenser that can be used with the cleaning assembly of FIG. 1 and shown in FIG. 6, and FIGS. 11-17.
Figure 12:
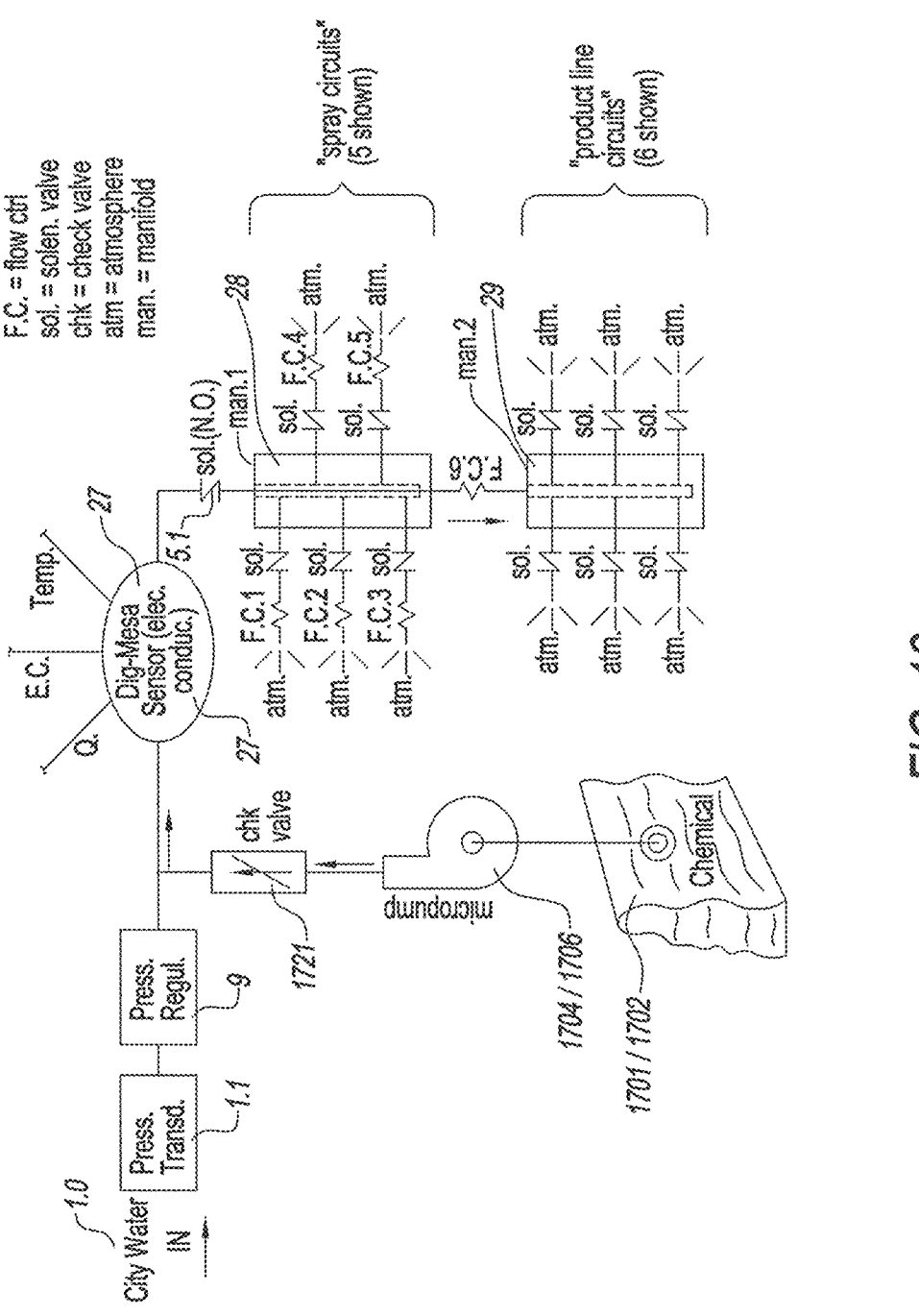
FIG. 12 is a diagram of a sanitation system of the beverage dispenser that can be used with the cleaning assembly of FIG. 1 having some features omitted for clarity and shown in an alternative embodiment.
Figure 13:
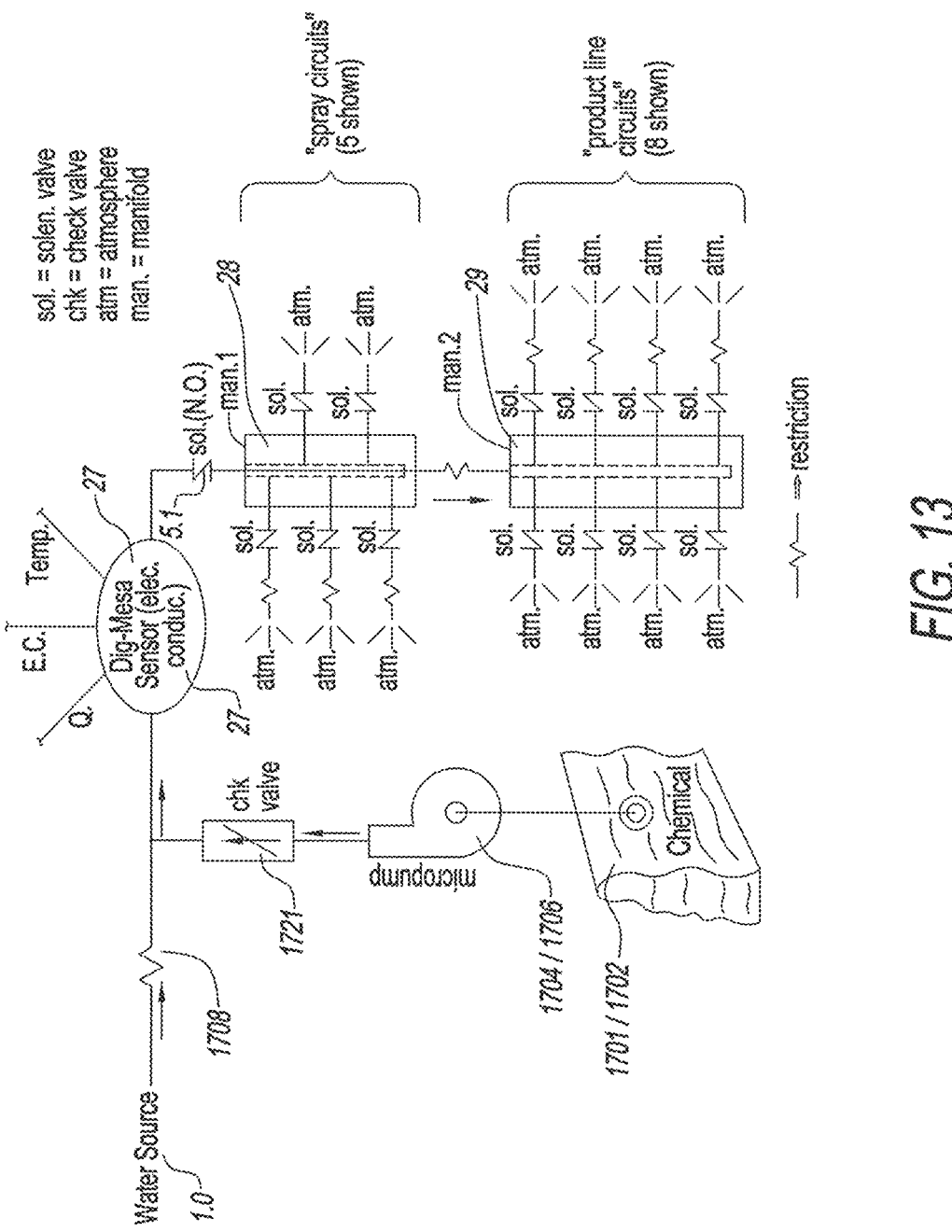
FIG. 13 is a diagram of a sanitation system of the beverage dispenser that can be used with the cleaning assembly of FIG. 1 having some features omitted for clarity and shown in an alternative embodiment.
Figure 14:
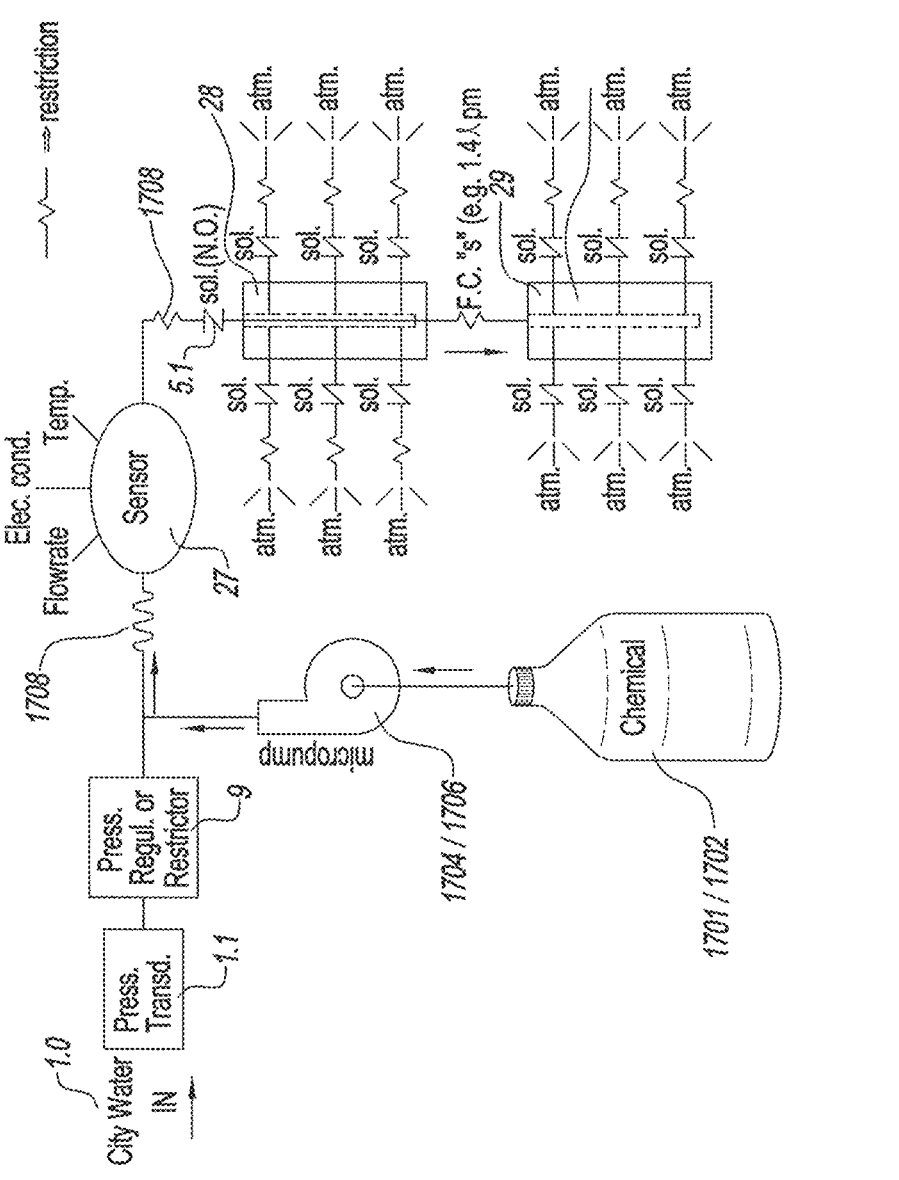
FIG. 14 is a diagram of a sanitation system of the beverage dispenser that can be used with the cleaning assembly of FIG. 1 having some features omitted for clarity and shown in an alternative embodiment.
Figure 15:
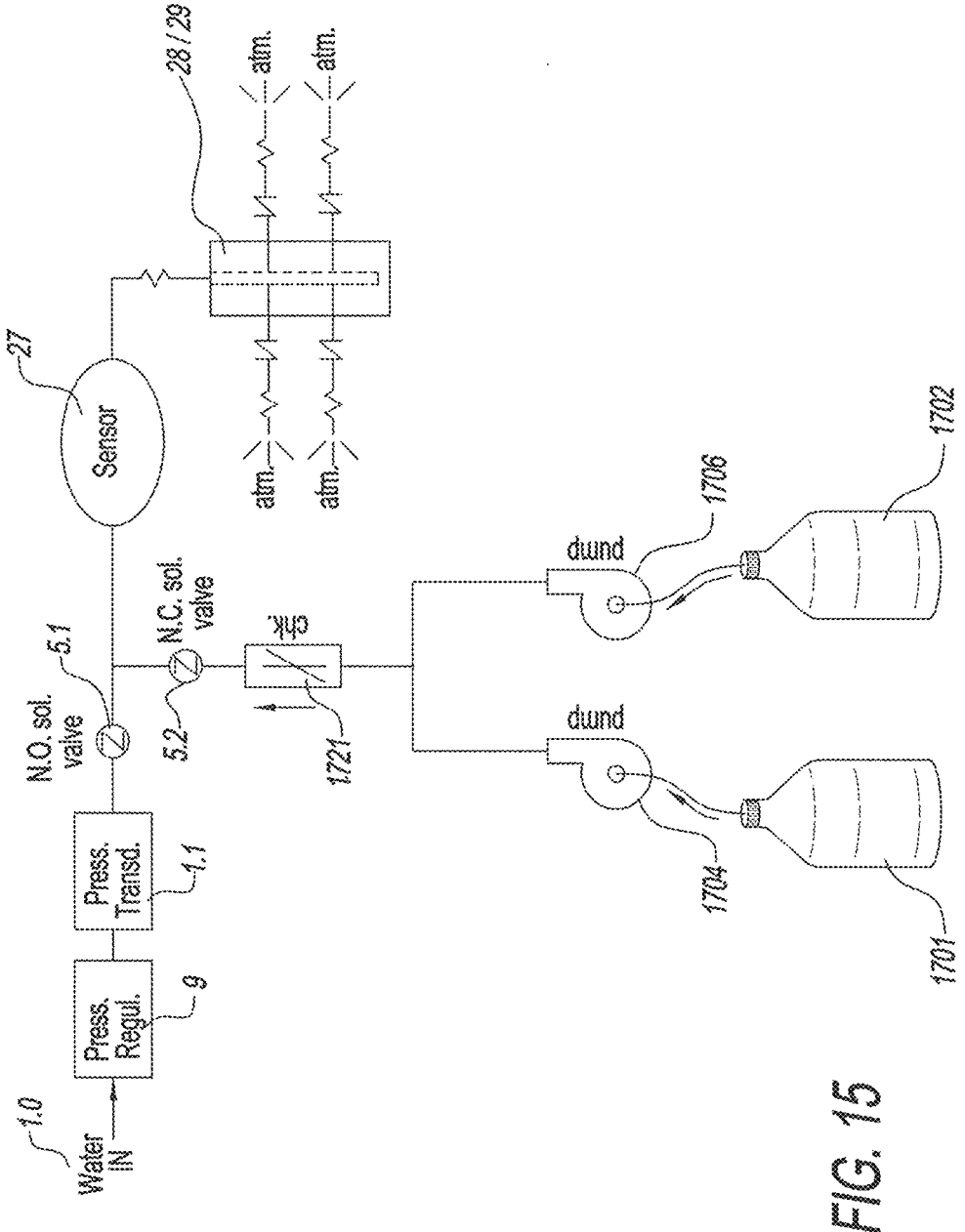
FIG. 15 is a diagram of a sanitation system of the beverage dispenser that can be used with the cleaning assembly of FIG. 1 having some features omitted for clarity and shown in an alternative embodiment.
Figure 16:
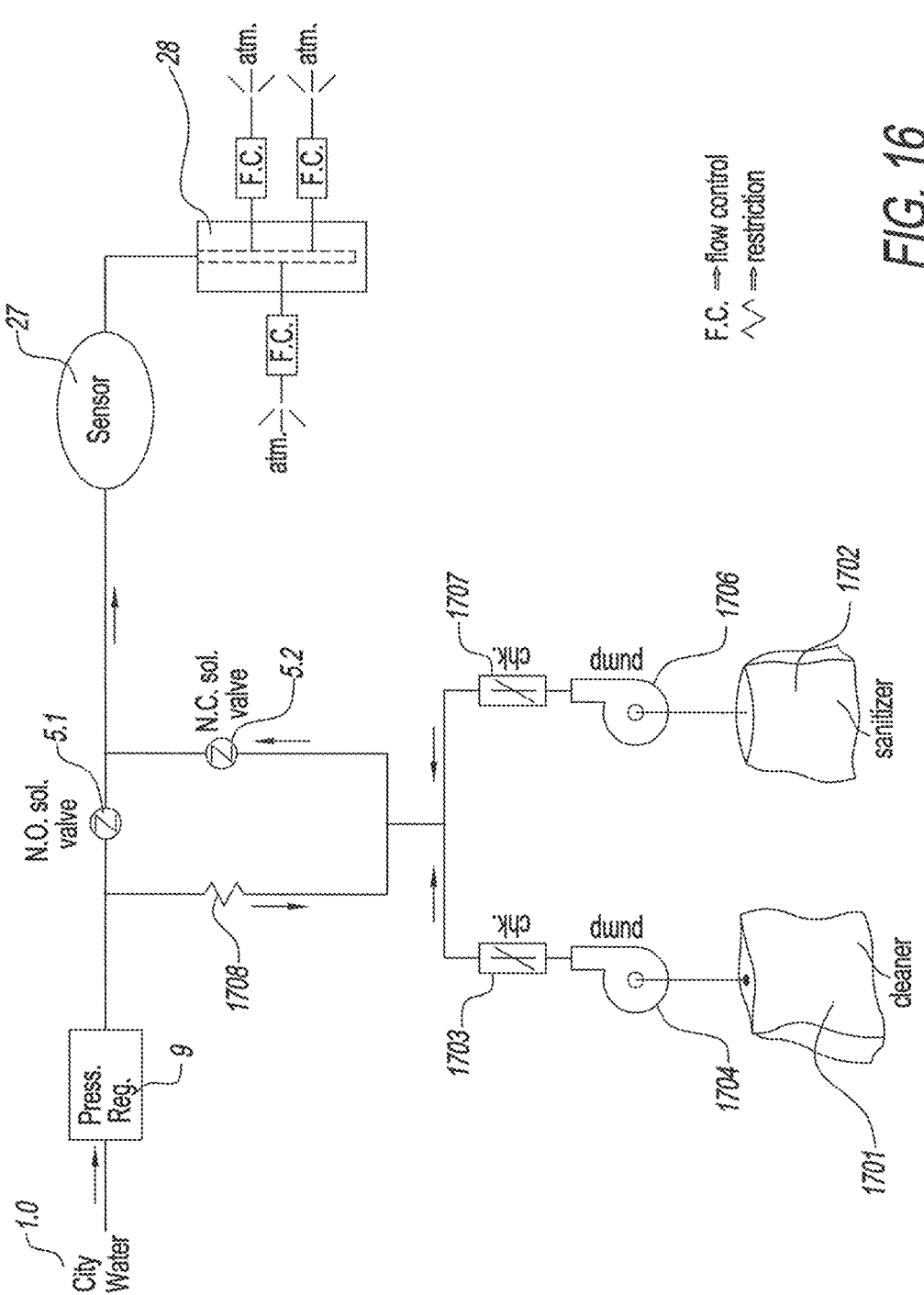
FIG. 16 is a diagram of a sanitation system of the beverage dispenser that can be used with the cleaning assembly of FIG. 1 having some features omitted for clarity and shown in an alternative embodiment.

Referring to FIG. 5, controller 800 is programmed to periodically clean and/or sanitize the flow paths of the plumbing of beverage dispenser 10 for the plumbing schematic of FIGS. 7B and 12 by commencing a cleaning and/or sanitizing process 1800. When controller 800 determines it is a predetermined time in step 1803, then controller 800 commences the cleaning and/or sanitizing process in step 1805. When controller 800 determines it is not a predetermined time in step 1803, then controller 800 repeats step 1803. After the cleaning and/or sanitizing process commences in step 1805, then valve 5.1 is closed in step 1806, then valve 5.2 is opened in step 1807 and cleaner pump 1704 and/or sanitizer pump 1706 are activated in step 1809 so that cleaner flows from cleaner container 1701 through cleaner pump 1704, check valve 23 and/or check valve 1703 and first opening 133 and second opening 133a of wye fitting 22 and/or sanitizer flows from sanitizer container 1702 through sanitizer pump 1706, check valve 23 (and/or check valve 1707) and first opening 133 and third opening 133b of wye fitting 22 to mix with water flowing from water source 1.0 through coupling 1, pressure transducer 1.1 and pressure changing device 1708 to form diluted cleaner and/or diluted sanitizer. Controller 800, then, determines a path or paths of the plumbing of beverage dispenser 10 that are to be cleaned in step 1813 that is the same as step 1013 of process 1001 and opens valves associated with those path or paths in step 1815 that is the same as step 1015 of process 1001. Combination sensor 27 can measure the electrical conductivity in step 1819 that is communicated to controller 800. Controller 800 determines whether a predetermined acceptable amount of electrical conductivity is present that is related to whether a desired amount of cleaner and/or sanitizer is mixed with the water flow in step 1821. For example, combination sensor 27 measures a conductivity of the water without cleaner and/or sanitizer to determine a value that can then be compared with a measurement of the conductivity of the water mixed with the cleaner and/or sanitizer to determine if the measured conductivity of the water mixed with the cleaner and/or sanitizer is in a predetermined range of conductivity that is desirable. If there is not the desired amount of cleaner and/or sanitizer mixed with the water flow, then the cleaning and/or sanitizing process 1800 proceeds to step 1823 where controller 800 ends the cleaning process, for example, by deactivating cleaner pump 1704 and/or sanitizer pump 1706, closing valve 5.2 and closing the paths being cleaned, and communicates an error to a user, for example, through user interface 3'. Alternatively, instead of ending the cleaning process in step 1823, controller 800 can instead immediately change the voltage to cleaner pump 1704 and/or sanitizer pump 1706 to try and achieve the desired amount of cleaner and/or sanitizer mixed with the water flow, and, then process can proceed to step 1825. Still another alternative is that this activity is only done occasionally, or only after a new chemical container is installed. If it is done just once (to account for different "concentration" or makeup of chemical, for example), then it is assumed that any subsequent drop-off is due to the container going empty. If/when this process is done, it obviously works both ways, the voltage will be either increased or decreased to try and hit a target dilution ratio, namely, the desired amount of cleaner and/or sanitizer mixed with the water flow. If there is the desired amount of cleaner and/or sanitizer mixed with the water flow, then the cleaning and/or sanitizing process 1800 proceeds to step 1825 where the diluted cleaner and/or the diluted sanitizer is allowed to flow for a predetermined amount of time through the flow paths determined in step 1813. After controller 800 determines that the predetermined amount of time elapsed, then the cleaning and/or sanitizing process 1800 proceeds to determine if all the desired flow paths have been cleaned in step 1826, if the answer is yes, then cleaner pump 1704 and/or sanitizer pump 1706 are deactivated in step 1827. However, if the answer is no, the cleaning and/or sanitizing process 1800 proceeds to repeat again from step 1813, to ensure all flow paths have been cleaned and/or sanitized before proceeding on to the deactivation of cleaner pump 1704 and/or sanitizer pump 1706. Thereafter, valve 5.2 is closed and valve 5.1 is opened in step 1829. Controller 800 can allow the water flow to flow through one or more of the selected valves of openings 28c-28h and openings 29b-29i for a predetermined amount of time in step 1831 prior to closing the paths to be cleaned in step 1833. Controller 800 then ends the cleaning process in step 1835. There can be several "loops" in the cleaning cycles so that cleaning and/or sanitizing process 1800 is repeated for different path or paths of the plumbing of beverage dispenser 10 that are to be cleaned in step 1813 and opens different valves associated with those path or paths in step 1815 by controller 800 for the different loops. For example, one or more of plumbing paths that dispense the liquid ingredients where controller 800 opens the valve of one or more of openings 29b-i can be cleaned first and then everything else is cleaned afterwards to try and ensure that as much product is removed from the stage area and drain area by using the water and cleaner dispensed from the other outlets.

Manifold Valve(s) Open ("MVO"), is defined as one or more "outlet" solenoid valves of 28 or 29 open. The following descriptions assume an MVO state.

An example of steps for a process for daily cleaning of beverage dispenser 10 as controlled by controller 800 is as follows:

Shuttle 116 moves to a position under blender blade 255 in a blend (right) position.

Cleaner solenoid valve 17a that is normally closed, water solenoid valve 5.2 that is normally closed, and valve 5.1 that is normally open are turned ON to open cleaner solenoid valve 17a and solenoid valve 5.2 and close valve 5.1.

The solenoid valve of opening 28g for nozzles 54 and 56 of dispense area is turned on for six seconds to spray the dispense area.

Blender shaft 304 of spindle assembly 242 descends to near bottom of stroke as shown in FIG. 1

The blender blade spray solenoid valve of opening 28d turns ON for four (4) seconds to spray blender blade 255 with nozzle 59.

The blender shaft rinse solenoid valve of opening 28f turns ON for four (4) seconds to spray blender shaft 304 of spindle assembly 242 with nozzles 57.

The blender blade spray solenoid valve of opening 28d turns ON for four (4) seconds to spray blender blade 255 with nozzle 59.

The blender shaft rinse solenoid valve of opening 28f turns ON for four (4) seconds to spray blender shaft 304 of spindle assembly 242 with nozzles 57.

Blender shaft 304 of spindle assembly 242 then ascends to its top position.

Cleaner solenoid valve 17a that is normally closed, water solenoid valve 5.2 that is normally closed, and valve 5.1 that is normally open are turned off to close cleaner solenoid valve 17a and solenoid valve 5.2 and open valve 5.1.

The solenoid valve of opening 28g for nozzles 54 and 56 of dispense area is turned on for ten seconds to spray the dispense area.

Shuttle 116 moves to a dispense (left) position as shown in FIG. 1.

The blender shaft rinse solenoid valve of opening 28f turns ON to spray blender shaft 304 of spindle assembly 242 with nozzles 57.

Blender shaft 304 of spindle assembly 242 descends to near bottom of stroke as shown in FIG. 1.

The blender shaft rinse solenoid valve of opening 28f turns OFF after five seconds.

The blender blade spray solenoid valve of opening 28d turns ON for ten seconds.

Blender shaft 304 of spindle assembly 242 ascends to its top position.

Shuttle 116 moves to a position under blender blade 255 in a blend (right) position.

Sanitizer solenoid valve 17b that is normally closed, water solenoid valve 5.2 that is normally closed, and valve 5.1 that is normally open are turned ON to open sanitizer solenoid valve 17b and solenoid valve 5.2 and close valve 5.1.

The solenoid valve of opening 28g for nozzles 54 and 56 of dispense area is turned on for six seconds to spray the dispense area.

Blender shaft 304 of spindle assembly 242 descends to near bottom of stroke as shown in FIG. 1.

The blender blade spray solenoid valve of opening 28d turns ON for five seconds to spray the blender blade 255 with nozzle 59.

The blender shaft rinse solenoid valve of opening 28f turns ON for ten seconds to spray blender shaft 304 of spindle assembly 242 with nozzles 57.

The blender blade spray solenoid valve of opening 28d turns ON for four seconds to spray the blender blade 255 with nozzle 59.

Blender shaft 304 of spindle assembly 242 begins moving upwards at the same time the blender shaft rinse solenoid valve of opening 28*f* turns ON to spray blender shaft 304 of spindle assembly 242 with nozzles.

Blender shaft 304 of spindle assembly 242 stops halfway up for four seconds, in direct path of ongoing shaft spray from blender shaft rinse solenoid valve of opening 28*f* that is turned ON to spray blender shaft 304 of spindle assembly 242 with nozzles 57.

Blender shaft 304 of spindle assembly 242 reaches the top position, at which point blender shaft rinse solenoid valve of opening 28*f* turns off.

The solenoid valve of opening 28*g* for nozzles 54 and 56 of dispense area turns ON for nine seconds to spray the dispense area.

Shuttle 116 moves to the dispense (left) position as shown in FIG. 1.

The blender blade spray solenoid valve of opening 28*d* and the blender shaft rinse solenoid valve of opening 28*f* turn ON simultaneously for twelve seconds.

The solenoid valve of opening 28*g* for nozzles 54 and 56 of dispense area is turned on for twelve seconds to spray the dispense area.

The blender blade spray solenoid valve of opening 28*d* and the blender shaft rinse solenoid valve of opening 28*f* turn ON simultaneously for twelve seconds.

The solenoid valve of opening 28*g* for nozzles 54 and 56 of dispense area is turned on for twelve seconds to spray the dispense area.

It is noted that the last four steps are part of an extra cautionary "Final Rinse", to ensure the stage area is totally free of beverage product. It also occurs at the end of Weekly Cleaning, where it is probably more valuable (since all the product lines are flushed out during weekly cleaning).

An example of steps for a process for weekly cleaning of beverage dispenser 10 as controlled by controller 800 is as follows:

Shuttle 116 moves to a position under blender blade 255 in a blend (right) position.

The solenoid valve of opening 28*g* for nozzles 54 and 56 of dispense area that is normally closed is turned ON to open the solenoid valve of opening 28*g*.

The solenoid valve of opening 29*b* for Product Line 1 turns ON for twenty seconds to rinse Product Line 1, then the solenoid valve of opening 29*b* for Product Line 1 turns OFF.

The solenoid valve of opening 29*c* for Product Line 2 turns ON for twenty seconds to rinse Product Line 2, then the solenoid valve of opening 29*c* for Product Line 2 turns OFF.

The solenoid valve of opening 29*d* for Product Line 3 turns ON for twenty seconds to rinse Product Line 3, then the solenoid valve of opening 29*d* for Product Line 3 turns OFF.

The solenoid valve of opening 29*e* for Product Line 4 turns ON for twenty seconds to rinse Product Line 4, then the solenoid valve of opening 29*e* for Product Line 4 turns OFF.

The solenoid valve of opening 29*f* for Product Line 5 turns ON for twenty seconds to rinse Product Line 5, then the solenoid valve of opening 29*f* for Product Line 5 turns OFF.

The solenoid valve of opening 29*g* for Product Line 6 turns ON for twenty seconds to rinse Product Line 6, then the solenoid valve of opening 29*g* for Product Line 6 turns OFF.

The solenoid valve of opening 29*h* for Product Line 7 turns ON for twenty seconds to rinse Product Line 7, then the solenoid valve of opening 29*h* for Product Line 7 turns OFF.

The solenoid valve of opening 29*i* for Product Line 8 turns ON for twenty seconds to rinse Product Line 8, then the solenoid valve of opening 29*i* for Product Line 8 turns OFF.

After the Product Line 8 is flushed, the solenoid valve of opening 28*g* for nozzles 54 and 56 of dispense area that is normally closed is turned OFF.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* turns ON for five seconds.

The blender shaft rinse solenoid valve of opening 28*f* turns ON after five seconds.

Cleaner solenoid valve 17*a* that is normally closed, water solenoid valve 5.2 that is normally closed, and valve 5.1 that is normally open are turned ON to open cleaner solenoid valve 17*a* and solenoid valve 5.2 and close valve 5.1.

The solenoid valve of opening 29*b* for Product Line 1 turns ON for fifteen seconds to clean Product Line 1, then the solenoid valve of opening 29*b* for Product Line 1 turns OFF.

The solenoid valve of opening 29*c* for Product Line 2 turns ON for fifteen seconds to clean Product Line 2, then the solenoid valve of opening 29*c* for Product Line 2 turns OFF.

The solenoid valve of opening 29*d* for Product Line 3 turns ON for fifteen seconds to clean Product Line 3, then the solenoid valve of opening 29*d* for Product Line 3 turns OFF.

The solenoid valve of opening 29*e* for Product Line 4 turns ON for fifteen seconds to clean Product Line 4, then the solenoid valve of opening 29*e* for Product Line 4 turns OFF.

The solenoid valve of opening 29*f* for Product Line 5 turns ON for fifteen seconds to clean Product Line 5, then the solenoid valve of opening 29*f* for Product Line 5 turns OFF.

The solenoid valve of opening 29*g* for Product Line 6 turns ON for fifteen seconds to clean Product Line 6, then the solenoid valve of opening 29*g* for Product Line 6 turns OFF.

The solenoid valve of opening 29*h* for Product Line 7 turns ON for fifteen seconds to clean Product Line 7, then the solenoid valve of opening 29*h* for Product Line 7 turns OFF.

The solenoid valve of opening 29*i* for Product Line 8 turns ON for fifteen seconds to clean Product Line 8, then the solenoid valve of opening 29*i* for Product Line 8 turns OFF.

Shuttle 116 moves to a position under blender blade 255 in a blend (right) position.

Blender shaft 304 of spindle assembly 242 descends to near bottom of stroke as shown in FIG. 1 and remains there for thirty seconds ("submerge" event in case there is a cup in the shuttle), then Blender shaft 304 of spindle assembly 242 ascends to top of stroke.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for fifteen seconds to spray blender shaft 304 of spindle assembly 242 with nozzles 57, then turns OFF.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for five seconds to spray blender shaft 304 of spindle assembly 242 with nozzles 57, then blender shaft 304 of spindle assembly 242 with nozzles 57 ascends to halfway point; after another four seconds, blender shaft 304 of spindle assembly 242 with nozzles 57 ascends to top of stroke, at which point the blender shaft rinse solenoid valve of opening 28*f* finally turns OFF.

Cleaner solenoid valve 17*a* that is normally closed, water solenoid valve 5.2 that is normally closed, and valve 5.1 that is normally open are turned OFF to close cleaner solenoid valve 17*a* and solenoid valve 5.2 and open valve 5.1.

The solenoid valve of opening 28*g* for nozzles 54 and 56 of dispense area that is normally closed is turned ON to open the solenoid valve of opening 28*g* (now back to pure water mode).

The solenoid valve of opening 29*b* for Product Line 1 turns ON for twenty seconds to rinse Product Line 1, then the solenoid valve of opening 29*b* for Product Line 1 turns OFF.

The solenoid valve of opening 29*c* for Product Line 2 turns ON for twenty seconds to rinse Product Line 2, then the solenoid valve of opening 29*c* for Product Line 2 turns OFF.

The solenoid valve of opening 29*d* for Product Line 3 turns ON for twenty seconds to rinse Product Line 3, then the solenoid valve of opening 29*d* for Product Line 3 turns OFF.

The solenoid valve of opening 29*e* for Product Line 4 turns ON for twenty seconds to rinse Product Line 4, then the solenoid valve of opening 29*e* for Product Line 4 turns OFF.

The solenoid valve of opening 29*f* for Product Line 5 turns ON for twenty seconds to rinse Product Line 5, then the solenoid valve of opening 29*f* for Product Line 5 turns OFF.

The solenoid valve of opening 29*g* for Product Line 6 turns ON for twenty seconds to rinse Product Line 6, then the solenoid valve of opening 29*g* for Product Line 6 turns OFF.

The solenoid valve of opening 29*h* for Product Line 7 turns ON for twenty seconds to rinse Product Line 7, then the solenoid valve of opening 29*h* for Product Line 7 turns OFF.

The solenoid valve of opening 29*i* for Product Line 8 turns ON for twenty seconds to rinse Product Line 8, then the solenoid valve of opening 29*i* for Product Line 8 turns OFF.

After the Product Line 8 is flushed, the solenoid valve of opening 28*g* for nozzles 54 and 56 of dispense area that is normally closed is turned OFF.

Shuttle 116 moves to a dispense (left) position as shown in FIG. 1.

Blender shaft 304 of spindle assembly 242 descends to near bottom of stroke as shown in FIG. 1.

The blender shaft rinse solenoid valve of opening 28*f* that is normally closed turns ON for five seconds to spray blender shaft 304 of spindle assembly 242 with nozzles 57.

The blender blade spray solenoid valve of opening 28*d* that is normally closed turns ON for five seconds to spray the blender blade 255 with nozzle 59.

The blender shaft 304 of spindle assembly 242 with nozzles 57 ascends to the top of the stroke. The blender shaft rinse solenoid valve of opening 28*f* that is normally closed turns ON and stays ON for the entire blender shaft 304 of spindle assembly 242 with nozzles 57 ascent, before turning OFF.

The solenoid valve of opening 28*g* for nozzles 54 and 56 of dispense area that is normally closed is turned OFF to close the solenoid valve of opening 28*g* (i.e., pure water rinse is done).

During normal product process, sanitizer solenoid valve 17*b* is normally closed, water solenoid valve 5.2 is normally closed, and valve 5.1 that is normally open. When the assembly is set for the sanitation process, then both sanitizer solenoid valve 17*b* and solenoid valve 5.2 are turned ON to the open position, while valve 5.1 is turned OFF to the closed position.

The solenoid valve of opening 28*g* for nozzles 54 and 56 of dispense area that is normally closed is turned ON to open the solenoid valve of opening 28*g* for six seconds, then shuts OFF (this fills the lines up to the manifold with sanitizer solution).

The solenoid valve of opening 29*b* for Product Line 1 turns ON for eight seconds to sanitize Product Line 1, then the solenoid valve of opening 29*b* for Product Line 1 turns OFF.

The solenoid valve of opening 29*c* for Product Line 2 turns ON for eight seconds to sanitize Product Line 2, then the solenoid valve of opening 29*c* for Product Line 2 turns OFF.

The solenoid valve of opening 29*d* for Product Line 3 turns ON for eight seconds to sanitize Product Line 3, then the solenoid valve of opening 29*d* for Product Line 3 turns OFF. The solenoid valve of opening 29*e* for Product Line 4 turns ON for eight seconds to sanitize Product Line 4, then the solenoid valve of opening 29*e* for Product Line 4 turns OFF.

The solenoid valve of opening 29*f* for Product Line 5 turns ON for eight seconds to sanitize Product Line 5, then the solenoid valve of opening 29*f* for Product Line 5 turns OFF.

The solenoid valve of opening 29*g* for Product Line 6 turns ON for eight seconds to sanitize Product Line 6, then the solenoid valve of opening 29*g* for Product Line 6 turns OFF.

The solenoid valve of opening 29*h* for Product Line 7 turns ON for eight seconds to sanitize Product Line 7, then the solenoid valve of opening 29*h* for Product Line 7 turns OFF.

The solenoid valve of opening 29*i* for Product Line 8 turns ON for eight seconds to sanitize Product Line 8, then the solenoid valve of opening 29*i* for Product Line 8 turns OFF.

Shuttle 116 moves to a position under blender blade 255 in a blend (right) position.

Blender shaft 304 of spindle assembly 242 descends to near bottom of stroke as shown in FIG. 1 and remains there for thirty seconds ("submerge" event in case there is a cup in the shuttle), then Blender shaft 304 of spindle assembly 242 ascends to top of stroke.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for fifteen seconds to spray blender shaft 304 of spindle assembly 242 with nozzles 57, then turns OFF.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for five seconds to spray blender shaft 304 of spindle assembly 242 with nozzles 57, then blender shaft 304 of spindle assembly 242 with nozzles 57 ascends to halfway point; after another four seconds, blender shaft 304 of spindle assembly 242 with nozzles 57 ascends to top of stroke, at which point the blender shaft rinse solenoid valve of opening 28*f* finally turns OFF.

The solenoid valve of opening 29*b* for Product Line 1 turns ON for eight seconds to again sanitize Product Line 1, then the solenoid valve of opening 29*b* for Product Line 1 turns OFF.

The solenoid valve of opening 29*c* for Product Line 2 turns ON for eight seconds to again sanitize Product Line 2, then the solenoid valve of opening 29*c* for Product Line 2 turns OFF.

The solenoid valve of opening 29*d* for Product Line 3 turns ON for eight seconds to again sanitize Product Line 3, then the solenoid valve of opening 29*d* for Product Line 3 turns OFF.

The solenoid valve of opening 29*e* for Product Line 4 turns ON for eight seconds to again sanitize Product Line 4, then the solenoid valve of opening 29*e* for Product Line 4 turns OFF.

The solenoid valve of opening 29*f* for Product Line 5 turns ON for eight seconds to again sanitize Product Line 5, then the solenoid valve of opening 29*f* for Product Line 5 turns OFF.

The solenoid valve of opening 29*g* for Product Line 6 turns ON for eight seconds to again sanitize Product Line 6, then the solenoid valve of opening 29*g* for Product Line 6 turns OFF.

The solenoid valve of opening 29*h* for Product Line 7 turns ON for eight seconds to again sanitize Product Line 7, then the solenoid valve of opening 29*h* for Product Line 7 turns OFF.

The solenoid valve of opening 29*i* for Product Line 8 turns ON for eight seconds to again sanitize Product Line 8, then the solenoid valve of opening 29*i* for Product Line 8 turns OFF.

Shuttle 116 moves to a position under blender blade 255 in a blend (right) position.

Blender shaft 304 of spindle assembly 242 descends to near bottom of stroke as shown in FIG. 1 and remains there for thirty seconds ("submerge" event in case there is a cup in the shuttle), then Blender shaft 304 of spindle assembly 242 ascends to top of stroke.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for fifteen seconds to spray blender shaft 304 of spindle assembly 242 with nozzles 57, then turns OFF.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for five seconds to spray blender shaft 304 of spindle assembly 242 with nozzles 57, then blender shaft 304 of spindle assembly 242 with nozzles 57 ascends to halfway point; after another four seconds, blender shaft 304 of spindle assembly 242 with nozzles 57 ascends to top of stroke, at which point the blender shaft rinse solenoid valve of opening 28*f* finally turns OFF.

Sanitizer solenoid valve 17*b* that is normally closed, water solenoid valve 5.2 that is normally closed, and valve 5.1 that is normally open are turned OFF to close sanitizer solenoid valve 17*b* and solenoid valve 5.2 and open valve 5.1 (this ends the sanitation process).

The solenoid valve of opening 28*g* for nozzles 54 and 56 of dispense area that is normally closed is turned ON to open the solenoid valve of opening 28*g* for ten seconds, at which point another pure water rinse begins (now back to pure water mode).

The solenoid valve of opening 29*b* for Product Line 1 turns ON for twenty seconds to rinse Product Line 1, then the solenoid valve of opening 29*b* for Product Line 1 turns OFF.

The solenoid valve of opening 29*c* for Product Line 2 turns ON for twenty seconds to rinse Product Line 2, then the solenoid valve of opening 29*c* for Product Line 2 turns OFF. The solenoid valve of opening 29*d* for Product Line 3 turns ON for twenty seconds to rinse Product Line 3, then the solenoid valve of opening 29*d* for Product Line 3 turns OFF.

The solenoid valve of opening 29*e* for Product Line 4 turns ON for twenty seconds to rinse Product Line 4, then the solenoid valve of opening 29*e* for Product Line 4 turns OFF.

The solenoid valve of opening 29*f* for Product Line 5 turns ON for twenty seconds to rinse Product Line 5, then the solenoid valve of opening 29*f* for Product Line 5 turns OFF.

The solenoid valve of opening 29*g* for Product Line 6 turns ON for twenty seconds to rinse Product Line 6, then the solenoid valve of opening 29*g* for Product Line 6 turns OFF.

The solenoid valve of opening 29*h* for Product Line 7 turns ON for twenty seconds to rinse Product Line 7, then the solenoid valve of opening 29*h* for Product Line 7 turns OFF.

The solenoid valve of opening 29*i* for Product Line 8 turns ON for twenty seconds to rinse Product Line 8, then the solenoid valve of opening 29*i* for Product Line 8 turns OFF.

After the Product Line 8 is flushed, the solenoid valve of opening 28*g* for nozzles 54 and 56 of dispense area that is normally closed is turned OFF to close the solenoid valve of opening 28*g*.

Shuttle 116 moves to a position under blender blade 255 in a blend (right) position, at which point "auto priming" begins.

The solenoid valve of opening 28g for nozzles 54 and 56 of dispense area that is normally closed is turned ON to open the solenoid valve of opening 28g.

Pump 1704/1706 for Product Line 1 is turned on for five or six seconds.

Pump 1704/1706 for Product Line 2 is turned on for five or six seconds.

Pump 1704/1706 for Product Line 3 is turned on for five or six seconds.

Pump 1704/1706 for Product Line 4 is turned on for five or six seconds.

Pump 1704/1706 for Product Line 5 is turned on for five or six seconds.

Pump 1704/1706 for Product Line 6 is turned on for five or six seconds.

Pump 1704/1706 for Product Line 7 is turned on for five or six seconds.

Pump 1704/1706 for Product Line 8 is turned on for five or six seconds.

The solenoid valve of opening 28g for nozzles 54 and 56 of dispense area that is normally closed is turned OFF to close the solenoid valve of opening 28g.

Shuttle 116 now moves to a dispense (left) position as shown in FIG. 1, at which point a "final rinse" begins.

The blender blade spray solenoid valve of opening 28d and the blender shaft rinse solenoid valve of opening 28f turn ON simultaneously for twelve seconds.

The solenoid valve of opening 28g for nozzles 54 and 56 of dispense area is turned on for twelve seconds to spray the dispense area.

The blender blade spray solenoid valve of opening 28d and the blender shaft rinse solenoid valve of opening 28f turn ON simultaneously for twelve seconds.

The solenoid valve of opening 28g for nozzles 54 and 56 of dispense area is turned on for twelve seconds to spray the dispense area.

The blender blade spray solenoid valve of opening 28d and the blender shaft rinse solenoid valve of opening 28f turn ON simultaneously for twelve seconds.

The solenoid valve of opening 28g for nozzles 54 and 56 of dispense area is turned on for twelve seconds to spray the dispense area. All of the product lines are now completely flushed out, cleaned, sanitized and totally free of beverage product.

Figure 6:
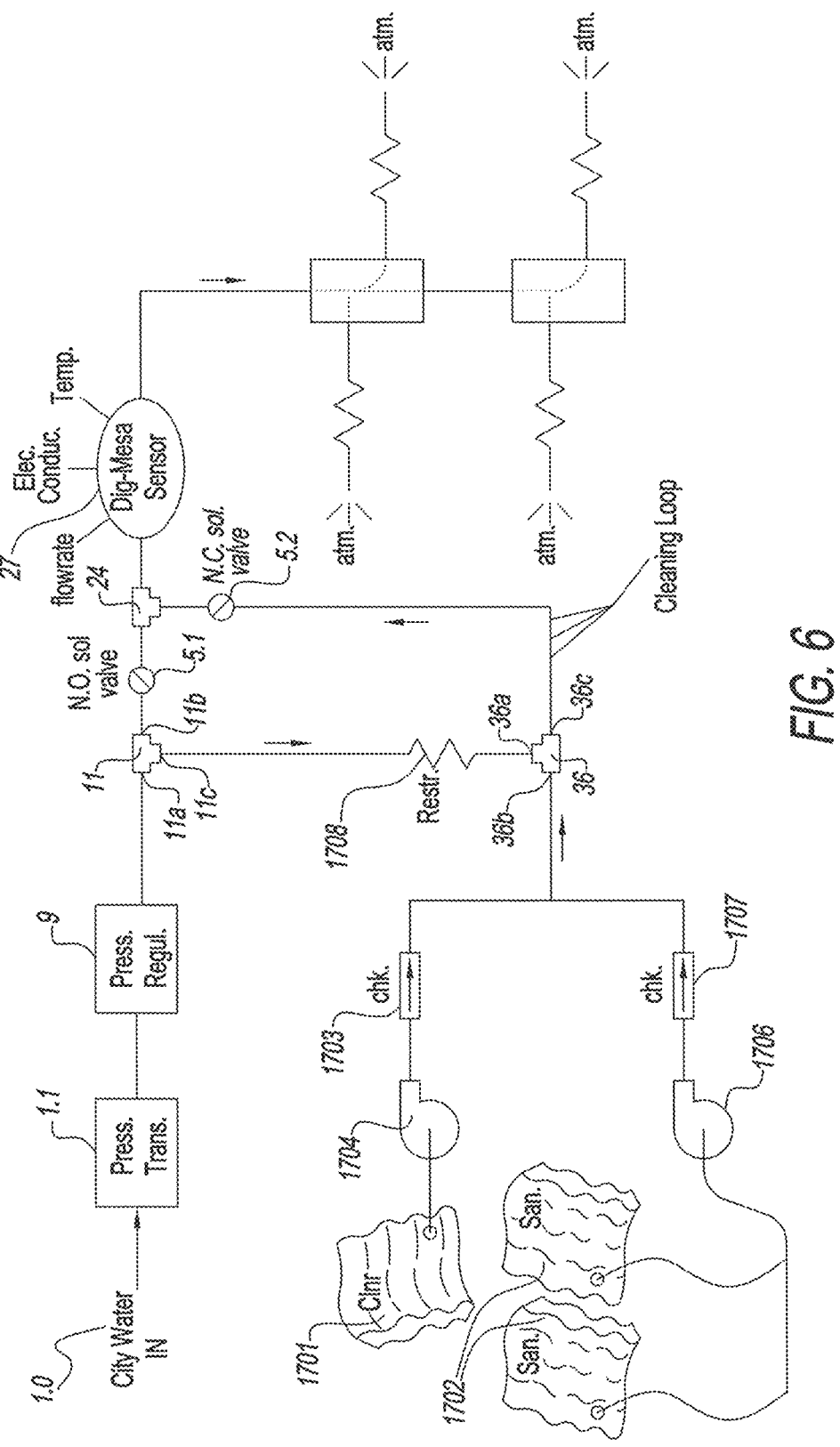
FIG. 6 is a diagram of a sanitation system of the beverage dispenser that can be used with the cleaning assembly of FIG. 1 having some features omitted for clarity and shown in an alternative embodiment.

Referring to FIG. 6, is a plumbing schematic of beverage dispenser 10, showing an alternative embodiment of FIG. 1 that includes cleaning container 1701, sanitizer container(s) 1702, cleaning pump 1704, sanitizer pump 1706 and pressure changing device 1708. Pressure changing device 1708 could be a pressure reducer or pressure regulator. In addition, valve 24 is modified to omit valve 5.1. An input of pressure changing device 1708 is connected between pressure regulator or pressure restrictor 9 and valve 24 and an output of pressure changing device 1708 connects to solenoid valve 5.2. A first check valve 1703 is connected downstream of cleaning pump 1704 and a second check valve 1707 is connected downstream of sanitizer pump 1706. Check valves 23, 1703, and 1707 do not have to exist simultaneously in the same embodiment and check valve 23, and/or check valves 1703 and 1707, can be used independently from each other. However, other embodiments eliminate one or both check valves 1703 and 1707, while others may include a check valve after the convergence point of two chemical paths, just before T-fitting 36. Still other embodiments might have only one chemical bag and one pump. The "diverted" flow path created by closing 5.1 and opening 5.2 (assuming an MVO state) is herein known as the Cleaning Loop. It consists of a path beginning at 11c, through the pressure reduction device 1708, through T-fitting 36 via 36a and 36c, through solenoid valve 5.2 and ending at T-fitting 24. During cleaning or sanitizing, the water flow enters the Cleaning Loop at T-fitting 11, picks up some cleaner and/or sanitizer at T-fitting 36 (herein known as the "Injection Point"), and passes through solenoid valve 5.2 and T-fitting 24, on its way to the combination sensor 27 and beyond. Certain embodiments may have need for the flow rate through the Cleaning Loop to be significantly less than the normal "non cleaning" flow rate. Such a planned flow reduction may be accomplished by the pressure reduction device 1708. If no flow reduction is desired or needed, 1708 may be eliminated. In such cases, alternative embodiments may also be employed, as shown in FIGS. 11-17. In these embodiments, there is no Cleaning Loop, and T-fitting 36 (the Injection Point) is at or just before solenoid valve 5.2. In such other embodiments, the "normally open" solenoid valve 5.1 would not be needed at all.

Figure 7:
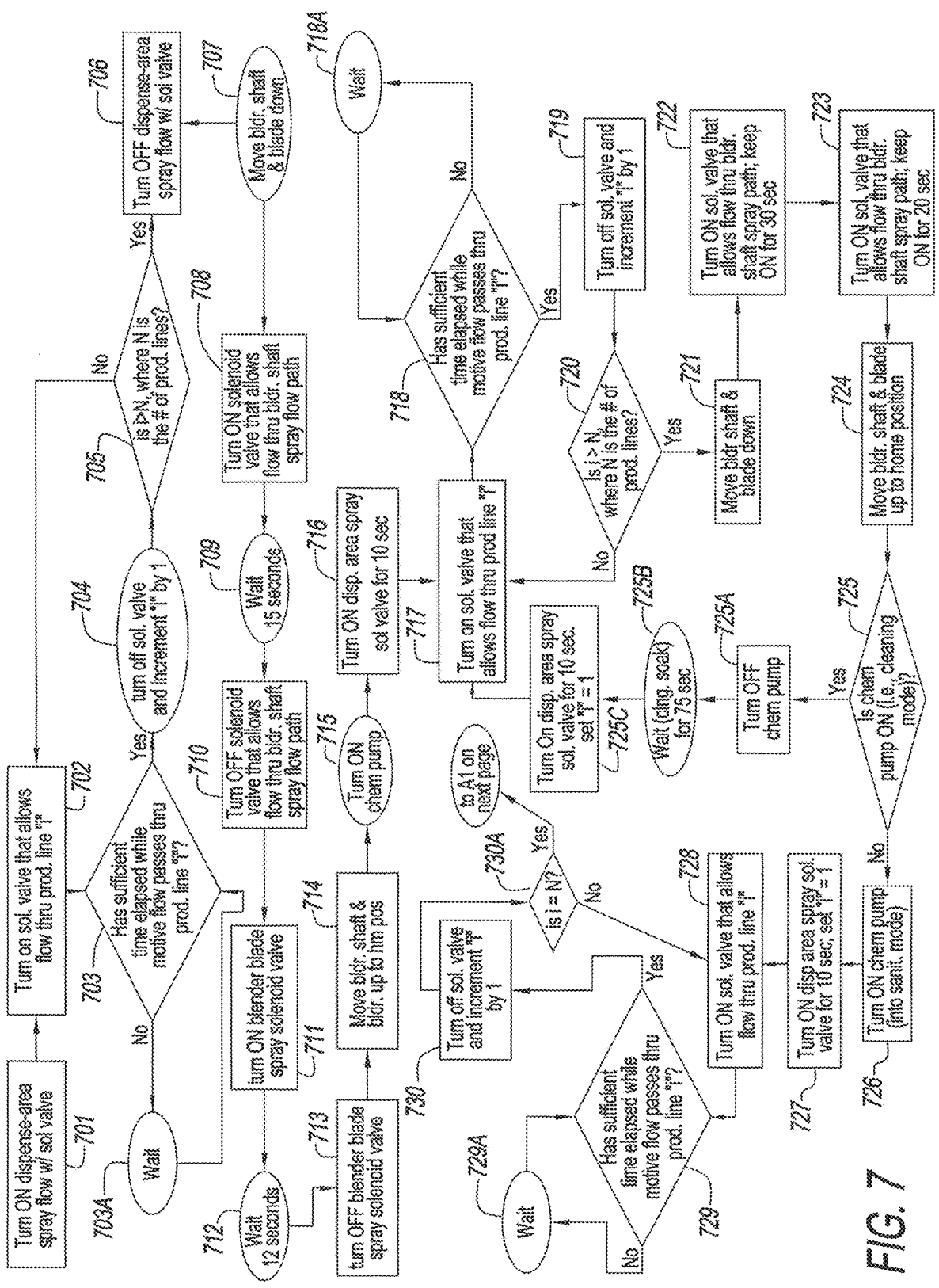
FIG. 7 is a flow chart of a cleaning and/or sanitizing process of the beverage dispenser that can be used with the cleaning assembly of FIG. 1 and shown in FIG. 6, and FIGS. 11-17.

Referring to FIG. 7, an example of steps for a process for weekly cleaning of beverage dispenser 10 as controlled by controller 800 is as follows:

Step 701—Turn on Turn ON dispense-area spray flow with solenoid valve.

Step 702—Turn on solenoid valve that allows flow through product line "i."

Step 703—Has sufficient time elapsed while motive flow passes through product line "i?"

If no, Step 703A—Wait until sufficient time has elapsed and then proceed to Step 704.

If yes, Step 704—Turn off solenoid valve and increment "i" by 1.

Step 705—Is i>N, where N is the number of product lines?

If no, repeat the process from Step 702.

If yes, Step 706—Turn OFF dispense-area spray flow with solenoid valve.

Step 707—Move blender shaft and blade down.

Step 708—Turn ON solenoid valve that allows flow through blender shaft spray flow path.

Step 709—Wait 15 seconds.

Step 710—Turn OFF solenoid valve that allows flow through blender shaft spray flow path.

Step 711—Turn ON blender blade spray solenoid valve.

Step 712—Wait 12 seconds.

Step 713—Turn OFF blender blade spray solenoid valve.

Step 714—Move blender shaft and blender up to home position.

Step 715—Turn on chemical pump.

Step 716—Turn ON dispense-area spray solenoid valve for 10 seconds.

Step 717—Turn on solenoid valve that allows flow through product line "i."

Step 718—Has sufficient time elapsed while motive flow passes through product line "i?"

If no, Step 718A—Wait until sufficient time has elapsed and then proceed to Step 719.

If yes, Step 719—Turn off solenoid valve and increment "i" by 1.

Step 720—Is i>N, where N is the number of product lines?

If no, repeat the process from Step 717.

If yes, Step 721—Move blender shaft and blade down.

Step 722—Turn ON solenoid valve that allows flow through blender shaft spray path and keep ON for 30 seconds.

Step 723—Turn ON solenoid valve that allows flow through blender blade spray path and keep ON for 20 seconds.

Step 724—Move blender shaft and blade up to home position.

Step 725—Is chemical pump ON (i.e., cleaning mode)??

If yes, Step 725A—Turn OFF chemical pump.

Then, Step 725B—Wait for a cleaning soak for 75 seconds.

Then, Step 725C—Turn ON dispense-area spray solenoid valve for 10 seconds and set "i"=1.

The repeat the process from Step 717.

If no, Step 726—Turn ON chemical pump (into sanitation mode).

Then, Step 727—Turn ON dispense-area spray solenoid valve for 10 seconds and set "i"=1.

Then, Step 728—Turn ON solenoid valve that allows flow through product line "i."

Then, Step 729—Has sufficient time elapsed while motive flow passes through product line "i?"

If no, Step 729A—Wait until sufficient time has elapsed and then proceed to Step 730.

Step 730—Turn off solenoid valve and increment "i" by 1.

Step 730A—Is i=N?

If no, repeat the process from Step 728.

Figure 8:
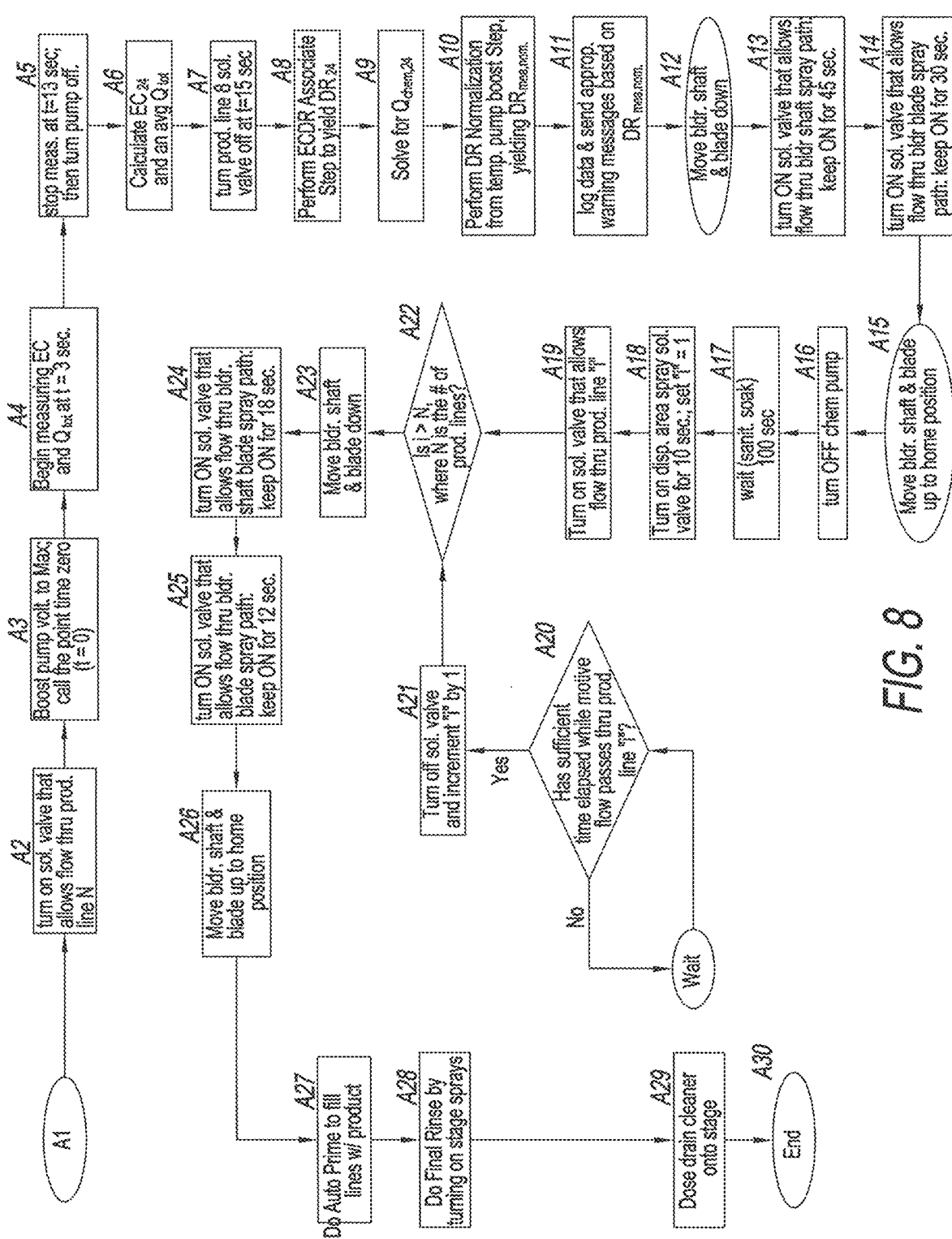
FIG. 8 is a flow chart of a cleaning and/or sanitizing process of the beverage dispenser, wherein utilizing an electrical conductivity to dilution ratio is measured that can be used with the cleaning assembly of FIG. 1 and shown in FIG. 6, and FIGS. 11-17.

If yes, proceed to A1, as shown in FIG. 8.

Referring to FIG. 8, an example of steps for a process of utilizing an electrical conductivity (EC) to dilution ratio (DR) measurement of a mixture of water and cleaning and/or sanitizing solution of beverage dispenser 10 as controlled by controller 800 is as follows:

From the final step A1 of the Weekly Cleaning process, proceed to Step A2 of the EC to DC measurement process.

Step A2—Turn on solenoid valve that allows flow through product line N.

Step A3—Boost pump voltage to Max and that point time is zero (t=0).

Step A4—Begin measuring electrical conductivity (EC) and $Q_{tot}$ at t=3 seconds.

Step A5—Stop measuring at t=13 second; and then turn pump off.

Step A6—Calculate EC24 and an average $Q_{tot}$.

Step A7—Turn product line 8 solenoid valve off at t=15 seconds.

Step A8—Perform ECDR Associate Step to yield $DR_{24}$.

Step A9—Solve for $Q_{chem,24}$.

Step A10—Perform dilution ratio (DR) normalization from temporary pump boost Step, yielding $DR_{mea,nom}$.

Step A11—Log data and send appropriate warning messages based on $DR_{mea,nom}$.

Step A12—Move blender shaft and blade down.

Step A13—Turn ON solenoid valve that allows flow through blender shaft spray path; and keep ON for 45 seconds.

Step A14—Turn ON solenoid valve that allows flow through blender blade spray path; and keep ON for 30 seconds.

Step A15—Move blender shaft and blade up to home position.

Step A16—Turn OFF chemical pump.

Step A17—Wait (sanitation soak) for 100 seconds.

Step A18—Turn ON dispense-area spray solenoid valve for 10 sec and set "i"=1.

Step A19—Turn on solenoid valve that allows flow through product line "i."

Step A20—Has sufficient time elapsed while motive flow passes through product line "i?"

If no, Step B20—Wait until sufficient time has elapsed and then proceed to Step A21.

If yes, Step A21—Turn off solenoid valve and increment "i" by 1.

Step A22—Is i>N, where N is the number of product lines?

If no, repeat the process from Step A19.

If yes, Step A23—Move blender shaft and blade down.

Step A24—Turn ON solenoid valve that allows flow through blender shaft spray path; and keep ON for 18 seconds.

Step A25—Turn ON solenoid valve that allows flow through blender blade spray path; and keep ON for 12 seconds.

Step A26—Move blender shaft and blade up to home position.

Step A27—Do Auto Prime to fill lines with product.

Step A28—Do Final Rinse by turning on stage sprays.

Step A29—Dose drain cleaner onto stage.

Then Step A30—End of the process of utilizing an electrical conductivity (EC) to dilution ratio (DR) measurement of a mixture of water and cleaning and/or sanitizing solution of beverage dispenser 10.

Figure 17A:
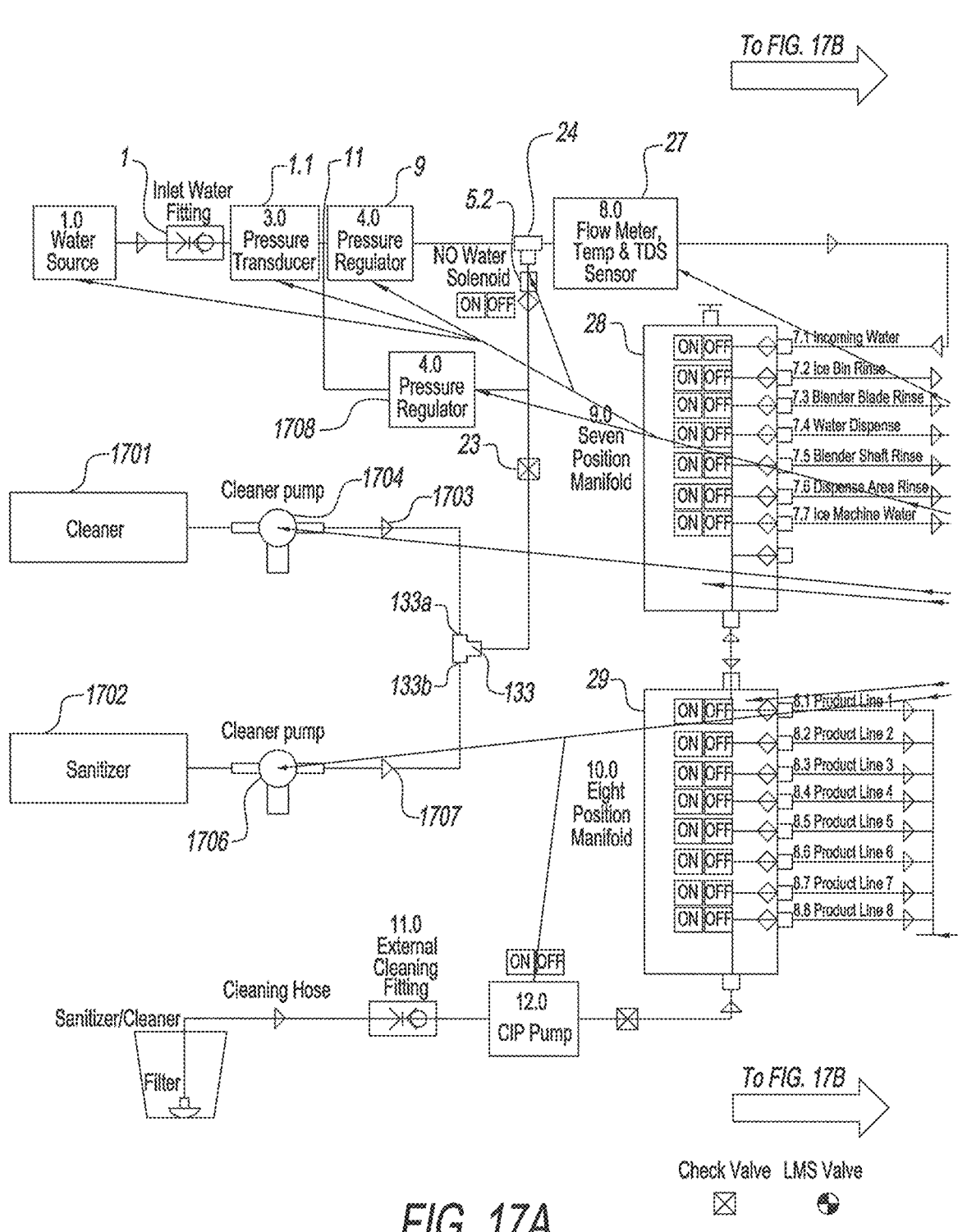

Referring to FIGS. 17A and 17B, when assembled with FIG. 17A to the left and FIG. 17B to the right, constitute FIG. 17, a plumbing schematic of beverage dispenser 10 including a cleaning container 1701, a sanitizer container 1702, a cleaning pump 1704, a sanitizer pump 1706 and a pressure changing device 1708. Pressure changing device 1708 could be a pressure reducer or pressure regulator. In addition, valve 24 is a simple tee fitting 24 and has been modified to omit valve 5.1. An input of pressure changing device 1708 is connected between transducer 1.1, T-fitting 11 and pressure regulator or pressure restrictor 9 and tee fitting 24, and an output of pressure changing device 1708 connects to and is between standalone and "normally closed" solenoid valve 5.2 and check valve 23. However, check valve 23 is not essential to the embodiment. Second opening 133*a* of wye fitting 22 is connected to cleaning pump 1704 that is connected to cleaner container 1701. Third opening 133*b* of wye fitting 22 is connected to sanitizer pump 1706 that is connected to sanitizer container 1702. A first check valve 1703 is connected downstream of cleaning pump 1704 and a second check valve 1707 is connected downstream of sanitizer pump 1706. Check valves 23, 1703, and 1707 do not have to exist simultaneously in the same embodiment and check valve 23, and/or check valves 1703 and 1707, can be used independently from each other. However, other embodiments eliminate one or both check valves 1703 and 1707, while others may include a check valve after the convergence point of two chemical paths, just before T-fitting 36. Still other embodiments might have only one chemical bag and one pump. The "diverted" flow path created by closing 5.1 and opening 5.2 (assuming an MVO state) is herein known as the Cleaning Loop. It consists of a path beginning at 11*c*, through the pressure reduction device 1708, through T-fitting 36 via 36*a* and 36*c*, through solenoid valve 5.2 and ending at T-fitting 24. During cleaning or sanitizing, the water flow enters the Cleaning Loop at T-fitting 11, picks up some cleaner and/or sanitizer at T-fitting 36 (herein known as the "Injection Point"), and passes through solenoid valve 5.2 and T-fitting 24, on its way to the combination sensor 27 and beyond. Certain embodiments may have need for the flow rate through the Cleaning Loop to be significantly less than the normal "non cleaning" flow rate. Such a planned flow reduction may be accomplished by the pressure reduction device 1708. If no flow reduction is desired or needed, 1708 may be eliminated. In such cases, alternative embodiments may also be employed, as shown in FIG. 6, and FIGS. 11-16. In these embodiments, there is no Cleaning Loop, and T-fitting 36 (the Injection Point) is at or just before solenoid valve 5.2. In such other embodiments, the "normally open" solenoid valve 5.1 would not be needed at all.

Referring further to FIGS. 17A and 17B, which constitute FIG. 17, beverage dispenser 10 is shown as a block diagram with control system 1700, for employment of the present invention. Control system 1700 includes a computer 1705 coupled to a network 1720, e.g., the Internet.

Computer 1705 includes a user interface 1710, a processor 1715, and a memory 1725. Computer 1705 may be implemented on a general-purpose microcomputer. Although computer 1705 is represented herein as a stand-alone device, it is not limited to such, but instead can be coupled to other devices (not shown) via network 1720.

Processor 1715 is configured of logic circuitry that responds to and executes instructions. Processor 1715 controls all valves, pumps, containers. Processor 1715 may be configured and programmed to control the beverage dispensing as well as the rinsing, cleaning and/or sanitizing of the beverage dispenser 10.

Memory 1725 stores data and instructions for controlling the operation of processor 1715. Memory 1725 may be implemented in a random-access memory (RAM), a hard drive, a read-only memory (ROM), a programmable read-only memory (PROM), or a combination thereof. One of the components of memory 1725 is a program module 1730.

Program module 1730 contains instructions for controlling processor 1715 to execute the methods described herein. For example, as a result of execution of program module 1730, processor 1715 compares a current time to a predetermined time, then determines if a current time equals a predetermined time, and if the current time equals the predetermined time, then commences a cleaning or sanitizing process of the beverage dispenser. The term "module" is used herein to denote a functional operation that may be embodied either as a stand-alone component or as an integrated configuration of a plurality of sub-ordinate components. Thus, program module 1730 may be implemented as a single module or as a plurality of modules that operate in cooperation with one another. Moreover, although program module 1730 is described herein as being installed in memory 1725, and therefore being implemented in software, it could be implemented in any of hardware (e.g., electronic circuitry), firmware, software, or a combination thereof.

User interface 1710 includes an input device, such as a display with multi-touch interface, keyboard, biometrics or speech recognition subsystem, for enabling a user to communicate information and command selections to processor 1715. User interface 1710 also includes an output device such as audio, display, and/or haptic feedback. A cursor control such as a mouse, trackball, or joystick, allows the user to manipulate a cursor on the display for communicating additional information and command selections to processor 1715.

Processor 1715 outputs, to user interface 1710, a result of an execution of the methods described herein. Alternatively, processor 1715 could direct the output to a remote device (not shown) via network 1720.

While program module 1730 is indicated as already loaded into memory 1725, it may be configured on a storage medium 1735 for subsequent loading into memory 1725.

Storage medium 1735 can be any conventional storage medium that stores program module 1730 thereon in tangible form. Examples of storage medium 1735 include a floppy disk, a compact disk, a magnetic tape, a read only memory, an optical storage media, a universal serial bus (USB) flash drive, a secure digital (SD) card, a digital versatile disc, or a zip drive. Alternatively, storage medium 1735 can be a random-access memory, or other type of electronic storage, located on a remote storage system and coupled to computer 1705 via network 1720.

Advantageously, cleaning beverage dispenser 10 does not require operators of beverage dispenser 10 to remember to perform cleaning and/or sanitizing process 1001. In addition, another advantage is, all the chemicals are onboard cleaning beverage dispenser 10, and structure and software exist to automatically do the cleaning without an operator. The structure and logic itself prevent operators from having to hook up cleaning buckets to cleaning beverage dispenser 10. Another advantage is that the cleaning assembly of dispenser 10 can clean all of the food contact surfaces and can be a fully automatic system that includes a supply of liquid cleaner and/or liquid sanitizer for about 6 months.

Also, there are several "loops" in the cleaning cycles. The preferred order in which the valves are opened to properly clean the system or to maximize cleaning efficiency is to clean the product lines first and then clean everything else after. This is done to try and ensure that the maximum amount of product is removed off the stage area and drain area by using the water and cleaner dispensed from the other outlets.

Figure 9:
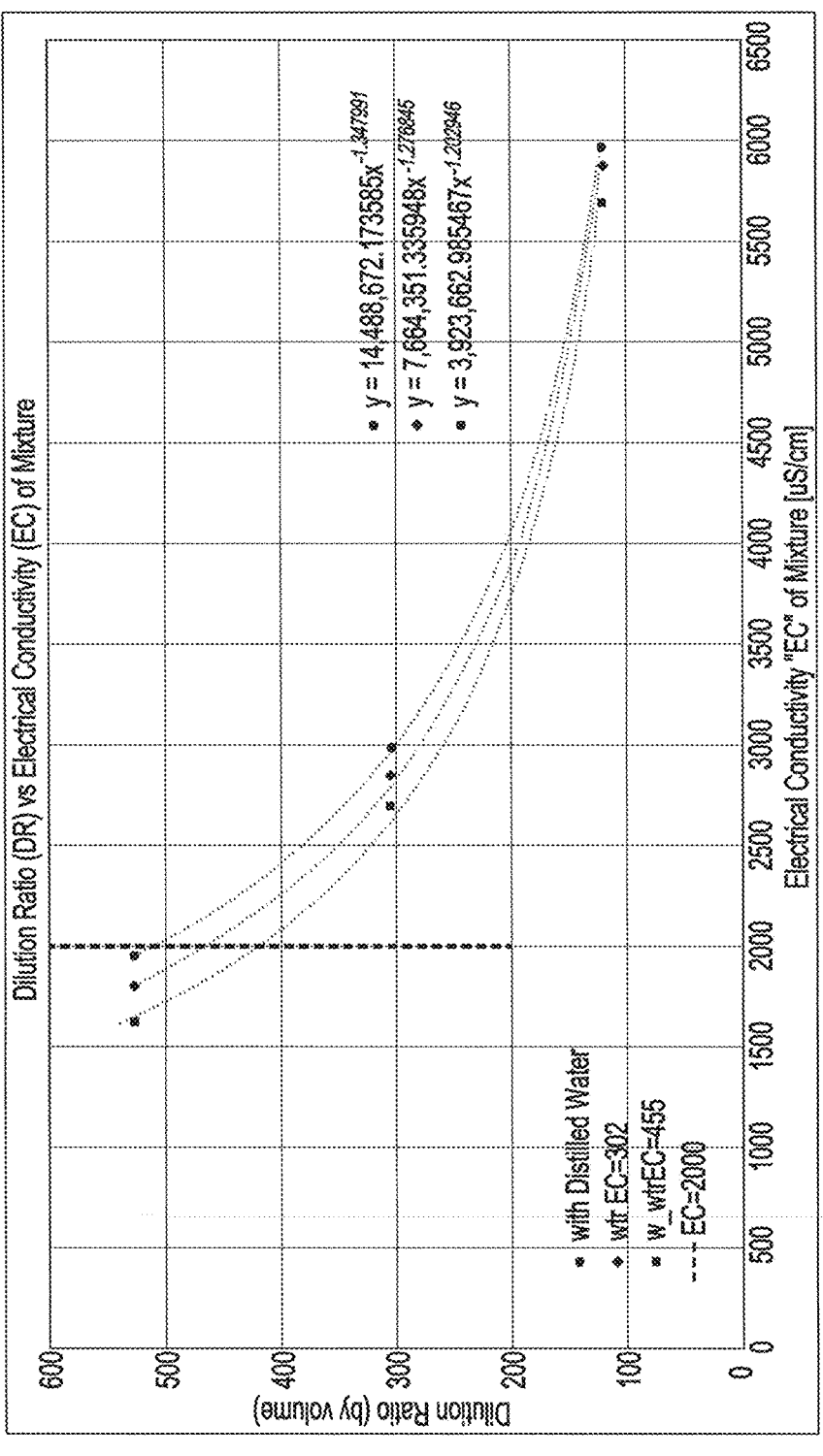
FIG. 9 is a graph of a measurement of an electrical conductivity to dilution ratio of a mixture of water and cleaning and/or sanitizing solution, which can be measured by utilizing a combination sensor and shown in FIG. 6, and FIGS. 11-17.
Figure 10:
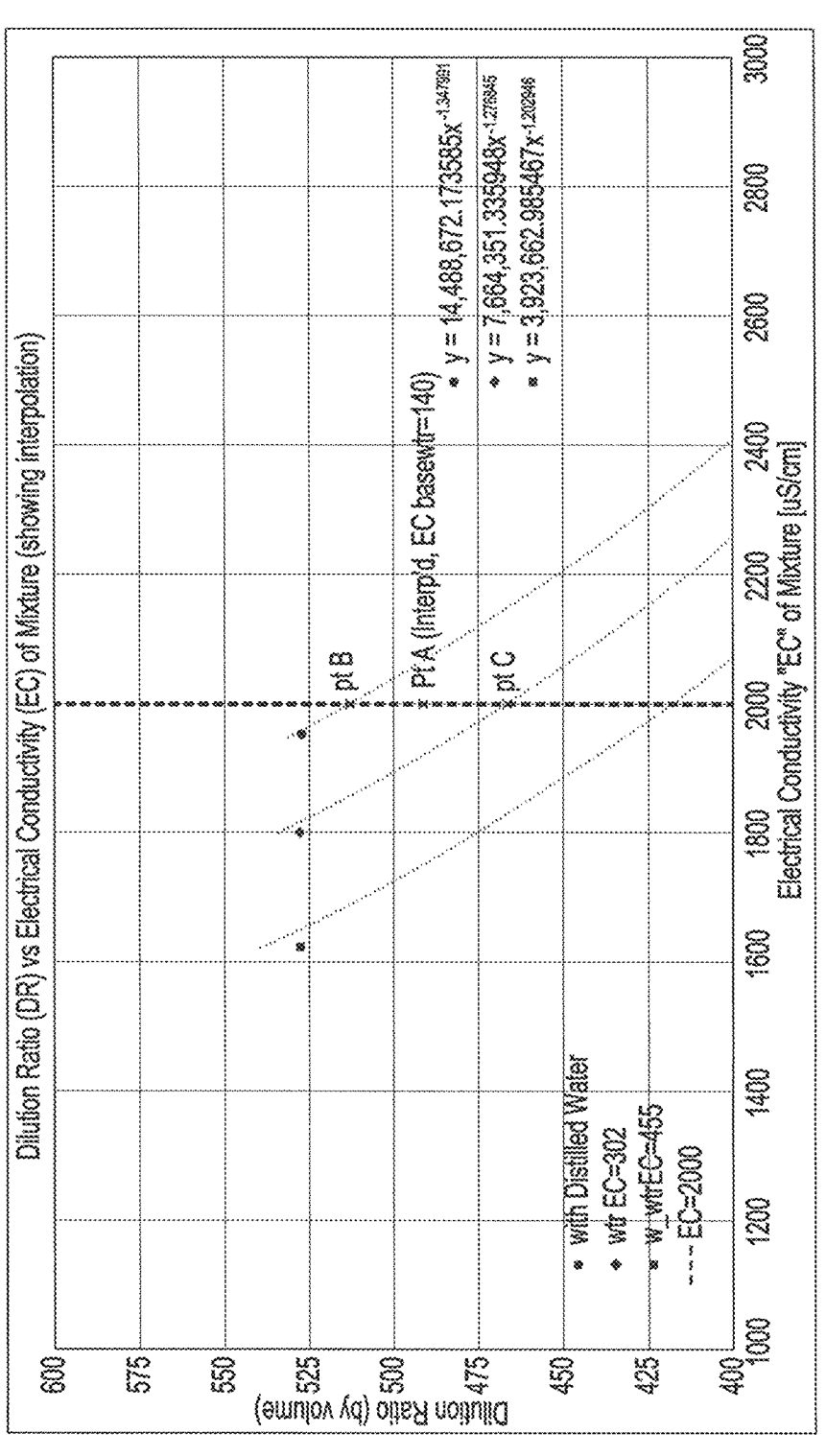
FIG. 10 is a graph showing an interpolation of a measurement of an electrical conductivity to dilution ratio of a mixture of water and cleaning and/or sanitizing solution, which can be measured by utilizing a combination sensor and shown in FIG. 6, and FIGS. 11-17.
Figure 11:
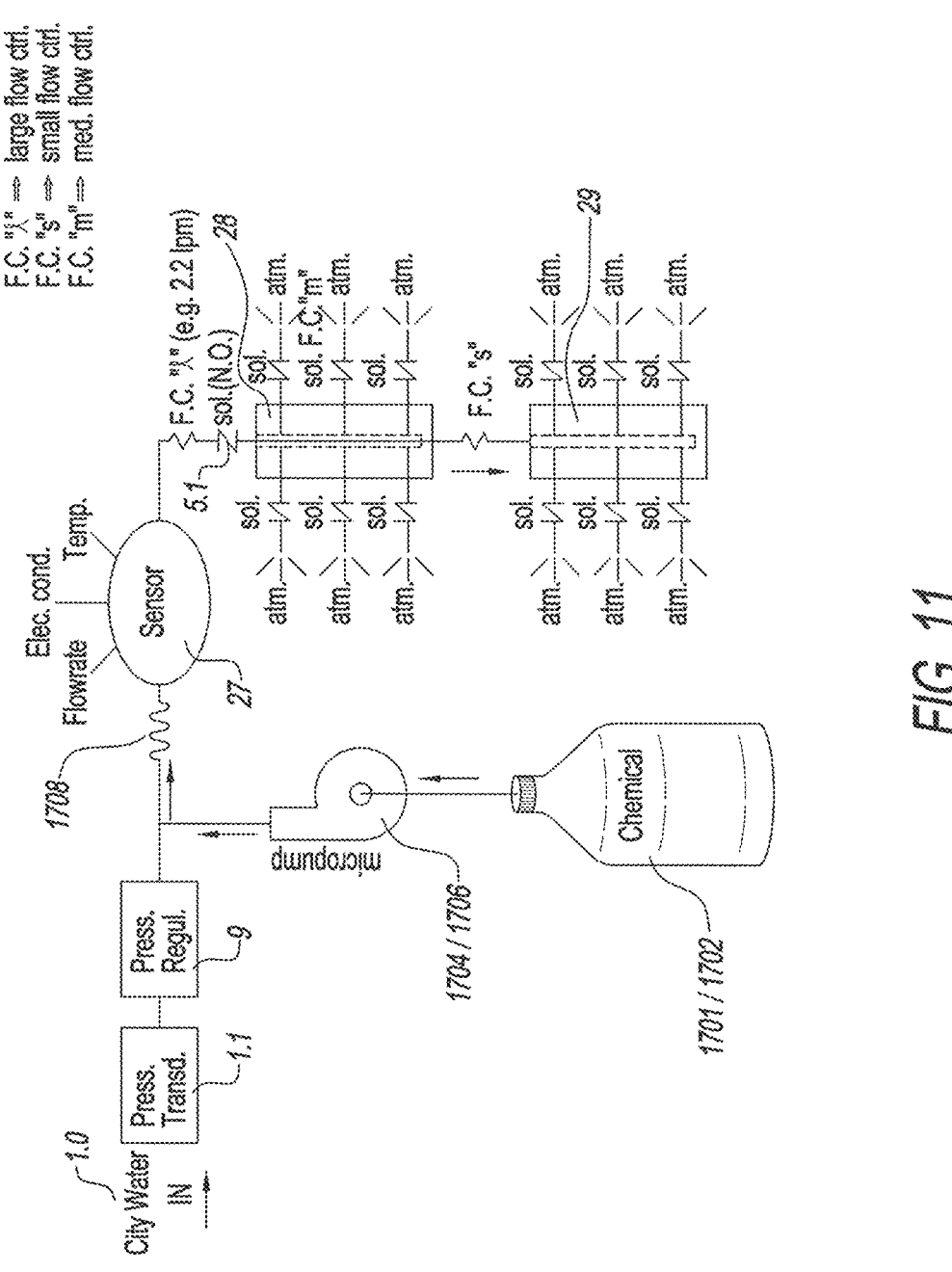
FIG. 11 is a diagram of a sanitation system of the beverage dispenser that can be used with the cleaning assembly of FIG. 1 having some features omitted for clarity and shown in an alternative embodiment.

Determining the Dilution Ratio (Strength) of the Chemical Mixture Created by the Beverage Dispenser:

Referring to FIG. 9 and FIG. 10, in the present disclosure, another embodiment of the invention comprises measuring the Total Dissolved Solids (TDS) or Electrical Conductivity (EC) of the chemical mixture being sent to the lines, components, and regions of the machine to be cleaned or sanitized. Any flow circuit, or portion thereof, in the beverage machine that may need to be cleaned/sanitized is herein referred to as a Cleanable Circuit. A Cleanable Circuit may include at least one of: tubing, fittings, sensors, flow controls, restrictors, regulators, or nozzles. Since a TDS reading is obtained by applying a conversion factor for natural waters to an EC reading, the terms TDS and EC herein will be considered equivalent. The resulting chemical mixture created by mixing the pump's chemical output with a line containing the "motive" flow (typically city water) is required to be within certain concentration limits. These are often established in parts per million, where the "part" refers to one of the important components within the chemical. These "ppm" values are directly related to a more useful parameter, referred to herein as, Dilution Ratio. Regardless of the various important components within the raw chemical, the Dilution Ratio is herein defined as the amount of water per amount of raw chemical, in the mixture. In other words, units of water per unit of chemical, where the unit is one of a volume or mass unit (e.g., ml or grams). However, in the embodiments described hereinafter, Dilution Ratio (DR) is volume-based.

In the present disclosure, the onboard EC/TDS sensor measures the EC of the chemical mixture flowing through it. For the raw chemical of interest, the relationship between the DR of the chemical mixture and the EC of this mixture is established beforehand by testing. Once the relationship between DR and EC is obtained, it can be shown in graph or tabular form, and by one or more best-fit equations. Thus, various embodiments of the invention utilize the EC vs DR (y-axis vs x-axis) equation. Further, the relationship can often be represented via a polynomial, although power functions or any other type of mathematical function may sometimes be utilized. Each of these types of equations can be represented by a few "coefficients" or "constants." In the case of a $2^{nd}$-order polynomial (y=ax2+bx+c), there would be three "coefficients" required to define the relationship: the "a", "b" and "c." The process of storing these "coefficients" (utilizing EC vs DR) onto the machine's computer will be referred to herein as an ECDR Storage Step. These various coefficients can be stored in a variety of ways . . . in .xml, .ini or .txt files, which are read by the controlling program, for instance.

In the present disclosure, the preferred embodiments utilize "up front" testing using the same exact sensor model/ type that will be used on the machine during actual cleaning/ sanitizing. In the example described below, three separate mixture ratios are created:

The first is 117.3-unit volumes of water to 1 unit volume of raw chemical. Once mixed, the contents are placed into a container, with a pump drawing from the container and recirculating back into it. The EC/TDS sensor is placed in series with the pump, allowing a good average reading to be obtained within a minute or two. The contents are dumped, the sensor and pump and lines flushed with water and blown dry, and then a 303:1 ratio is added to the container. The process is repeated. The same is then done with a 528:1 ratio. Therefore, the result is a relationship of EC to DR for this chemical. It is noted that some chemicals can be more sensitive to the exact "type" of water used. The above process can be done for several different water types, for instance, using water obtained from different locales or cities. Further, for example, the machine would then use the equations most closely associated with the city water where it is located. While some qualities of the "base water" that might create a need to perform measurements with different water "types" are likely unknown or at least not closely related to EC, it appears probable that the EC of the base water itself often has some effect on the EC of the resulting mixtures. Thus, one may obtain EC vs. DR relationships for several different "water EC" levels, with the machine ultimately using the equations corresponding most closely to the local water's EC value (which can be easily measured with the EC sensor). Certain chemicals may result in a very weak relationship between base water quality/type and EC of the resulting mixture. The relationship is typically further weakened when fairly low DR's are used (i.e., less water, more chemical). In these cases, one may choose to simplify things and only have one set of data coupling mixture EC to Dilution Ratio.

The next example has the process described above performed three times, each corresponding to a significantly different "base water" EC value. An EC vs DR relationship for each chemical mixture is then obtained. Three different "base water" types will be carefully mixed with the chemical: 1) distilled water (EC approximately zero), 2) city water with EC of about 300, and 3) city water with EC of 460. The units of EC herein are microSiemens per cm [uS/cm].

With distilled water as the "base water," a given cleaner/ sanitizer chemical mixture results in the following (in all cases, DR is by volume):

Mixture DR set to 117.3 to 1; resulting mixture EC found to be 5970 uS/cm

Mixture DR set to 303 to 1; resulting mixture EC found to be 2985 uS/cm

Mixture DR set to 528 to 1; resulting mixture EC found to be 1952 uS/cm

With a water EC value of 302 as the "base water," the given cleaner/sanitizer chemical mixture results in the following:

Mixture DR set to 117.3 to 1; resulting mixture EC found to be 5870 uS/cm

Mixture DR set to 303 to 1; resulting mixture EC found to be 2850 uS/cm

Mixture DR set to 528 to 1; resulting mixture EC found to be 1801 uS/cm

With a water EC value of 455 as the "base water," the given cleaner/sanitizer chemical mixture results in the following:

Mixture DR set to 117.3 to 1; resulting mixture EC found to be 5700 uS/cm

Mixture DR set to 303 to 1; resulting mixture EC found to be 2700 uS/cm

Mixture DR set to 528 to 1; resulting mixture EC found to be 1623 uS/cm

The resulting graphs of all three "base water" cases are shown in FIG. 9. The resulting equations are also shown in FIG. 9. In this example, a best-fit power function works best for all three datasets. This involves only two "coefficients" for each equation: the first factor and the exponent of the "x" variable. Once these "coefficients" are stored on the machine, an EC measurement of the cleaner/sanitizer mixture flowing through the machine's EC/TDS sensor can be associated with a specific Dilution Ratio.

The process of associating a chemical mixture's EC value—obtained via the EC/TDS sensor—with a Dilution Ratio is herein referred to as an ECDR Associate Step. The ECDR Associate Step comprises plugging a measured EC value (taken by the EC/TDS sensor on the machine) into an appropriate DR vs. EC equation, to obtain the Dilution Ratio of the flowing mixture. Further, the EC value is automatically fed into the appropriate DR vs. EC equation by the controlling computer and is "mapped" to an appropriate DR value by the controlling computer, based on stored tabular data. Thus, in this example, if the base water flowing through the machine was found to have an EC of exactly 302, then the "diamond symbol curve" relationship of FIG. 9 would be used to get the DR. If the machine's base water instead had an EC of exactly 455, then the "square symbol curve" relationship would be used.

Referring to FIG. 10, if the base water is found to have an EC between 302 and 455, then simple interpolation would be used to determine the DR of the mixture. It is best to have EC vs. DR data for more base water EC values (e.g., perhaps all the way up to 1000 uS/cm base water). Therefore, the interpolation would always be done between the nearest two known relationships/equations (nearest in terms of the base water EC).

The ECDR Storage Step is herein further defined to potentially include the storage of several separate DR vs. EC relationships, each corresponding to a significantly different level of base water EC. However, the following reveals that interpolation between "base water EC" values is only necessary for EC's or DR's corresponding to the left (steeper) portion of the curves. The spread between the three curves over in the right/flatter region is so small that one could use any of the three relationships alone, and still get a useful value for DR.

Moreover, it is clear from the foregoing three graphs that there is further reason to do any real-time measuring of a chemical mixture's EC on stronger mixtures, if given a choice. Any given uncertainty of the EC measurement results in much less uncertainty in the value of DR, over in the "flatter" portion of these curves. So, in addition to stronger mixtures benefitting from merely having less water (which can have unmeasured qualities that affect the mixture), these stronger mixtures also correspond to more forgiving regions of the DR vs. EC curve/relationship.

Referring to FIG. 10, a further example is given, using the same three equations, for a case where an EC is measured that corresponds to the steeper portion of the curves, thus making the interpolation beneficial. FIG. 10 is identical to FIG. 9 but is zoomed into the region of interest. The sensor measures an EC of 2000 uS/cm. The base water EC is measured at 140 uS/cm. Utilizing "distilled" base water, the DR is mistakenly found to be 514 (point B in FIG. 10). If utilizing a base water EC of 302, the DR is 467 (point C in FIG. 10). However, if the interpolation between the two curves/equations is based on the base water EC value, the result is a more accurate value of 492 for the DR (point A in FIG. 10). The interpolation equation would be:

$$DR = 514 + \frac{(140-0)}{(302-0)}[467-514] = 492$$

A preferred embodiment utilizes this measurement by (a) over a significant (e.g., 8 seconds or longer) period of time, and (b) under conditions approaching a steady state. The latter would typically mean that the measurement/averaging period would begin only after the flowing mixture has obviously hit the sensor and where the EC values are fairly stable. The preferred embodiment would also have this measurement done on a regular basis. Oftentimes there will be a weekly cleaning event where everything is cleaned and sanitized (internal lines/tubes and fittings, as well as blender blades and shaft, etc.). One embodiment has an EC measurement, and subsequent ECDR Associate Step, performed as part of—or just before/after—this weekly cleaning event. The resulting DR obtained will allow the machine to take appropriate action if necessary. A DR value corresponding to concentrations below acceptable limits for the chemical may, for example, cause a lockout of the machine, or a message to replace the chemical as soon as possible, etc. In other embodiments, such a finding will result in a voltage adjustment to the chemical pump. These latter embodiments are disclosed hereinafter.

Chemical Flowrate Adjustment to Maintain Dilution Ratio:

One embodiment of the invention uses the measured EC value—along with a measured total flow rate $Q_{tot}$ and certain other parameters—to change the chemical pump flow rate $Q_{chem}$ by adjusting the applied voltage to said pump. This may, for example, be done periodically (e.g., during each daily or weekly cleaning event) to try and keep the DR at its desired/nominal value. The DR could theoretically vary due to things like degradation/fatiguing of the tubing (if a peristaltic pump is used), degradation of the pump itself, or changes in the raw chemical (i.e., from one batch to another).

The main equation needed for this "chemical flow adjustment" process is the one governing the very definition of Dilution Ratio. Realizing that the "total flow" contains both the motive/water flow and the tiny chemical flow, we have the basic equation:

$$\text{Dilution Ratio} = \frac{Q_{tot} - Q_{chem}}{Q_{chem}}$$

The above equation will be referred to herein as the Dilution Ratio Equation. EC would be measured by the EC/TDS sensor, along with the total flowrate $Q_{tot}$. Alternatively, the total flowrate could be measured by a separate sensor located in series, for instance, a flow meter. The "measured" $Q_{chem}$ is determined indirectly, and we also have a nominal/desired $Q_{chem}$, which is referred to herein as $Q_{chem}$-nom. This is the pre-established desired flowrate generated by the chemical pump, and typically associated with some nominal applied voltage to the pump, $V_{nom}$. This desired/nominal pump flow rate and associated voltage would be determined during the design process. They are what is required to achieve the desired Dilution Ratio for one or more of the possible flow paths. The steps in this embodiment would be:

Step 1—Measure total flow rate $Q_{tot}$ and an average electrical conductivity $EC_{mea}$.

Step 2—Obtain $DR_{mea}$ from $EC_{mea}$ via an ECDR Associate Step.

Step 3—Use the Dilution Ratio equation, with $Q_{tot}$ that was measured in Step 1, and using the desired/nominal value of chemical flow rate, $Q_{chem\text{-}nom}$. The result is the expected DR value, $DR_{exp}$.

Step 4—Calculate $DR_{mea}$ minus $DR_{exp}$, herein calling it Delta_DR. If it is positive, then more chemical flow—and thus pump voltage—is required to hit $DR_{exp}$. If it is negative, then less chemical flow—and thus less pump voltage—is required.

Step 5—Calculate the DR_PerCentDiff as:

$$DR\_PerCentDiff = \left[\frac{Delta\_DR}{DR_{exp}}\right] \times 100$$

Step 6—If DR_PerCentDiff is positive and greater than some threshold (e.g., 10%), then further calculations will be done to determine how much additional pump voltage is required. If DR_PerCentDiff is negative and has an absolute value greater than some threshold (e.g., 10%), then further calculations will be done to determine by how much the pump voltage needs to be reduced. In either case, we move to Step 7. If the absolute value of DR_PerCentDiff is less than some threshold (e.g., 10%), then no pump voltage adjustment is necessary, and the remaining steps are skipped.

Step 7—$DR_{mea}$ is plugged into the Dilution Ratio equation as the Dilution Ratio term, along with $Q_{tot}$. $Q_{chem}$ is then solved for. This is the apparent or "measured" flow rate of chemical being injected into the motive flow. Calculate the difference $Q_{chem\text{-}nom} - Q_{chem}$.

Step 8—The pump flow rate has already been characterized as a function of applied voltage (which could also be an equivalent voltage based on Pulse Width Modulating (PWM) techniques). In all cases herein, the term voltage may also mean an equivalent voltage based on PWM 'ing at the appropriate duty cycle. If the relationship between $Q_{chem}$ and Voltage is essentially linear, then the slope of the $Q_{chem}$ VS Voltage graph is used with the difference in Step 7 to obtain the required change in voltage (Delta V) that will push the Dilution Ratio back to its approximate expected/nominal value. If the relationship is not linear, then the instantaneous slope would be used. That is, the first derivative of the $Q_{chem}$ vs Voltage function, at the point on the curve corresponding to the measured $Q_{chem}$, would be used. In either case, this first derivative or slope will be referred to as Slope_$Q_{chem}$_V. The resulting DeltaV is obtained by dividing the difference of Step 7 by Slope_$Q_{chem}$_V.

If desired, those skilled in the art can easily convert this DeltaV into a factor that is simply multiplied by the design/nominal applied voltage to determine the latest, or "corrected", voltage to use.

The voltage adjustment technique described above is effective in bringing the DR level back towards its nominal value, regardless of the cause for the shift or drift. As disclosed, factors relating to unpredictable changes in the raw chemical concentration, a small leak, uncertainties in the particular pump's behavior, uncertainties in peristaltic tubing behavior, or degradation in pump or tubing behavior over time, may be the cause. Of course, any combination of the foregoing factors, or others not mentioned, could be the cause of shifts or drifts away from the nominal DR. Furthermore, the application of the new adjusted voltage could happen immediately, or it could be implemented during, for example, the next daily or weekly cleaning event.

The comparison and decision process of Steps 4 through 6 above will be referred to herein as a Dilution Ratio Comparison Step. There are other similar ways that those skilled in the art may come up with to make this comparison and decision to proceed with a voltage change. Obviously, if a low enough threshold is used, the adjustment would occur nearly every time the measurement and test process is implemented. One may prefer, on the other hand, that the measured DR be significantly different from the expected DR before a change is made. Ultimately, all foregoing embodiments are within the scope of this disclosure.

Measuring Dilution Ratio with a Temporarily Boosted Pump Voltage:

Another embodiment of the invention incorporates an attempt to reduce the previously described effects brought on by unknown or unmeasured qualities of the city water being used by a particular machine. It is advantageous for this reason to perform the EC measurement of the mixture while the chemical flow rate is temporarily higher than it is during normal cleaning/sanitizing. The dilution ratios are thus temporarily lower than normal, meaning a higher percentage of chemical and a lesser percentage of water. The Dilution Ratio equation is then used to normalize the resulting DR value back to what it would theoretically have been if the pump flow rate (and voltage) had not been temporarily increased. The end result is a reduction of the effect-on the mixture's EC measurement—of unknown or unmeasurable qualities of the local water coming into the machine. In addition to this, it is generally a good idea to use one of the lower-flowing flow paths when this process is employed. In that way, not only is the chemical flow rate maximized, but the "motive" water flow rate is minimized. Both processes help reduce any unknown or unpredictable effects that the local water characteristics may have on the electrical conductivity of the resulting chemical mixture.

A list of steps for this "water minimization" method of determining the DR is as follows:

Step A—Having chosen a flow circuit (preferably one that is lower flowing) to perform the EC measurement on, bump the pump's input voltage to a level above and beyond its current nominal value, and possibly to its maximum level (e.g., 24 V).

Step B—Allow flow through this flow path, typically by opening a solenoid valve located somewhere in the path. We thus have higher-than-average levels of chemical now being injected into the flow stream of this path.

Step C—After a short time period (e.g., 2 or 3 seconds), when the flow and chemical conditions at the EC/TDS sensor may be considered "steady state", begin averaging the EC and $Q_{tot}$ values. Several seconds should preferably be allowed for the continuous stream of sampled $Q_{tot}$ and EC values to be averaged. The result of this will be an average $Q_{tot}$ value, along with a "24 V" average EC value. If a different "high" voltage were used, the name would reflect that value of course. This will be called herein EC24.

Step D—Perform an ECDR Associate Step, which yields a Dilution Ratio corresponding to the temporarily high chemical/pump flow. Herein this will be called $DR_{24}$. It comes from the predetermined relationship between EC and DR as already described, mapping $EC_{24}$ to its corresponding Dilution Ratio.

Step E—Use the Dilution Ratio Equation to solve for $Q_{chem\text{-}24}$, the chemical flow rate that corresponds to the pump's temporarily higher chemical flow. Upon rearranging, this equation is:

$$Q_{chem,24} = \frac{Q_{tot}}{(DR_{24} + 1)}$$

Step F—Normalize the "24 Volt" pump flow to where it would have been if the pump was operating at its nominal voltage. Use the Slope_$Q_{chem}$_V parameter already discussed for this. Recall that Slope_$Q_{chem}$_V is the rate of change of the pump/chemical flow with respect to pump voltage. The equation to use is:

$$Q_{chem,mea,nom} = Q_{chem,24} - (\text{Slope\_}Q_{chem}\text{\_V})(24 - V_{nom})$$

Where $V_{nom}$ is the nominal/design voltage for the pump, as described above. Since the slope parameter above is typically positive, one sees that $Q_{chem,mea,nom}$ is less than $Q_{chem,24}$, as would be expected.

Step G—Use the Dilution Ratio Equation to now determine the measured DR value (the DR that is thought to exist at this value of $Q_{tot}$, when the pump flow is nominal). The equation is:

$$DR_{mea,nom} = \frac{(Q_{tot} - Q_{chem,mea,nom})}{Q_{chem,mea,nom}}$$

The process of determining the nominal Dilution Ratio of a flowing mixture by first determining a "high voltage" pump/chemical flowrate, then normalizing it back to nominal-voltage conditions and then using the Dilution Ratio equation to get DR, is herein referred to as DR Normalization from temporary Pump Boost. This process is described just above in going from $Q_{chem,24}$ in Step E to $DR_{mea,nom}$ in Step G.

Closed-Loop Priming and Turbo-Boosted Priming:

Other embodiments of the invention deal with issues related to priming of the chemical pump. For our purposes herein, a fully primed pump circuit is one that: 1) has cleaner/sanitizer liquid in contact with the pumping portion of the circuit, 2) has cleaner/sanitizer liquid continuously between the source of the liquid and the pump, and 3) has cleaner/sanitizer liquid continuously between the pump and the point where the chemical connects to the stream of motive water (the injection point). While there could be points along this flow circuit (particularly between the container and the pump) that still have pockets or slugs of air, as long as there are continuous streamlines of liquid flow—from source to injection point—when the pump is turned on, and a path to atmosphere is created in the Cleanable Circuit, the pump is considered fully primed.

These embodiments attempt to take full advantage of the onboard EC/TDS sensor. Feedback from the sensor allows the system to know when chemical has apparently made its way successfully into the motive flow. The steps for one embodiment of such an automated priming routine are as follows:

Step I—A solenoid valve of one of the Cleanable Circuits is activated, allowing the motive flow to pass through to the exit/atmosphere, Step II—The EC is measured continuously by the EC/TDS sensor for several seconds, with the EC values sampled over this time then averaged (resulting in $EC_{H2O}$). This is the electrical conductivity of the incoming water (i.e., base water), Step III—The cleaner/sanitizer pump is turned on, which begins to induce the liquid chemical towards the pump (if the line begins with little or no liquid) or pumps the liquid along towards the injection point (if the line begins already full of chemical), Step IV—The EC and flow rate $Q_{tot}$ are measured continuously by the EC/TDS sensor (or by the EC/TDS sensor and a separate flow sensor) for several seconds, a good average value obtained for each, Step V—If the average EC is a certain percentage (e.g., 15 to 20%) above $EC_{H2O}$, an ECDR Associate Step is performed with the average EC value, to obtain a latest DR. Otherwise, Step IV and Step V are repeated.

Step VI—The "expected" value of DR, $DR_{exp}$, is obtained straight from the Dilution Ratio equation, with $Q_{tot}$ from Step IV used for the $Q_{tot}$ term, and $Q_{chem-nom}$ used for the $Q_{chem}$ term.

Step VII—If the latest DR from Step V is sufficiently close to $DR_{exp}$ (e.g., within +/−25%), then the pump shuts off, as does the solenoid valve in the Cleanable Circuit. The priming is finished. If the DR is not sufficiently close to $DR_{exp}$, the priming continues (return to Step IV). If necessary, this will go on for some maximum time limit (e.g., 3 or 4 minutes). If priming is not complete by then, certain messages are given to the user/operator, so troubleshooting may begin, etc.

Note that the check in Step V is because the relationship between the EC and the DR of the chemical mixture is typically ill-defined when the solution is essentially all water (i.e., DR approaching infinity). This check ensures that the ECDR Associate Step is only done when DR is nowhere near infinity.

Another embodiment may have the cleaner/sanitizer pump—during priming—operate at a significantly higher (boosted) voltage than the nominal or design voltage. This may include running the pump at its maximum voltage. Boosting the applied voltage increases the pumping ability of the pump. Once liquid reaches the pump, its flow rate will also be significantly higher. As already described, this "boosted voltage" flow rate will be referred to as $Q_{chem-24}$. This minimizes the amount of time required to prime the pump, particularly in those situations where the line between the chemical source/container and the pump itself is largely filled with air at the beginning of the priming process.

In FIG. 18, a flowchart of a method of establishing a baseline strength of a chemical mixture flowing through a cleanable circuit of a beverage dispenser that can be used with the cleaning assembly of FIG. 1 having some features omitted for clarity and shown in an alternative embodiment is shown, according to the present disclosure. When the method of establishing a baseline strength of a chemical mixture 18 is performed and/or employed, it may be utilized by the beverage dispenser 10 in allowing incoming water to flow through said cleanable circuit while measuring a total flow rate $Q_{tot}$, thereby obtaining a measured value of said total flow rate of said incoming water in step 180. In step 181, the method of establishing a baseline strength of a chemical mixture 18 (hereinafter "the method 18") may be further utilized by the beverage dispenser 10 in providing a pump connected to said cleanable circuit that can pump a chemical into said incoming flowing water of said cleanable circuit, thereby creating said chemical mixture for step 182. Calculating a required chemical flow rate $Q_{chem}$ value to achieve a desired value of dilution ratio (DR) by utilizing said desired value of DR and said measured value of said total flow rate $Q_{tot}$ in a predefined equation may be performed and/or employed in step 182. Further, in step 183, the beverage dispenser 10 utilizes the method 18 in determining from said required chemical flow rate $Q_{chem}$ value a required pump excitation voltage by performing at least one step selected from the group consisting of: an Equation Based Pump Voltage Determination Step, and a Calibration-Based Pump Voltage Determination Step for step 184. Performing an EC Baselining Step on said cleanable circuit while said pump is activated at said required pump excitation voltage, and while said measured value is at said total flow rate $Q_{tot}$ may then be performed and/or employed in the method 18 by the beverage dispenser 10 in step 184. The beverage dispenser 10 utilizing the method 18 then obtains an $EC_{baseline}$ value, which is associated with a value of said desired value of DR for use as a baseline strength for comparing cleaning EC measurements on at least one member of a cleanable circuit's flow-sharing cleanable circuit group in step 185. Thus, the $EC_{baseline}$ value may be obtained by utilizing the beverage dispenser 10 comprising the method 18 for use as the baseline strength for comparing cleaning EC measurements on at least one member of a cleanable circuit's flow-sharing cleanable circuit group.

In FIG. 19, a flowchart of a method of establishing a baseline strength of a chemical mixture flowing through a cleanable circuit of a beverage dispenser that can be used with the cleaning assembly of FIG. 1 having some features omitted for clarity and shown in an alternative embodiment is shown, according to the present disclosure. When the method of establishing a baseline strength of a chemical mixture 19 is performed and/or employed, it may be utilized by the beverage dispenser 10 in providing a flow controlling device in said cleanable circuit that maintains a total flow rate of incoming water at a constant value $Q_{tot}$ in step 190. In step 191, the method of establishing a baseline strength of a chemical mixture 19 (hereinafter "the method 19") may be further utilized by the beverage dispenser 10 in providing a pump connected to said cleanable circuit that can pump a chemical into said incoming flowing water of said cleanable circuit, thereby creating said chemical mixture for step 192. Calculating a required chemical flow rate $Q_{chem}$ value to achieve a desired value of dilution ratio (DR) by utilizing said desired value of DR and said constant value of $Q_{tot}$ in a predefined equation may be performed and/or employed in step 192. Further, in step 193, the beverage dispenser 10 utilizes the method 19 in determining from said required chemical flow rate $Q_{chem}$ value a required pump excitation voltage by performing at least one step selected from the group consisting of: an Equation Based Pump Voltage Determination Step, and a Calibration-Based Pump Voltage Determination Step for step 194. Performing an EC Baselining Step on said cleanable circuit while said pump is activated at said required pump excitation voltage, and while said total flow rate is at said constant value $Q_{tot}$ may then be performed and/or employed in the method 19 by the beverage dispenser 10 in step 194. The beverage dispenser 10 utilizing the method 19 then obtains an $EC_{baseline}$ value, which is associated with a value of said desired value of DR for use as a baseline strength for comparing cleaning EC measurements on at least one member of a cleanable circuit's flow-sharing cleanable circuit group in step 195. Thus, the $EC_{baseline}$ value may be obtained by utilizing the beverage dispenser 10 comprising the method 19 for use as the baseline strength for comparing cleaning EC measurements on at least one member of a cleanable circuit's flow-sharing cleanable circuit group.

Specific Use Case Examples

Figure 20B:
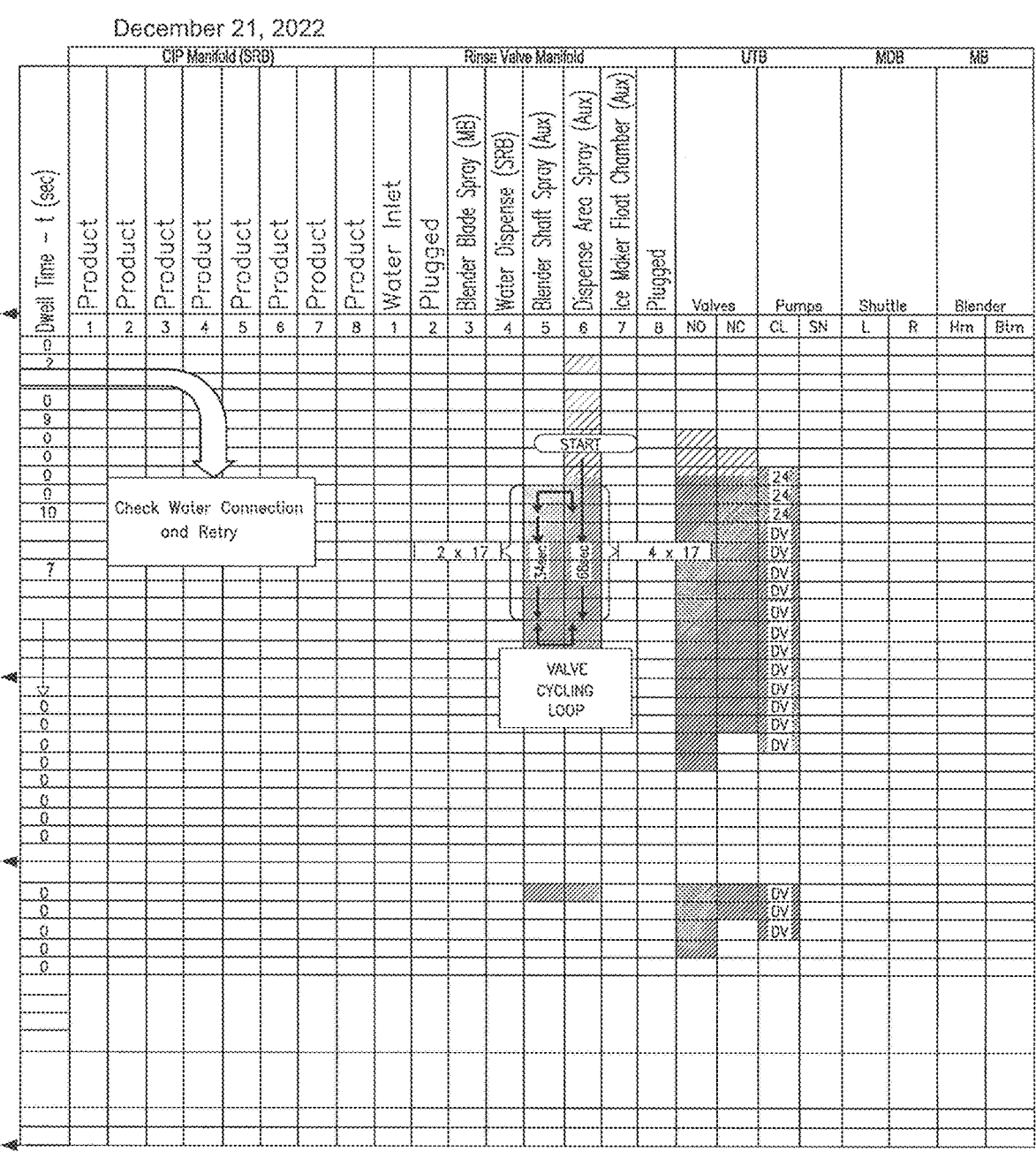
Figure 21A:
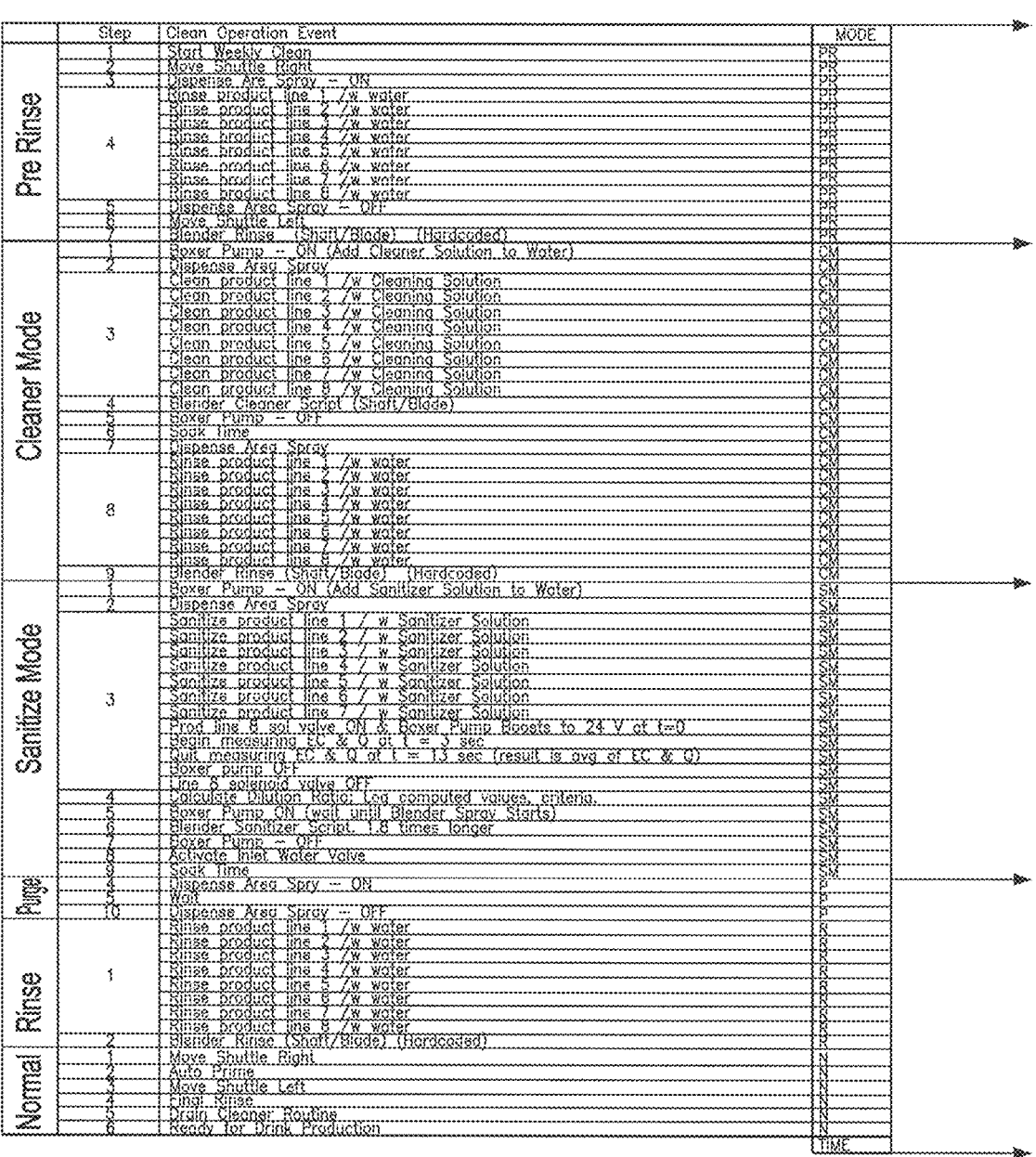
FIGS. 21A and 21B when assembled with FIG. 21A to the left and FIG. 21B to the right, constitute FIG. 21 and is a chart of a beverage dispenser with a cleaning system and a pump performing a weekly cleaning routine/sequence that can be used with the cleaning assembly of FIG. 1 having some features omitted for clarity and shown in an alternative embodiment.
Figure 21B:
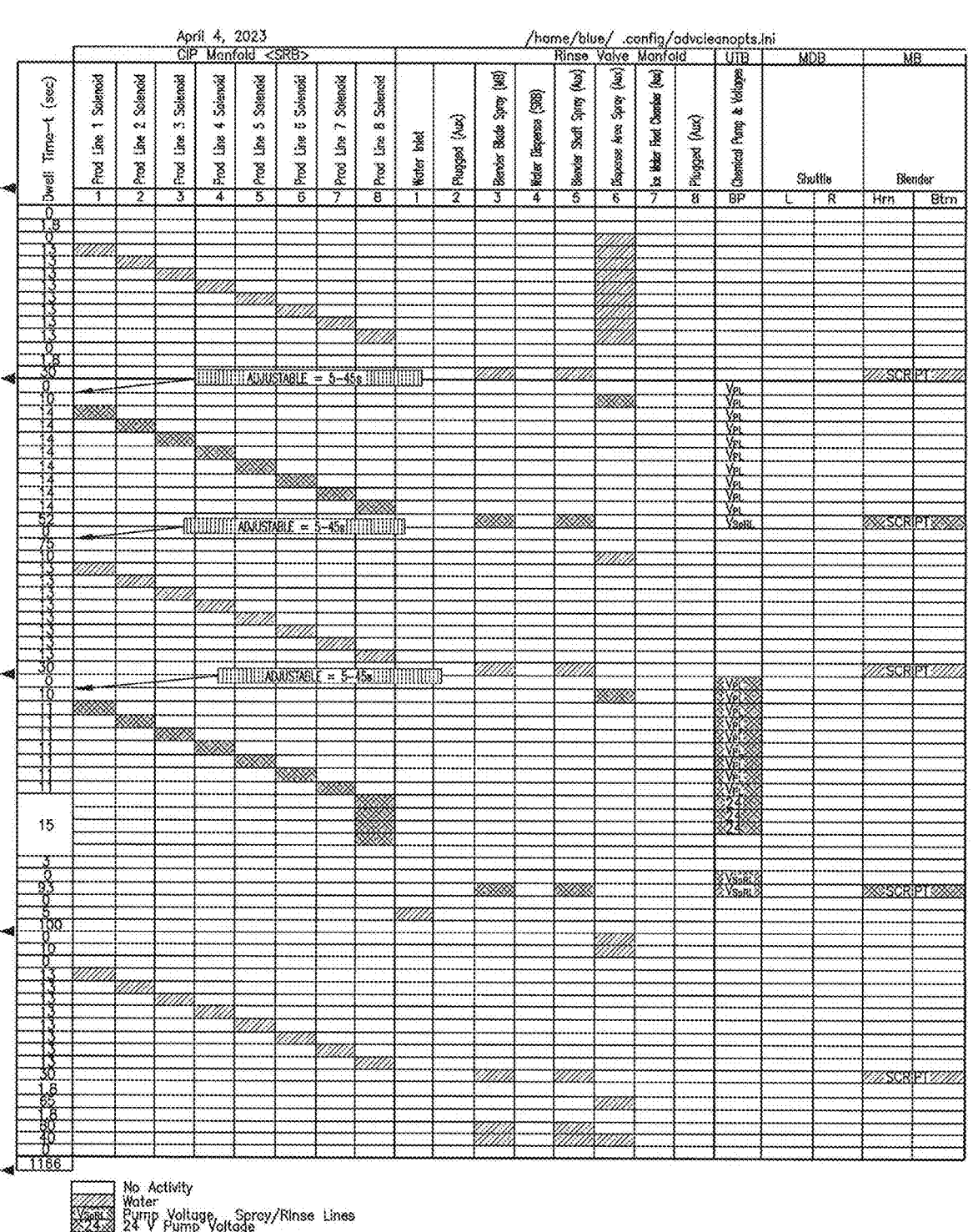

Example of a Beverage Dispenser with a Cleaning System and a Pump utilizing a Priming Stera-Sheen Cleaner Solution is shown in FIGS. 20A and 20B when assembled with FIG. 20A to the left and FIG. 20B to the right, constitute FIG. 20:

Example of a Beverage Dispenser with a Cleaning System and a Pump performing a Weekly Cleaning Routine/Sequence is shown in FIGS. 21A and 21B when assembled with FIG. 21A to the left and FIG. 21B to the right, constitute FIG. 21:

Location-Specific Methods for Measuring & Controlling Chemical Mixture Ratios:

The term "chemical" is defined herein to be either a cleaner, a sanitizer, or a combination cleaner and sanitizer chemical. These are typically quite concentrated and need to be diluted with water to create a proper chemical mixture. The flow through a cleanable circuit is "allowed" herein by opening a normally-closed solenoid valve, such as those shown attached to manifolds 28 and 29. In the case of a combination cleaner and sanitizer chemical, only one pump is used. Either pump 1704 or pump 1706 (e.g., FIGS. 15, 16 and 17 (i.e., 17A and 17B)) may be considered the pump (e.g., peristaltic pump, etc.) used with the combination cleaner/sanitizer chemical.

An EC Baselining Step may be completed for several different cleanable circuits. There may be one or more groups of cleanable circuits in a beverage dispenser. For the purposes of the present disclosure, when each member of a group of circuits shares with all other members of that group: (a) the same design chemical flow rate for cleaning and/or measuring, and (b) essentially the same total flow rate during cleaning/measuring, then this group is defined herein as a Flow-Sharing Cleanable Circuit Group. In the foregoing definition, such a group may include only one cleanable circuit as well. In that case, the cleanable circuit is the only member of that Flow-Sharing Cleanable Circuit Group. Wherein, condition (b) for a Flow-Sharing Cleanable Circuit Group may occur, for instance, when all group members employ the same flow control, or model of flow control.

In one embodiment, the EC Baselining Step may be performed on one member of each Flow-Sharing Cleanable Circuit Group. In such an embodiment, it is preferred-though not required—that subsequent Cleaning EC Measurement Steps are performed on the same member of each Flow-Sharing Cleanable Circuit Group as was used for EC baselining.

Certain embodiments include more direct and location-specific means of assuring the proper mixture ratio for a given cleanable circuit. These embodiments described herein, have the advantage of largely circumventing the significant problem of unknown water "quality" in the field, and its unpredictable influence on the EC to DR relationship. They also overcome this "water quality" obstacle without sacrificing the ability to do the real time EC measuring at the actual, designed—for chemical strength—and thus chemical flow rate. In these embodiments, the EC is measured at a pump speed associated with the "design" flow rate of the chemical, for the cleanable circuit of interest. Since peristaltic pumps can show more performance degradation when operating at certain speeds, it is important that the design speeds are also used—to the extent possible—for the measuring itself. This also eliminates any normalization from one pump speed to another, which requires certain assumptions to be made. In the normalization embodiments of U.S. patent application Ser. No. 18/299,013, the contents of which are incorporated herein by reference, this required a Slope_Qchem_V for the pump tubing, which likely changes significantly with tube wear and exposure, and would be very hard to predict.

Different water types or sources tend to interact with a given chemical differently, oftentimes in a seemingly unpredictable manner. If a user mixes a known amount of a given chemical with a known amount of a given water source, the user has a known Dilution Ratio (DR) of that mixture, defined herein as the ratio of the water to the chemical (by volume). This is considered herein a "static mixture". That is, a mixture created in a traditional manner, using containers, graduated cylinders, droppers, stirrers, etc. If a user then measures the EC of the resulting mixture, the user will know—for that water and chemical—that the given EC corresponds to the specific DR. By combining the proper amounts of both chemical and a given water, a user can thus carefully create a mixture of the two at a known strength (i.e., Dilution Ratio), then tie that Dilution Ratio to a measured value of EC for that mixture.

A very similar process may also be applied to the actual beverage dispenser itself but using flowing chemical and flowing water-both at a steady-state—to create a flowing chemical mixture. With an EC sensor 27 located at some point downstream of the point where the flowing chemical mixes with the flowing water (the mixing point), the EC of the flowing chemical mixture may be measured, as was also described in U.S. patent application Ser. No. 18/299,013, the contents of which are incorporated herein by reference.

Further, for two flowing liquids mixing at the steady-state, the Dilution Ratio is defined on a flow rate basis. Namely, it is the ratio of incoming water to incoming chemical. The Dilution Ratio equation can be stated as:

$$\text{Dilution Ratio} = \frac{Q_{tot} - Q_{chem}}{Q_{chem}} \qquad \text{Equation} - \text{J}$$

The incoming water flow is called the "motive" flow. Its flow rate is the difference between the total flow rate $Q_{tot}$ and the chemical flow rate ($Q_{chem}$), and corresponds to the numerator of Equation J. The total flow can be considered the mixed or outgoing flow (i.e., downstream of the mixing point). The flow rate of this "total" flow is called the total flow rate $Q_{tot}$. Since the beverage dispenser has a flow sensor to measure the total flow rate, all that is needed for determining the DR is a way to know—at one point in time that we will call "baselining time"—the flow rate of the chemical being injected into the mixing point (i.e., into the cleanable circuit). This would nail down the value of DR to within a reasonable degree of accuracy. With the mixture's EC also being measured, a mapping between this EC value and the known DR value would thus, be established, for the given water source and chemical. In certain embodiments, while the DR may be known, it may not be necessarily at a desired value. Unexpected values of $Q_{tot}$, for instance, will lead to DR values quite different from their intended or design value. However, a user can tie the measured EC value to this known (possibly less than optimal) value of DR. Embodiments described hereinafter allow the DR value to not only be known but also be some desired or optimal value during this "baselining" process.

Note that in many instances, particularly when dilution ratios are large, the motive flow rate is nearly identical to the total flow rate. That is, the chemical flow rate is very small relative to the motive flow rate. In describing the embodiments herein, the terms motive and total can often be used interchangeably, with little effect on calculated or theoretical values. For this reason, DR may also be defined herein as the ratio of motive flow rate to chemical flow rate, with very little consequence.

In the embodiments herein, the "flowing" version of tying a known DR value to a specific mixture EC may be utilized for the establishment of a "baseline EC" for a cleanable circuit (herein called $EC_{baseline}$). This baseline can, for instance, then be used for comparative purposes when future EC-measuring events are implemented on the circuit (the measuring events preferably being incorporated into necessary cleaning and/or sanitizing events for the circuit). This comparison inherently reveals if the original DR is still being held. Creating a flowing chemical mixture of a known mixture strength, by pumping an essentially known flow rate of chemical into an essentially known motive flow rate of water, while measuring the EC of the resulting mixture, is herein defined as an EC Baselining Step. The resulting EC may comprise the "baseline EC" for the given cleanable circuit. The EC Baselining Step includes the creating of a mixture at some known DR. The measuring of the motive or total flow rate may be performed before this step. Once the baseline EC is determined, it can be easily tied to the known DR that was created during the EC Baselining Step. This "connection" or tying between the two may be performed by the beverage dispenser's computer. In one embodiment, this may be accomplished by creating a 2-position matrix called "Circuit 1", having the $1^{st}$ position filled with the "known" DR (the DR "known" during EC baselining) and the 2nd position filled with the $EC_{baseline}$.

In another embodiment, this "tying" may also be completed, for example, in the form of a single-row text file for the circuit or group of circuits, the row's first item being the DR, the second item being the EC. Further, in another embodiment, this "tying" may also include no physical pairing of the known DR and the resulting EC at all. Thus, knowing what the value of DR was during EC Baselining, and also knowing the baseline EC, may be considered herein as tying the one to the other.

The EC Baselining Step above, is preferably completed on a cleanable circuit at initial startup of the beverage dispenser, and whenever a new chemical is used on the beverage dispenser for the first time. The latter preferably includes usage of a new pump tube, in the case where a peristaltic pump is utilized. If the beverage dispenser was physically moved to another location at some point (e.g., utilizing a different water source), baselining would also have to be completed again (preferably with a new pump tube if using, e.g., a peristaltic pump). Note that if the "testing method" (described below) of tying a required chemical flow rate to a pump voltage is used, the necessity here of replacing the pump tube is minimized, if not eliminated. As mentioned above, other embodiments may ensure that the known mixture strength created during EC Baselining also corresponds to a desired or "design" value of DR for that circuit. Such embodiments are described below.

It is preferred that the DR that's created while the "baseline" EC is measured during an EC Baselining Step corresponds to the desired (or design) DR for the given cleanable circuit. Even when pressure regulators or flow controls are part of the circuit, there is usually still some uncertainty and variability when it comes to what flow rate will end up flowing through a given cleanable circuit. Flow controls and pressure regulators themselves have variability from sample to sample, and water pressure differences from location to location may still affect the flow rate as well. However, if the supply pressure is not at some minimum level, neither flow controls nor pressure regulators can prevent the flow from being too low. In those cases where the motive flow rate or total flow rate $Q_{tot}$ for a circuit does not match its nominal or expected value, a user may take measures to increase or decrease the total flow rate $Q_{tot}$ for EC baselining. However, this would be fairly involved and would require extra parts to add to the beverage dispenser or circuit (e.g., restrictors, pressure boosters, etc.). One embodiment of the present disclosure simply takes the $Q_{tot}$ as it is and calculates the appropriate chemical flow rate for the circuit. The chemical flow rate for the circuit may be calculated based on the measured $Q_{tot}$ through that circuit, as well as the desired Dilution Ratio. For example, the total flow rate (often approximated by the motive flow rate) is measured first, this value then being put into the Dilution Ratio equation (along with the design DR value) to yield the required chemical flow rate $Q_{chem}$. The proper form of the Dilution Ratio equation for the example above is:

$$Q_{chem} = \frac{Q_{tot}}{DR + 1} \qquad \text{Equation – J1}$$

Thus, $Q_{chem}$ may be determined and combined with the as—is $Q_{tot}$ to yield the desired DR for the circuit. A procedure for determining what pump voltage to use to achieve this value of $Q_{chem}$ is required and described herein.

In one embodiment, a method (e.g., the Equation Method as discussed below) is to require a predetermined relationship between the pump's voltage and the resulting chemical flow rate.

In another embodiment, a method (i.e., the Testing Method) would generally begin with such a predetermined relationship but would further include actual testing or "calibrating" to get a more certain value for the required voltage. This method has the added advantage of allowing EC baselining to occur even when a user has little confidence in the current behavior or state of the pump (e.g., if the pump tube of a peristaltic pump has been in place, exposed to chemical, and cycled for an extended period of time).

Whether the Equation or the Testing method is used, the required pump voltage for EC baselining is obtained. The pump would then be activated at this required voltage/PWM for the EC baselining measurement (e.g., the EC Baselining Step). These embodiments thus ensure that the DR being created during the baselining operation is essentially equal to what may be desired or required for that circuit during subsequent cleanings. More elaboration on each of these "pump voltage determination" methods follows below.

The Equation Method of Connecting $Q_{chem}$ to Required Pump Voltage:

If a user knows that the pump during this EC baselining process will behave reasonably similar to the pumps that were carefully characterized above, then the user may use the predetermined voltage vs. flow rate data to set the proper voltage to achieve the desired $Q_{chem}$. The main requirement here, in the case of a peristaltic pump, would be that the "pump tubing" itself is essentially new. The pump tubing gets fatigued over time, due to the rollers deforming it. This tubing may also deteriorate due to constant exposure to the chemical being pumped. At startup however, it is probable that the tube will have no exposure to the liquid/chemical yet, and also has not accumulated many deformations. An example of data determined for several samples of a new peristaltic pump/tube combination is shown as Chart 1. This example represents data from four peristaltic pumps, each with new "pump tubing", and pushing into nominally the same pressure that would be seen in the final application. In each of the four cases, the PWM percentage (duty cycle) was set to four different values (i.e., 16, 23, 33, and 50%). In this case, 100% represents a full, constant 24 Volts. As long as it is known that the operating points will be somewhere in this region, the data corresponding to higher voltages (PWM values) is irrelevant. It may be more useful in the present disclosure to have the inverted graph, where pump flow is on the x-axis. For this example, the inverted graph is shown as Chart 2. The dotted curve is the best-fit curve that best fits the resulting average values. The equation for the best-fit curve (a 2nd-order polynomial) is shown in the figures below.

Figure 22:
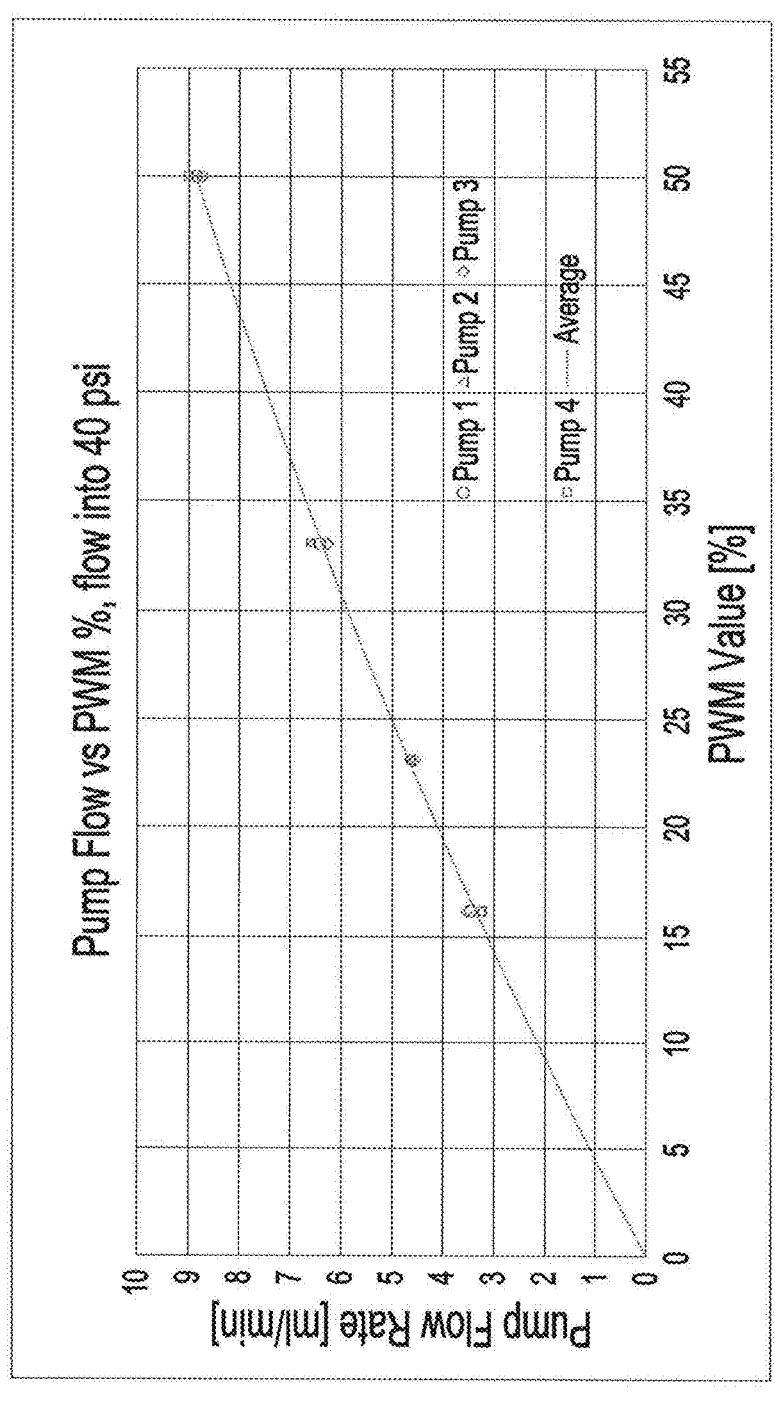
FIG. 22 is a graph of an example of data determined for several samples of a new peristaltic pump/tube combination and shown as Chart 1.

In FIG. 22, a graph of an example of data determined for several samples of a new peristaltic pump/tube combination is shown as Chart 1.

Once a given circuit has $Q_{tot}$ measured, $Q_{chem}$ may be determined from the Dilution Ratio equation as shown above. $Q_{chem}$ may be then plugged into the resulting equation of PWM % as a function of $Q_{chem}$. The equation in this example is shown in Chart 2. In one embodiment, a lookup table may also be created, for the computer to quickly map the required $Q_{chem}$ to the corresponding PWM value. If, for example, it is determined that a circuit needs a pump flow of 4 ml/min, the equation in Chart 2 shows that a PWM value of 19.2% is required. A built-in lookup table may yield essentially the same value. The pump may be activated at 19.2% during the subsequent EC measurement of this EC Baselining process. However, any such method described herein of tying a given pump flow rate $Q_{chem}$ to a required pump voltage or PWM value, using predetermined pump characteristics equations, tables, graphs, or other test data, and then setting or configuring the pump to run at that voltage for a subsequent EC Baselining Step, is herein referred to as an Equation-Based Pump Voltage Determination Step.

Figure 23:
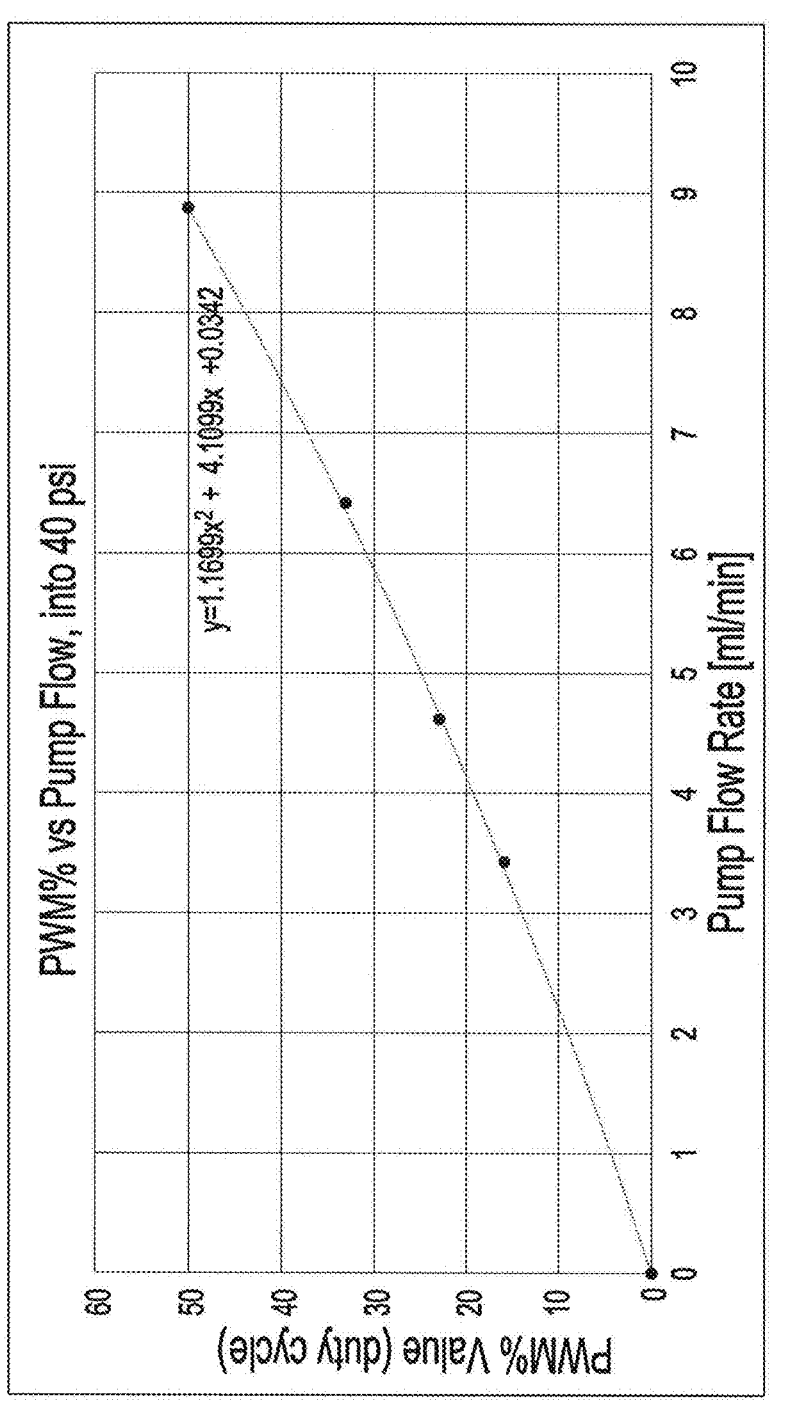
FIG. 23 is an inverted graph, where pump flow is on the x-axis, of an example of data determined for several samples of a new peristaltic pump/tube combination and shown as Chart 2.

In FIG. 23, an inverted graph, where pump flow is on the x-axis, of an example of data determined for several samples of a new peristaltic pump/tube combination is shown as Chart 2.

The "setting or configuring" part of the step may be done automatically by the beverage dispenser or may be done by an operator as discussed below. Note that the resulting voltage/PWM value may continue to be employed for that circuit during the initial cleaning events. If there is no voltage correction in place (discussed below), that voltage may be used for that circuit indefinitely.

In another embodiment, the display may show the calculated value of pump voltage required and cause the installer/operator to adjust the pump voltage (typically via an input screen on the computer or display of the beverage dispenser) to the proper value before EC Baselining begins. As mentioned above in the present disclosure, this is describing the Equation-Based Pump Voltage Determination Step. In either case, after the Equation-Based Pump Voltage Determination Step is completed, an EC Baselining Step is performed. The water flow is initiated again (i.e., if not still flowing) through the circuit (e.g., normally by opening a single solenoid valve), and the pump turns on at the established voltage. Assuming the pump is primed, then a few seconds would be allowed for the mixing process to achieve the steady-state. At that point, the EC sensor begins to measure the EC of the mixture. Several seconds of measuring provides an acceptable average value for $EC_{baseline}$. Logic may also be added so that the system determines if the EC values have stabilized at some value above that of incoming water's EC. In any case, the resulting $EC_{baseline}$ value can then be considered the "baseline EC" for the given cleanable circuit, and for any other members of that circuit's Flow-Sharing Cleanable Circuit Group (defined below). If the incoming water quality does not change significantly over time, a user knows that if future measurements (i.e., during cleanings) of the EC on this circuit are equal to this baseline EC, the DR must also be equal to the given "design" DR that was used during the EC Baselining Step.

The Testing Method of Connecting $Q_{chem}$ to Required Pump Voltage:

With this method, after $Q_{tot}$ is measured and $Q_{chem}$ calculated with equation J1, the equation or lookup table would still be used by the computer to determine the theoretical voltage/PWM value required to obtain this $Q_{chem}$. However, this method may comprise the starting point. A calibration process for the pump may also be performed, to get an even more accurate value of the voltage necessary to yield the desired $Q_{chem}$. The pump may now be calibrated by having it withdraw water out of a cup, for instance.

In one embodiment, the cup—preferably along with the tube inlet or straw of the beverage dispenser—may be filled with water and placed on a small scale. The system may then turn on the pump at full voltage for a long enough time to ensure that the pump and inlet tubing are fully primed. The system may then pause and wait for a verification from the user that the scale has been tared. At that point, the pump may begin pumping at the theoretical voltage (using the example above, 19.2%). However, since the flow rates are quite small, the pump would remain on for a significant period of time (i.e., up to four minutes or more). Preferably, enough time to remove at least 12 to 15 ml from the cup. Once the pump turns off, the absolute value of the resulting scale reading may be entered into the computer. The computer, after converting the weight to volume of water, may combine this information with the known "on time" to calculate the pump's flow rate. If consistent (within reason) with the $Q_{chem}$ value from the graph/table/equation, then it sets the PWM/Voltage value to that amount (for that circuit) and records it. If the resulting measured flow rate is too low, the computer may prepare to increase the voltage by a small amount DeltaV. The taring of the scale may be redone, then the pump turned on at the new voltage value for the predetermined amount of time. The resulting weight value is entered, and the calculations performed by the computer to get the new pump flow rate. This step may be repeated until the last two flow rate values from the calibration are on either side of the theoretical $Q_{chem}$ value from the equation/table. At that point, the computer may interpolate between the last two voltage values and corresponding flow rate values, to determine the proper voltage value that achieves the correct $Q_{chem}$. Those skilled in the art understand that a similar process may be employed if the initial flow rate from the calibration was too high. In that case, the computer may use a slightly lower voltage on the second attempt. This may be repeated until the last two flow rate values fall on either side of the theoretical $Q_{chem}$ value. Interpolation may be done as described herein to determine the proper pump voltage for that circuit.

In another embodiment, the volume of water may be determined even more directly by using a graduated cylinder instead of a scale. Once the priming is completed, the pump may pause, and the computer and interface may inform the user to record the level of the water in the graduated cylinder. Brief initiations of the pump may be allowed for, so that the level ends up very close to one of the graduation markings. The pumping may then begin, and when completed, the end level may be recorded. The difference—or both the start and end points—may be entered into the computer interface, and the computer may calculate the flow rate from that volume difference and the elapsed time. Aside from that, the calibration process—including the interpolation—may be the same as described herein above when using a scale. Any such method described herein of tying a given pump flow rate $Q_{chem}$ to a required pump voltage or PWM value, using actual pump flow measurement or calibration techniques to help in this task, and then setting or configuring the pump to run at that voltage for a subsequent EC Baselining Step, is herein referred to as a Calibration-Based Pump Voltage Determination Step. The "setting or configuring" part of the step may be done automatically by the beverage dispenser or may be done by an operator after receiving a final voltage value from the computer interface.

This measuring of the total flow rate $Q_{tot}$ through the cleanable circuit of interest may then, be done first, so that the proper chemical flow rate can be calculated for the circuit, based on its desired or "design" Dilution Ratio. The necessary voltage—or PWM value—to achieve that desired chemical flow rate may then be determined and configured via either of the two "pump voltage determination" steps defined above. Once the necessary voltage/PWM value is configured for a given circuit, the measurement of the "baseline EC" may then be completed for that circuit (e.g., the EC Baselining Step).

Performing meaningful measurements of the EC of mixtures coming through a given cleanable circuit in future cleaning events is another important aspect of the invention. Preferably, the same EC sensor that performed the measurement during the EC Baselining Step may be used in all subsequent cleaning measurements. If the measured EC is a large percentage away from the $EC_{baseline}$ for that circuit, a user can be quite sure that the DR of the flowing mixture is also quite far from its original (design) value. Similarly, if the measured EC is very close to $EC_{baseline}$, a user knows that the DR is still quite close to its baseline (design) value. As described herein, some embodiments include the original DR used during EC Baselining equal to a desired or design value for the circuit. The EC carefully measured during a cleaning and/or sanitizing event, for use in comparing to $EC_{baseline}$, may herein be referred to as a "cleaning EC", also known as $EC_{clng}$. In some embodiments, this type of EC measurement may also be done in a separate event, which uses the same chemical flow rate (i.e., same pump setting)

and motive flow rate as used in cleaning and/or sanitizing. Since such an event also cleans or sanitizes the circuit, it may be considered part of the cleaning and/or sanitizing event as well.

In one embodiment, the "cleaning EC" may be measured during the actual cleaning and/or sanitizing event, by elongating part of the event to get a more accurate average EC measurement. Careful measurement and recording/logging of the EC of a chemical mixture flowing through a cleanable circuit, done at some point subsequent to an EC Baselining Step on that circuit or other circuit in the same Flow-Sharing Cleanable Circuit Group (defined just below) is herein defined as a Cleaning EC Measurement Step. It may be done as part of cleaning and/or sanitizing but may also be a separate event. The step results in a "cleaning EC," $EC_{clng}$, which is intended to be compared to the $EC_{baseline}$ for that circuit or group of circuits.

As described above, an EC Baselining Step may be completed for several different cleanable circuits. There may be one or more groups of cleanable circuits in a beverage dispenser. For the purposes of the present disclosure, when each member of a group of circuits shares with all other members of that group: (a) the same design chemical flow rate for cleaning and/or measuring, and (b) essentially the same total flow rate during cleaning/measuring, then this group is defined herein as a Flow-Sharing Cleanable Circuit Group. In the foregoing definition, such a group may include only one cleanable circuit as well. In that case, the cleanable circuit is the only member of that Flow-Sharing Cleanable Circuit Group. Wherein, condition (b) for a Flow-Sharing Cleanable Circuit Group may occur, for instance, when all group members employ the same flow control, or model of flow control.

As described above, in one embodiment, the EC Baselining Step may be performed on one member of each Flow-Sharing Cleanable Circuit Group. In such an embodiment, it is preferred-though not required—that subsequent Cleaning EC Measurement Steps are performed on the same member of each Flow-Sharing Cleanable Circuit Group as was used for EC baselining.

The EC Baselining described herein takes advantage of the beverage dispenser's ability to inject essentially known flow rates of the chemical into the motive incoming water stream, while also measuring the EC of the resulting chemical mixture, which flows at a known flow rate, this being measured by the flow sensor.

However, in some embodiments, there are chemical pumps comprising flow rate changes over time, due to the wear of a component. In the case of a peristaltic pump utilized and described herein, the wearing component may be the pump's elastic tubing. As long as a new pump tube is utilized, a user may be confident as to what any given applied voltage or PWM value may produce in terms of flow rate.

In one embodiment, the most obvious such case would be at initial "startup" of the beverage dispenser. When these EC Baselining methods are employed on startup or at tube replacement, a user may be reasonably confident of what the dilution ratio is and map it to the resulting measured EC ($EC_{baseline}$), for use going forward. If the "calibration-based" method described above is used to determine the pump voltage, this EC Baselining process may be done at any time (e.g., not just when the tube and/or pump is new).

As described above, different circuits may have different desired DR values. In another embodiment, there may also be groups of cleanable circuits that each include the same design DR value. The circuits in such a group often also experience the very same total flow rate (e.g., all controlled by the same exact flow control). For members of such a group, the same pump voltage may then be applied, no matter which circuit of the group happens to be flowing chemical and water. For such a case, only one of the circuits in that group needs the EC baselining performed. As described in present disclosure, this group is defined herein as a Flow-Sharing Cleanable Circuit Group. The results and mapping apply to any of the individual circuits in that group. There may also be some minimum value of total flow rate, below which the customer is informed they must take action to improve the pressure/flow situation (e.g., adding a pressure booster or decreasing the restriction in the building lines downstream of the main, etc.). Assuming that limit is not reached for a given circuit or group of circuits, Equation JI is used to determine the required $Q_{chem}$, and the baselining may occur shortly thereafter.

The present disclosure may comprise an active pump correction step. Further, if no active correction mechanism (pump voltage correction) is in place during subsequent "normal operations", then either a significant change in $Q_{tot}$ Or $Q_{chem}$ (i.e., pump behavior change) may push the EC out of its desired range. To automatically account for subsequent changes in either $Q_{tot}$ or pump/tube behavior, active adjustment of the pump voltage is also required (see section JI below). Section JI describes embodiments that may periodically and automatically implement corrections to the pump voltage, to maintain the EC over extended time periods, within an acceptable proximity to $EC_{baseline}$.

The present disclosure may comprise the use of $EC_{baseline}$ down the line, to monitor Dilution Ratio. Further, the periodic chemical mixture strength measurement process is straightforward, comprising measuring EC of the flowing mixture during cleaning and/or sanitizing events, or similar dedicated events. This process of measuring the EC—and logging or recording it—is defined herein as a Cleaning EC Measurement Step. The monitoring or comparing comprises determining how far the most recent measured EC value ($EC_{clng}$) is from the $EC_{baseline}$ for that circuit or group of circuits. For the given beverage dispenser-assuming the water "quality" or source does not significantly change over time—the task of continually or periodically measuring DR may be performed by measuring the EC with the sensor that is already designed to do just that. This measured value of EC may be directly compared to the baseline EC that is determined during the EC Baselining Step. If the EC deviates significantly at some future period of time, then the DR is also deviating. In one embodiment, this may be due to either pump/tubing behavioral changes (reductions in $Q_{chem}$) and/or variations in motive flow rate or total flow rate $Q_{tot}$. In another embodiment, it may be due to a batch of chemical that is different than the average or nominal batch.

An Example of a "Startup" Process of a Beverage Dispenser:

An example of a "startup" process is given hereinafter. A beverage dispenser is being installed at some location. In short, the beverage dispenser performs an EC Baselining Step on a member of each Flow-Sharing Cleanable Circuit Group. In this example, all 8 circuits are downstream of the same flow control. During cleaning and/or sanitizing, a single chemical pump voltage is used whenever any of these lines are flowing. For instance, they all have the same "design" Dilution Ratio.

Therefore, it is not necessary to run the startup and baselining process for all 8 lines . . . at least one line will suffice. It has been decided in this example to use "line 5" for the present disclosure. For this circuit (e.g., line 5), the first step is to measure $Q_{tot}$. The line 5 solenoid valve is activated, sending water through the cleanable circuit. The pump is not activated for this step. The flow sensor is used to measure the motive flow rate, which can be considered $Q_{tot}$, as discussed herein. $Q_{tot}$ is found here to be 1045 ml/min.

In some embodiments, if a user wanted to be extremely meticulous, a user may add a small value to this measurement, to approximate the additional flow rate the circuit would have if the pump was on at its soon-to-be-determined nominal voltage. When then performed, add 5 ml/min to the 1045 value, to get 1050. This may theoretically make an insignificant difference between motive and total flow rate even smaller. With $Q_{tot}$ determined, the second step is equation JI is utilized by the computer at the instruction of the beverage dispenser to determine the necessary value of $Q_{chem}$ for this $Q_{tot}$ and the desired value of DR (i.e., 250 to 1 in this example). The computer quickly determines that $Q_{chem}$ needs to be 4.18 ml/min. Since this is so close to the 5 ml/min that was approximated earlier, there's no need to iterate on that measured value. Whether the actual $Q_{tot}$ is 1049 or 1050 is of little consequence, as the percentage difference is inconsequential. Assuming the data of Chart 2 applies, the best-fit equation yields a required pump PWM value of 20%. Further, in step three, the computer then uses this value in operating the pump during the subsequent EC Baselining Step. The line 5 solenoid valve-if not still on—is again activated, allowing flow through the circuit, and the pump is turned ON at a PWM of 20%. Once the steady-state has been achieved, the EC sensor measures a good average value of EC, which turns out in this example to be 1350 uS/cm. This is the $EC_{baseline}$ for any of the eight "identical" circuits. All subsequent EC measurements of the mixture flowing through any of these lines will be compared to this 1350 value. As mentioned above, only one of these "equivalent" circuits would typically be used for the measurement activity, preferably the same one that was used for the baselining. If active pump voltage correction is not in place, and the EC is subsequently measured with the pump at its nominal voltage during a cleaning event or dedicated measuring event that is not within some threshold of this baseline (i.e., 1350 uS/cm), warnings are created for the user.

In some embodiments, the automatic cleaning may also be temporarily locked out, until action has been taken. For example, this action may include refilling the chemical or trying a different bottle/batch of chemical. Further, it may also include sliding/adjusting the tubing of the peristaltic pump to allow a "virgin" tube to be exposed to the pump's rollers. Another example may also include seeing if the source water pressure has changed since baselining/startup. A good indicator of this is also checking the latest value of $Q_{tot}$ for the circuit. If the pressure and/or value of $Q_{tot}$ has fallen significantly, a pressure booster may be added. If it has increased, a regulator may be added. If good flow controls are in place, an increase in pressure will not cause a problem.

JI. Active Adjustment of Pump Voltage, based solely on maintaining $EC_{baseline}$:

To account for unpredictable or unexpected changes (e.g., in total flow rate, pump behavior itself, a batch of the chemical that is not nominal, increased restriction somewhere, etc.), periodic adjustment of the pump voltage may be implemented. There are other factors that this adjustment would overcome as well. For example, the goal here is to bring $EC_{clng}$ for that circuit back to—or closer to—its $EC_{baseline}$ value. Any such correction mechanism should already have a baseline EC established for that circuit (i.e., an EC Baselining Step should have been done before).

As described herein, the one result this measurement and correction method cannot solve, is if the water source changes its "quality" appreciably, as that would change the very relationship between DR and EC. In that case, $EC_{baseline}$ would likely no longer be associated with the proper "design" DR value. Thus, one embodiment of this invention includes the periodic monitoring of the source water's EC (see Section KK described herein), in an effort to detect that type of change so certain actions may be taken.

The periodic active adjustment of the pump begins with measuring a cleanable circuit's EC as described herein (i.e., a Cleaning EC Measurement Step). In one embodiment, this measuring may be completed as part of a scheduled and periodic (e.g., daily and/or weekly) cleaning event. Limits might be placed on the circuit's allowable EC value, relative to $EC_{baseline}$, before action is taken. These limits may be, for example, $EC_{baseline}$ plus or minus 5%. If the measurement routine results in an EC value ($EC_{clng}$) that is within those limits, then the pump may be left alone. If $EC_{clng}$ is outside those limits, then calculations may be done to determine how much the pump voltage should be changed to improve the mixture strength. If the measured EC is, for example, 6% below the $EC_{baseline}$, calculations may be quickly done by the computer to increase the pump voltage for that circuit by some amount.

Some embodiments can include a method of predicting the amount of voltage adjustment necessary, in an effort to change EC by a significant fraction of the difference. This may be done, for instance, by first calculating the voltage change theoretically required to bring EC exactly back to the baseline EC. This calculated voltage change may then be multiplied by a factor, typically between zero and one, to help ensure that the subsequent change in voltage will not cause the resulting EC (and thus DR) to overshoot the baseline value. A significant overshooting is possible due to various factors that have to be presumed in the calculations described below. If a factor is employed—either on the voltage change itself or on the EC difference—then it is much less probable for overshooting to occur. The consequence of this may include one or two more cleanings (which include this measurement and calculation process) for the baseline EC to be achieved or slightly overshot, or to get back into the "acceptable" range (+/−5% in the above example). Thus, this voltage increase need not necessarily occur immediately but may be implemented before the next scheduled cleaning routine.

In the present disclosure, Delta_EC is described and/or defined herein as the difference between $EC_{baseline}$ and $EC_{clng}$, where $EC_{clng}$ is a measured value of EC that has been obtained during a cleaning and/or measuring routine. Note that Delta_EC is defined as $EC_{clng}$ minus $EC_{baseline}$, or as $EC_{baseline}$ minus $EC_{clng}$, as long as the signage difference is accounted for in the subsequent calculation(s). There are many other ways of arranging $EC_{baseline}$ and $EC_{clng}$, for the purpose of determining deviation from the baseline. One obvious arrangement may include the ratio of the two values: either $EC_{clng}$ divided by $EC_{baseline}$ or $EC_{baseline}$ divided by $EC_{clng}$. Obviously, the same effect (of determining how much $EC_{clng}$ deviates from $EC_{baseline}$) may be obtained by using any number of quotients and/or functions involving $EC_{baseline}$ and $EC_{clng}$. Any arrangement of $EC_{baseline}$ and $EC_{clng}$, not including the difference between the two (i.e., Delta_EC), is described and/or defined herein as Ratio_EC. For example, these may include the quotient of the two, the quotient of functions of the two, and a function whose argument is the quotient of the two.

In one embodiment, Ratio_EC may be defined as the natural log of $EC_{baseline}$ divided by the natural log of $EC_{clng}$. In another embodiment, Ratio_EC may also be defined as the natural log of the quotient $EC_{baseline}$ divided by $EC_{clng}$, or as the sine of $EC_{clng}$ divided by the sine of $EC_{baseline}$. Further, in another embodiment, Ratio_EC may be defined as the sine of the quotient of $EC_{clng}$ divided by $EC_{baseline}$. However, regardless of exactly how Ratio_EC is defined, it has a certain value when $EC_{clng}$ and $EC_{baseline}$ are exactly equal. No matter the exact format of Ratio_EC, its value when $EC_{clng}$ equals $EC_{baseline}$ is described and/or defined herein as the Ratio when Equal. For the actual ratio (quotient of the two) situation, Ratio when Equal is 1.0. For the natural log of the quotient of the two values, Ratio when Equal is 0 (since the natural log of 1 is 0). For the "sine of the quotient" example, Ratio when Equal is about 0.841 (since the sine of 1.0 is 0.841).

The user may determine from testing how much Ratio_EC must deviate from Ratio when Equal to invoke a certain voltage change that may push the EC back to its baseline value. Any method that acts upon a Delta_EC or Ratio_EC value, and uses theoretical or empirical data to convert that value into a required and/or recommended change in chemical pump voltage (or PWM value), the invocation of which brings the chemical mixture strength back to—or closer to—a desired or nominal level, is herein described and/or defined as a Step for Determining Voltage Change to Improve Mixture Strength.

In some embodiments, this method, explained further below, may include an attempt to exactly hit the baseline with a single voltage change, or may include attenuating a theoretical voltage change as described above, in an effort to reduce the probability of overshooting the baseline EC significantly.

For the purposes of the present disclosure described herein, the term Voltage or the unit Volts will also include PWM value (i.e., typically expressed as a percent duty cycle), and vice versa. Their numerical values are different but the topics and equations involving their utilization are applicable to either means of pump excitation.

The Step for Determining Voltage Change to Improve Mixture Strength:

A: Utilizing Delta_EC

In the present disclosure, one embodiment may comprise determining the adjustment utilizing Delta_EC, which conveniently allows for a derivative to be employed in predicting the voltage change required. A nominal value of expected change in EC per unit change in voltage may be determined beforehand, for each Flow-Sharing Cleanable Circuit Group. Such a rate of change is referred to and/or described herein as Slope_ECV. Once Delta_EC is determined for the circuit, Delta_EC is divided by Slope_ECV, resulting in Delta $V_{theor}$.

One embodiment may comprise multiply Delta$V_{theor}$ by a number between zero and 1, herein referred to as the overshoot factor, $F_{over}$. In another embodiment, one example may comprise $F_{over}$ as 0.4. Delta$V_{theor}$ would be multiplied by $F_{over}$ (e.g., 0.4), resulting in a Delta $V_{actual}$. Further, the existing pump voltage may subsequently be adjusted by the amount Delta $V_{actual}$. This adjustment may be implemented immediately or may be implemented after the existing cleaning/measuring routine is done, not to be utilized until the next cleaning routine. The reduction from Delta $V_{theor}$ to Delta $V_{actual}$ may be used to account for unknown factors such as water quality and/or pump tube condition. Without this reduction, overcompensating may occur, with the resulting EC ending up immediately on the other side of $EC_{baseline}$. Embodiments utilizing such a factor may allow a more gradual push back toward the baseline (e.g., perhaps taking two or three additional routines/cleanings). However, there are other ways of attenuating $DeltaV_{theor}$ but any such methods are included in the definition of "The Step for Determining Voltage Change to Improve Mixture Strength."

One embodiment of the present disclosure may employ direct and empirical ways of determining Slope_ECV, arrived at from tests on actual beverage dispensers, with actual chemical, and using one particular source of water (e.g., whatever source of water is available for R&D testing). In one example, through a beverage dispenser's "product line" circuit, an increase in pump voltage, centered about the nominal operating point, of 10 PWM units (i.e., from 15% to 25%) resulted in an increase in EC of 58.4 uS/cm. This means a rate of change of 58.4 uS/cm per unit change in PWM value to the pump. One embodiment would have this value entered or read into the beverage dispenser as a setting, for that circuit (or group of circuits) and chemical. As discussed above and described herein, it may represent an "average" situation, meant to deal with whatever water source ends up being used, or whatever state of the pump tubing that may exist in the field. Further, when the circuit is measured during a Cleaning EC Measurement Step, and a Delta_EC obtained, it is divided by this 58.4 value to get a Delta $V_{theor}$. If Delta_EC is found to be 452, then DeltaV$_{theor}$ is 7.74 units of change in PWM. This is then multiplied by the overshoot factor (e.g., 0.4) to yield 3.1 units of change in PWM. If, however, the existing PWM value for this circuit is 18%, then as soon as possible (i.e., at least before the next cleaning routine), the pump is reconfigured to run at 21.1% PWM value when pushing chemical through this circuit.

Another embodiment of the present disclosure may include a routine near initial startup of the beverage dispenser, once the actual water source is available (i.e., "in the field"), that initiates the pump flow at two or more voltages sequentially, allowing EC to be carefully measured and recorded at each level. The nominal $Q_{tot}$ is flowing through the circuit for these measurements. The operating computer of the beverage dispenser is then utilized to calculate and store Slope_ECV for the given circuit and/or group of circuits. This may be completed for a member of each Flow-Sharing Cleanable Circuit Group. This "on location" routine and determination has the benefit of increasing the accuracy of the Slope_ECV terms, since the error due to "unknown water" would no longer exist. With such an embodiment, the overshoot factor $F_{over}$ may theoretically be made larger (i.e., closer to 1.0).

B: Utilizing Ratio_EC

In one embodiment of the present disclosure, if Ratio_EC is formulated as the ratio of $EC_{clng}$ to $EC_{baseline}$, then the user may establish—through testing or educated guesses— that once Ratio_EC is below a certain value (e.g., 0.95), then a given DeltaV$_{theor}$ may be invoked for the next cleaning (e.g., 2.2% PWM increase, or a 1.7 Volt increase, etc.). This new voltage (i.e., original plus the DeltaV) will return the EC value back to nominal. Similarly, the user may determine that the ratio is greater than some value (i.e., 1.05), then some other DeltaV$_{theor}$ (i.e., the negative value) may be invoked for the next cleaning. Again, this will return the EC value back to nominal. Notwithstanding the exact format of Ratio_EC, this type of methodology may be employed.

In another embodiment of the present disclosure, if Ratio_EC is utilized as sine of ($EC_{clng}/EC_{baseline}$), then the ratio when equal is 0.841 (e.g., since the sine of 1.0 is 0.841). Previous testing may reveal that when Ratio_EC (i.e., sine of the quotient) is less than, e.g., 0.78, then a certain DeltaV$_{theor}$ may be invoked to get the mixture back to nominal. Similarly, testing may reveal that when this Ratio_EC is greater than, e.g., 0.89, then another Delta V$_{theor}$ (i.e., the negative value) may be invoked to reduce the mixture's strength back to nominal. A user understands that this latter example is describing "when the ACTUAL ratio of $EC_{clng}$ to $EC_{baseline}$ is greater than 1.1, then invoke the "negative" DeltaV$_{theor}$." In all the Ratio_EC cases described herein, a user may always multiply Delta V$_{theor}$ by an overshoot factor, just as with the Delta_EC embodiments. In some embodiments, the quotients used in Ratio_EC may comprise the "baseline" term in the numerator and the "cleaning" term in the denominator.

KD. Automated Priming of Pump, Using EC and Total Flow Rate:

Another embodiment described herein may comprise an improved version of the priming methods described in U.S. patent application Ser. No. 18/299,013, the contents of which are incorporated herein by reference. This method may include no consideration of Dilution Ratio, and certainly no association between measured EC values and corresponding DR values. In one embodiment, one or more tests may be performed beforehand, on a similar beverage dispenser and cleanable circuit, to determine some approximate values. The tests may establish a simple relationship between motive or total flow rate ($Q_{tot}$) and the EC of the mixture created by pumping the given chemical into the motive flow at some predetermined "priming" voltage. The higher the voltage, the more lifting and suction capability the pump has, and the quicker the priming will be completed. Further, whatever voltage is determined to be the "priming voltage" in the field may be used for this test. If this voltage is 24 Volts (or 100% PWM), then the test(s) will pump the given chemical into the motive flow at 24 Volts. The total flow rate may be set to whatever the nominal flow rate is for the given circuit. With the pump's inlet connected normally to the desired chemical's container, and its output connected to the desired cleanable circuit of the beverage dispenser, it may be activated at the desired voltage, while motive water is flowing into the cleanable circuit. Once it is determined that the chemical has made its way to the motive flow stream, and into the sensor and beyond downstream, a good average EC is measured, called $EC_{prm,exp}$. Thus, this value is entered into the beverage dispenser's computer, and used as the expected EC in the field, when priming this same circuit with the same pump voltage and essentially the same nominal total flow rate.

Further, to account for inevitable deviations in $Q_{tot}$ when priming occurs in the field, a user may perform two similar tests "in the lab," as opposed to the one described herein above. A user may utilize $Q_{tot}$ set to a value somewhat lower than the nominal, called $Q_{tot,1}$. The other test would be with $Q_{tot}$ set to a value somewhat higher than the nominal, called $Q_{tot,2}$. EC is measured for both $Q_{tot,1}$ and $Q_{tot,2}$, resulting in $EC_{prm,exp,1}$ and $EC_{prm,exp,2}$. In this manner, a relationship is obtained between $Q_{tot}$ and expected EC for the priming. In the field, even if $Q_{tot}$ is 20 or 30% higher or lower than the nominal value, the relationship quickly yields a more accurate expected EC. If, however, $Q_{tot}$ is lower, the expected EC would be higher, and vice versa (this is expected). Thus, this one-time test—at two different total flow rates—and the resulting relationship, automatically accounts for this effect when priming in the field. To be even more accurate, a user may use three different $Q_{tot}$ values, and have a quadratic relationship.

Moreover, the above embodiment still suffers from the fact that the one-time test(s) is done with a specific water source. Therefore, another embodiment would have these tests done with as many relevant water sources as possible, resulting in an average relationship. Notwithstanding, the main remedy for this unknown water problem is to have enough tolerance in the expected EC to account for the wide variety of possible water characteristics in the field. The tolerance on $EC_{prm,exp}$ may necessitate, e.g., +/−25%.

KK. Detecting Changes in Water Quality:

As described herein above, the one factor that may be difficult to account for with the embodiments described herein, is if/when the water "quality" changes significantly over time at a given installation and/or application. This may affect the relationship between DR and EC, thus diminishing the importance or dominance of the various $EC_{baseline}$ values that are in place for the various circuits or circuit groups. Although unmeasured and/or uncharacterized attributes of water can change the EC to DR relationship for a given chemical, it appears possible that these changes oftentimes have at least some connection to changes in the water's EC itself.

Therefore, detecting a significant change in the water's EC may give an indication that the water has changed in some significant manner. One embodiment described herein includes the startup/baselining procedure as a good measurement of the EC of the pure water itself. This is called $EC_{H2O,b-line}$. This measurement may be incorporated right into the initial cleanable circuit flow that occurs during the EC Baselining Step. This is the flow period that allows $Q_{tot}$ to be measured. While $Q_{tot}$ is being measured, the EC may be measured and recorded as $EC_{H2O,b-line}$. However, recall that this part of the step is done with no chemical flowing, so the EC being measured is the source water's EC. The measuring of the various chemical mixture EC values on a daily and/or weekly basis would, in this embodiment, also include a measurement of the pure water's EC. If at any point the measured EC of the water itself has deviated more than some given +/−threshold from $EC_{H2O,b-line}$, a message may be generated that informs the operator/owner/user that the water "quality" has changed significantly since startup, and a new baselining should be performed. A message may also suggest checking the water source and possibly installing mitigating equipment such as a water filter and/or water softener, etc. If such equipment is ultimately installed, a new baselining routine may be performed as well, to establish new $EC_{baseline}$ values for each relevant circuit.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made, and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure is not limited to the particular embodiment(s) disclosed as the best mode contemplated, but that the disclosure will include all embodiments falling within the scope of the appended claims.

What is claimed is:

1. A method of establishing a baseline strength of a chemical mixture flowing through a cleanable circuit of a beverage dispenser, comprising the steps of:
  a) allowing incoming water to flow through said cleanable circuit while measuring a total flow rate $Q_{tot}$, to thereby obtain a measured value of said total flow rate of said incoming water;
  b) providing a pump connected to said cleanable circuit for pumping a chemical into said incoming water of said cleanable circuit, thereby creating said chemical mixture;
  c) calculating a required chemical flow rate $Q_{chem}$ value to achieve a desired value of dilution ratio (DR) of the chemical mixture by utilizing said desired value of DR and said measured value of said total flow rate $Q_{tot}$ in an equation;
  d) determining from said required chemical flow rate $Q_{chem}$ value a required pump excitation voltage (V) by at least one step selected from the group consisting of:
    i. an equation-based pump voltage determination step, and
    ii. a calibration-based pump voltage determination step; and
  e) performing an electrical conductivity (EC) baselining step on said cleanable circuit of said chemical mixture while said pump is activated at said required pump excitation voltage (V), and while said measured value is at said total flow rate $Q_{tot}$,
  whereby an $EC_{baseline}$ value, which is associated with said desired value of DR, is obtained, for use as said baseline strength of said chemical mixture for comparing subsequent EC measurements on at least one member of a cleanable circuit's flow-sharing cleanable circuit group.

2. The method of claim 1, further comprising:
  a) allowing said incoming water to flow through said at least one member of said cleanable circuit's flow-sharing cleanable circuit group, said flow of said incoming water occurring during a predetermined period of time;
  b) activating said pump during said predetermined period of time, thereby creating said chemical mixture of said incoming water and said chemical; and
  c) performing a cleaning EC measurement step on said at least one member of said flow-sharing cleanable circuit group,
  whereby a cleaning EC ($EC_{clng}$) for said at least one member of said cleanable circuit's flow-sharing cleanable circuit group is obtained, thereby allowing for comparison with said $EC_{baseline}$ value.

3. The method of claim 1, further comprising measuring an EC of said incoming water while said pump is not activated,
  whereby a baseline EC value ($EC_{H2O,b-line}$) of said incoming water is obtained for EC comparison.

4. A computer readable medium comprising computer instructions thereon for causing a microprocessor associated with said beverage dispenser to perform the steps of claim 1.

5. The method of claim 2, further comprising:

a) obtaining delta_EC by determining a difference between said $EC_{clng}$ and said $EC_{baseline}$;

b) providing a value of slope_ECV, as a predetermined approximate value of rate of change in said EC per rate of change in said pump excitation voltage (V) used to drive said pump for said chemical and said at least one member of said flow-sharing cleanable circuit group; and c) dividing said delta_EC by said slope_ECV to obtain a delta $V_{theor}$, wherein said delta $V_{theor}$ provides an approximate value for an amount of said pump excitation voltage (V) change needed in order to return the chemical mixture to a desired strength.

6. The method of claim 2, further comprising:

a) calculating a delta_EC from said $EC_{clng}$ and said $EC_{baseline}$, and b) performing a step for determining voltage change to improve said baseline strength of said chemical mixture, wherein changing said pump's excitation voltage by a recommended voltage change produces a chemical mixture strength through said at least one member of said flow-sharing cleanable circuit group that is closer to a desired strength of said chemical mixture for said at least one member of said flow-sharing cleanable circuit group.

7. The method of claim 2, further comprising:

a) calculating a ratio_EC from said $EC_{baseline}$ and said $EC_{clng}$, and b) performing a step for determining voltage change to improve said baseline strength of said chemical mixture, wherein adjusting said pump's excitation voltage by a recommended voltage change produces a chemical mixture strength through said at least one member of said flow-sharing cleanable circuit group that is closer to a desired strength of said chemical mixture for said at least one member of said flow-sharing cleanable circuit group.

8. A computer readable medium comprising computer instructions thereon for causing a microprocessor associated with said beverage dispenser to perform the steps of claim 2.

9. The method of claim 3, further comprising:

a) allowing said incoming water to flow through said at least one member of said cleanable circuit's flow-sharing cleanable circuit group during a predetermined period of time, while said pump is not activated; and b) measuring the EC of said incoming water, wherein a measured value of said incoming water's EC is compared to said $EC_{H2O,b-line}$, thereby determining if a water quality change has occurred since EC baselining was performed.

10. The method of claim 5, further comprising multiplying said delta $V_{theor}$ by an overshoot factor $F_{over}$, whereby a recommended voltage change in said pump's excitation voltage (V) changes said chemical mixture to said desired strength while lowering a possibility of exceeding said baseline strength of said chemical mixture.

11. A computer readable medium comprising computer instructions thereon for causing a microprocessor associated with said beverage dispenser to perform the steps of claim 5.

12. A method of establishing a baseline strength of a chemical mixture flowing through a cleanable circuit of a beverage dispenser, comprising the steps of:

a) providing a flow controlling device in said cleanable circuit that maintains a total flow rate of incoming water at a constant value $Q_{tot}$;

b) providing a pump connected to said cleanable circuit for pumping a chemical into said incoming water of said cleanable circuit, thereby creating said chemical mixture;

c) calculating a required chemical flow rate $Q_{chem}$ value to achieve a desired value of dilution ratio (DR) of the chemical mixture by utilizing said desired value of DR and said constant value of $Q_{tot}$ in an equation;

d) determining from said required chemical flow rate $Q_{chem}$ value a required pump excitation voltage (V) by at least one step selected from the group consisting of:

i. an equation-based pump voltage determination step, and ii. a calibration-based pump voltage determination step; and e) performing an electrical conductivity (EC) baselining step on said cleanable circuit of said chemical mixture while said pump is activated at said required pump excitation voltage (V), and while said total flow rate is at said constant value $Q_{tot}$, whereby an $EC_{baseline}$ value, which is associated with said desired value of DR, is obtained, for use as said baseline strength of said chemical mixture for comparing subsequent EC measurements on at least one member of a cleanable circuit's flow-sharing cleanable circuit group.

13. The method of claim 12, further comprising:

a) allowing said incoming water to flow through said at least one member of said cleanable circuit's flow-sharing cleanable circuit group, said flow of said incoming water occurring during a predetermined period of time;

b) activating said pump during said predetermined period of time, thereby creating said chemical mixture of said and said incoming water chemical; and c) performing a cleaning EC measurement step on said at least one member of said flow-sharing cleanable circuit group, whereby a cleaning EC ($EC_{clng}$) for said at least one member of said cleanable circuit's flow-sharing cleanable circuit group is obtained, thereby allowing for comparison with said $EC_{baseline}$ value.

14. A computer readable medium comprising computer instructions thereon for causing a microprocessor associated with said beverage dispenser to perform the steps of claim 12.

15. The method of claim 13, further comprising:

a) obtaining delta_EC by determining a difference between said $EC_{clng}$ and said $EC_{baseline}$;

b) providing a value of slope_ECV, as a predetermined approximate value of rate of change in said EC per rate of change in said pump excitation voltage (V) used to drive said pump for said chemical and said at least one member of said flow-sharing cleanable circuit group, and c) dividing said delta_EC by said slope_ECV to obtain a delta $V_{theor}$, wherein said delta $V_{theor}$ provides an approximate value for an amount of said pump excitation voltage (V) change needed in order to return the chemical mixture to a desired strength.

16. The method of claim 13, further comprising:

a) calculating a delta_EC from said $EC_{clng}$ and said $EC_{baseline}$, and b) performing a step for determining voltage change to improve said baseline strength of said chemical mixture, wherein changing said pump's excitation voltage by a recommended voltage change produces a chemical mixture strength through said at least one member of said flow-sharing cleanable circuit group that is closer to a desired strength of said chemical mixture for said at least one member of said flow-sharing cleanable circuit group.

17. The method of claim 13, further comprising:

a) calculating a ratio_EC from said $EC_{baseline}$ and said $EC_{clng}$, and b) performing a step for determining voltage change to improve said baseline strength of said chemical mixture, wherein adjusting said pump's excitation voltage by a recommended voltage change produces a chemical mixture strength through said at least one member of said flow-sharing cleanable circuit group that is closer to a desired strength of said chemical mixture for said at least one member of said flow-sharing cleanable circuit group.

18. A computer readable medium comprising computer instructions thereon for causing a microprocessor associated with said beverage dispenser to perform the steps of claim 13.

19. The method of claim 15, further comprising multiplying said delta $V_{theor}$ by an overshoot factor $F_{over}$, whereby a recommended voltage change in said pump's excitation voltage (V) changes said chemical mixture to said desired strength while lowering a possibility of exceeding said baseline strength of said chemical mixture.

20. A computer readable medium comprising computer instructions thereon for causing a microprocessor associated with said beverage dispenser to perform the steps of claim 15.

21. A method of establishing a baseline strength of a chemical mixture flowing through a cleanable circuit of a beverage dispenser, the method implemented by a computing device comprising a processor and a memory comprising computer readable instructions for causing the processor to execute the steps of:

a) allowing incoming water to flow through said cleanable circuit while measuring a total flow rate $Q_{tot}$, to thereby obtain a measured value of said total flow rate of said incoming water;

b) providing a pump connected to said cleanable circuit for pumping a chemical into said incoming water of said cleanable circuit, thereby creating said chemical mixture;

c) calculating a required chemical flow rate $Q_{chem}$ value to achieve a desired value of dilution ratio (DR) of the chemical mixture by utilizing said desired value of DR and said measured value of said total flow rate $Q_{tot}$ in an equation;

d) determining from said required chemical flow rate $Q_{chem}$ value a required pump excitation voltage (V) by at least one step selected from the group consisting of:

i. an equation-based pump voltage determination step, and ii. a calibration-based pump voltage determination step; and e) performing an electrical conductivity (EC) baselining step on said cleanable circuit of said chemical mixture while said pump is activated at said required pump excitation voltage (V), and while said measured value is at said total flow rate $Q_{tot}$, whereby an $EC_{baseline}$ value, which is associated with said desired value of DR, is obtained, for use as said baseline strength of said chemical mixture for comparing subsequent EC measurements on at least one member of a cleanable circuit's flow-sharing cleanable circuit group.

22. A method of establishing a baseline strength of a chemical mixture flowing through a cleanable circuit of a beverage dispenser, the method implemented by a computing device comprising a processor and a memory comprising computer readable instructions for causing the processor to execute the steps of:

a) providing a flow controlling device in said cleanable circuit that maintains a total flow rate of incoming water at a constant value $Q_{tot}$;

b) providing a pump connected to said cleanable circuit for pumping a chemical into said incoming water of said cleanable circuit, thereby creating said chemical mixture;

c) calculating a required chemical flow rate $Q_{chem}$ value to achieve a desired value of dilution ratio (DR) of the chemical mixture by utilizing said desired value of DR and said constant value of $Q_{tot}$ in an equation;

d) determining from said required chemical flow rate $Q_{chem}$ value a required pump excitation voltage (V) by at least one step selected from the group consisting of:

i. an equation-based pump voltage determination step, and ii. a calibration-based pump voltage determination step; and e) performing an electrical conductivity (EC) baselining step on said cleanable circuit of said chemical mixture while said pump is activated at said required pump excitation voltage (V), and while said total flow rate is at said constant value $Q_{tot}$, whereby an $EC_{baseline}$ value, which is associated with said desired value of DR, is obtained, for use as said baseline strength of said chemical mixture for comparing subsequent EC measurements on at least one member of a cleanable circuit's flow-sharing cleanable circuit group.

\* \* \* \* \*